(12) United States Patent
Jones et al.

(10) Patent No.: US 8,420,017 B2
(45) Date of Patent: Apr. 16, 2013

(54) MICROFLUIDIC REACTION APPARATUS FOR HIGH THROUGHPUT SCREENING

(75) Inventors: Robert C Jones, Los Altos, CA (US); Jing Wang, South San Francisco, CA (US); Andrew May, San Francisco, CA (US); David Cohen, San Bruno, CA (US)

(73) Assignee: Fluidigm Corporation, South San Francisco, CA (US)

( * ) Notice: Subject to any disclaimer, the term of this patent is extended or adjusted under 35 U.S.C. 154(b) by 0 days.

(21) Appl. No.: 12/872,498

(22) Filed: Aug. 31, 2010

(65) Prior Publication Data

US 2011/0166044 A1 Jul. 7, 2011

Related U.S. Application Data

(63) Continuation of application No. 11/680,541, filed on Feb. 28, 2007, now Pat. No. 7,815,868.

(60) Provisional application No. 60/777,972, filed on Feb. 28, 2006, provisional application No. 60/849,223, filed on Oct. 4, 2006, provisional application No. 60/881,627, filed on Jan. 19, 2007.

(51) Int. Cl.
*B01J 19/00* (2006.01)
*B01L 3/00* (2006.01)
*B01L 99/00* (2010.01)
*F04B 19/00* (2006.01)
*B01J 8/00* (2006.01)
*C40B 60/08* (2006.01)

(52) U.S. Cl.
USPC ........... 422/129; 422/130; 422/500; 422/501; 422/502; 422/503; 422/504; 422/505; 422/506; 422/507; 422/600; 422/603; 506/37

(58) Field of Classification Search .................. 422/129, 422/130, 500–507, 600, 603; 204/451, 601; 506/37; 435/283.1, 289.1, 305.1, 305.2
See application file for complete search history.

(56) References Cited

U.S. PATENT DOCUMENTS 2,620,938 A 12/1952 Jesnig
3,495,608 A 2/1970 O'Keefe
(Continued)

FOREIGN PATENT DOCUMENTS

DE 299 17 313 A1 2/2001
EP 0 553 539 4/1993
(Continued)

OTHER PUBLICATIONS

"The Liver Chip," Technology Review, pp. 64-67, Mar. 2003.
(Continued)

*Primary Examiner* — Walter D Griffin
*Assistant Examiner* — Natasha Young
(74) *Attorney, Agent, or Firm* — Kilpatrick Townsend & Stockton LLP

(57) ABSTRACT

A microfluidic device is described that has a slug mixing arrangement. A reaction well has an input flow channel with a first valve near the reaction well, and a second valve further from the reaction well. A fluid source is connected to the segment in between the two valves. A second fluid source is connected behind the second valve. The channel between the two valves receives the first fluid by blind filling when the two valves are closed. The reaction well receives the first fluid followed by the second fluid when the first and second valves are open.

24 Claims, 19 Drawing Sheets

U.S. PATENT DOCUMENTS

| | | |
|---|---|---|
| 3,570,515 A | 3/1971 | Kinner |
| 3,747,628 A | 7/1973 | Holster et al. |
| 4,046,159 A | 9/1977 | Pegourie |
| 4,119,368 A | 10/1978 | Yamazaki |
| 4,143,195 A | 3/1979 | Rasmussen |
| 4,153,855 A | 5/1979 | Feingold |
| 4,245,673 A | 1/1981 | Bouteille et al. |
| 4,344,064 A | 8/1982 | Bitler et al. |
| 4,434,704 A | 3/1984 | Surjaatmadja |
| 4,707,237 A | 11/1987 | Lepp et al. |
| 4,848,722 A | 7/1989 | Webster |
| 4,898,582 A | 2/1990 | Faste |
| 4,948,564 A | 8/1990 | Root et al. |
| 4,992,312 A | 2/1991 | Frisch |
| 5,054,522 A | 10/1991 | Kowanz et al. |
| 5,085,562 A | 2/1992 | Van Lintel |
| 5,088,515 A | 2/1992 | Kamen |
| 5,091,652 A | 2/1992 | Mathies et al. |
| 5,096,388 A | 3/1992 | Weinberg |
| 5,126,115 A | 6/1992 | Fujita et al. |
| 5,164,558 A | 11/1992 | Huff et al. |
| 5,171,132 A | 12/1992 | Miyazaki |
| 5,224,843 A | 7/1993 | Van Lintel |
| 5,259,737 A | 11/1993 | Kamisuki et al. |
| 5,265,327 A | 11/1993 | Faris et al. |
| 5,290,240 A | 3/1994 | Horres, Jr. |
| 5,304,487 A | 4/1994 | Wilding et al. |
| 5,336,062 A | 8/1994 | Richter |
| 5,346,372 A | 9/1994 | Naruse et al. |
| 5,375,979 A | 12/1994 | Trah |
| 5,376,252 A | 12/1994 | Ekstrom |
| 5,400,741 A | 3/1995 | DeTitta et al. |
| 5,423,287 A | 6/1995 | Usami et al. |
| 5,429,856 A | 7/1995 | Krueger et al. |
| 5,529,465 A | 6/1996 | Zengerle et al. |
| 5,593,130 A | 1/1997 | Hansson et al. |
| 5,598,033 A | 1/1997 | Behlen et al. |
| 5,637,469 A | 6/1997 | Wilding et al. |
| 5,639,423 A | 6/1997 | Northrup et al. |
| 5,642,015 A | 6/1997 | Whitehead et al. |
| 5,646,039 A | 7/1997 | Northrup et al. |
| 5,659,171 A | 8/1997 | Young et al. |
| 5,660,370 A | 8/1997 | Webster |
| 5,674,742 A | 10/1997 | Northrup et al. |
| 5,681,024 A | 10/1997 | Lisec et al. |
| 5,681,484 A | 10/1997 | Zanzucchi et al. |
| 5,705,018 A | 1/1998 | Hartley |
| 5,718,567 A | 2/1998 | Rapp et al. |
| 5,724,677 A | 3/1998 | Bryant et al. |
| 5,759,014 A | 6/1998 | Van Lintel |
| 5,775,371 A | 7/1998 | Pan et al. |
| 5,788,468 A | 8/1998 | Dewa et al. |
| 5,802,856 A | 9/1998 | Schaper et al. |
| 5,832,165 A | 11/1998 | Reichert et al. |
| 5,836,750 A | 11/1998 | Cabuz |
| 5,840,412 A | 11/1998 | Wood et al. |
| 5,842,787 A | 12/1998 | Kopf-Sill et al. |
| 5,846,396 A | 12/1998 | Zanzucchi et al. |
| 5,856,174 A | 1/1999 | Lipshutz et al. |
| 5,858,188 A | 1/1999 | Soane et al. |
| 5,858,195 A | 1/1999 | Ramsey |
| 5,863,722 A | 1/1999 | Brenner |
| 5,865,417 A | 2/1999 | Harris et al. |
| 5,866,345 A | 2/1999 | Wilding et al. |
| 5,875,817 A | 3/1999 | Carter |
| 5,876,187 A | 3/1999 | Forster et al. |
| 5,876,675 A | 3/1999 | Kennedy |
| 5,876,946 A | 3/1999 | Burbaum et al. |
| 5,885,470 A | 3/1999 | Parce et al. |
| 5,885,837 A | 3/1999 | Winkler et al. |
| 5,888,778 A | 3/1999 | Shuber |
| 5,922,591 A | 7/1999 | Anderson et al. |
| 5,922,604 A | 7/1999 | Stapleton et al. |
| 5,928,880 A | 7/1999 | Wilding et al. |
| 5,932,100 A | 8/1999 | Yager et al. |
| 5,932,799 A | 8/1999 | Moles |
| 5,942,443 A | 8/1999 | Parce et al. |
| 5,958,344 A | 9/1999 | Levine et al. |
| 5,958,694 A | 9/1999 | Nikiforov |
| 5,972,187 A | 10/1999 | Parce et al. |
| 5,972,639 A | 10/1999 | Parandoosh |
| 5,976,822 A | 11/1999 | Landrum et al. |
| 6,004,515 A | 12/1999 | Parce et al. |
| 6,007,309 A | 12/1999 | Hartley |
| 6,007,690 A | 12/1999 | Nelson et al. |
| 6,015,531 A | 1/2000 | Colin et al. |
| 6,018,616 A | 1/2000 | Schaper et al. |
| 6,043,080 A | 3/2000 | Lipshutz et al. |
| 6,046,056 A | 4/2000 | Parce et al. |
| 6,048,498 A | 4/2000 | Kennedy |
| 6,062,261 A | 5/2000 | Jacobson et al. |
| 6,069,392 A | 5/2000 | Tai et al. |
| 6,094,274 A | 7/2000 | Yokoi |
| 6,103,537 A | 8/2000 | Ullman et al. |
| 6,107,044 A | 8/2000 | Nikiforov |
| 6,123,769 A | 9/2000 | Sanjoh |
| 6,132,580 A | 10/2000 | Mathies et al. |
| 6,132,685 A | 10/2000 | Kercso et al. |
| 6,136,212 A | 10/2000 | Mastrangelo et al. |
| 6,146,842 A | 11/2000 | Josiah et al. |
| 6,150,119 A | 11/2000 | Kopf-Sill et al. |
| 6,150,180 A | 11/2000 | Parce et al. |
| 6,155,282 A | 12/2000 | Zachary et al. |
| 6,165,694 A | 12/2000 | Liu |
| 6,167,910 B1 | 1/2001 | Chow |
| 6,168,948 B1 | 1/2001 | Anderson et al. |
| 6,171,850 B1 | 1/2001 | Nagle et al. |
| 6,174,365 B1 | 1/2001 | Sanjoh |
| 6,174,675 B1 | 1/2001 | Chow et al. |
| 6,186,660 B1 | 2/2001 | Kopf-Sill et al. |
| 6,197,595 B1 | 3/2001 | Anderson et al. |
| 6,214,246 B1 | 4/2001 | Craighead |
| 6,221,483 B1 | 4/2001 | Hilston et al. |
| 6,221,654 B1 | 4/2001 | Quake et al. |
| 6,225,109 B1 | 5/2001 | Juncosa et al. |
| 6,225,243 B1 | 5/2001 | Austin |
| 6,227,809 B1 | 5/2001 | Forster et al. |
| 6,235,471 B1 | 5/2001 | Knapp et al. |
| 6,261,431 B1 | 7/2001 | Mathies et al. |
| 6,264,892 B1 | 7/2001 | Kaltenbach et al. |
| 6,296,673 B1 | 10/2001 | Santarsiero et al. |
| 6,306,659 B1 | 10/2001 | Parce et al. |
| 6,321,791 B1 | 11/2001 | Chow |
| 6,344,325 B1 | 2/2002 | Quake et al. |
| 6,345,502 B1 | 2/2002 | Tai et al. |
| 6,355,420 B1 | 3/2002 | Chan |
| 6,361,671 B1 | 3/2002 | Mathies et al. |
| 6,395,232 B1 | 5/2002 | McBride |
| 6,408,878 B2 | 6/2002 | Unger et al. |
| 6,409,832 B2 | 6/2002 | Weigl et al. |
| 6,436,529 B1 | 8/2002 | Deeb et al. |
| 6,448,090 B1 | 9/2002 | McBride |
| 6,454,924 B2 | 9/2002 | Jedrzejewski et al. |
| 6,503,757 B1 | 1/2003 | Chow |
| 6,540,895 B1 | 4/2003 | Spence et al. |
| 6,582,969 B1 | 6/2003 | Wagner et al. |
| 6,585,939 B1 | 7/2003 | Dapprich |
| 6,664,104 B2 | 12/2003 | Pourahmadi et al. |
| 6,709,604 B2 | 3/2004 | Tai et al. |
| 6,719,840 B2 | 4/2004 | David et al. |
| 6,767,706 B2 | 7/2004 | Quake et al. |
| 6,793,753 B2 | 9/2004 | Unger et al. |
| 6,797,056 B2 | 9/2004 | David |
| 6,885,982 B2 | 4/2005 | Harris et al. |
| 6,893,879 B2 | 5/2005 | Petersen et al. |
| 6,899,137 B2 | 5/2005 | Unger et al. |
| 6,929,030 B2 | 8/2005 | Unger et al. |
| 6,939,452 B2 | 9/2005 | Foret et al. |
| 6,951,632 B2 | 10/2005 | Unger et al. |
| 6,977,145 B2 | 12/2005 | Fouillet et al. |
| 7,042,649 B2 | 5/2006 | Quake et al. |
| 7,052,545 B2 | 5/2006 | Quake et al. |
| 7,059,348 B2 | 6/2006 | Nat |
| 7,062,418 B2 | 6/2006 | Lee et al. |
| 7,097,809 B2 | 8/2006 | Dam et al. |
| 7,144,616 B1 | 12/2006 | Unger et al. |
| 7,161,736 B2 | 1/2007 | Legrand et al. |

| | | |
|---|---|---|
| 7,192,629 B2 | 3/2007 | Lammertink et al. |
| 7,195,670 B2 | 3/2007 | Quake et al. |
| 7,217,367 B2 | 5/2007 | Huang et al. |
| 7,232,109 B2 | 6/2007 | Driggs et al. |
| 7,248,413 B2 | 7/2007 | Quake et al. |
| 7,262,923 B2 | 8/2007 | Quake et al. |
| 7,279,146 B2 | 10/2007 | Nassef |
| 7,291,512 B2 | 11/2007 | Unger |
| 7,294,503 B2 | 11/2007 | Quake et al. |
| 7,368,163 B2 | 5/2008 | Huang et al. |
| 7,442,556 B2 | 10/2008 | Manger et al. |
| 7,476,363 B2 | 1/2009 | Unger et al. |
| 7,526,741 B2 | 4/2009 | Lee et al. |
| 7,604,965 B2 | 10/2009 | McBride et al. |
| 7,666,361 B2 | 2/2010 | McBride et al. |
| 7,678,547 B2 | 3/2010 | Eyal et al. |
| 7,691,333 B2 | 4/2010 | McBride et al. |
| 7,749,737 B2 | 7/2010 | McBride et al. |
| 7,792,345 B2 | 9/2010 | Taylor et al. |
| 7,815,868 B1 | 10/2010 | Jones et al. |
| 7,820,427 B2 | 10/2010 | Unger et al. |
| 7,833,708 B2 | 11/2010 | Enzelberger et al. |
| 7,837,946 B2 | 11/2010 | McBride et al. |
| 2001/0027745 A1 | 10/2001 | Weigl et al. |
| 2001/0033796 A1 | 10/2001 | Unger et al. |
| 2001/0041357 A1 | 11/2001 | Fouillet et al. |
| 2001/0054778 A1 | 12/2001 | Unger et al. |
| 2002/0037499 A1 | 3/2002 | Quake et al. |
| 2002/0064885 A1 | 5/2002 | Bedingham et al. |
| 2002/0124896 A1 | 9/2002 | O'Connor et al. |
| 2002/0144738 A1 | 10/2002 | Unger et al. |
| 2002/0191048 A1 | 12/2002 | Mutz et al. |
| 2002/0195050 A1 | 12/2002 | David |
| 2002/0197603 A1 | 12/2002 | Chow et al. |
| 2003/0008308 A1 | 1/2003 | Enzelberger et al. |
| 2003/0027225 A1 | 2/2003 | Wada et al. |
| 2003/0061687 A1 | 4/2003 | Hansen et al. |
| 2003/0096310 A1 | 5/2003 | Hansen et al. |
| 2003/0138829 A1 | 7/2003 | Unger et al. |
| 2003/0143120 A1 | 7/2003 | Ruediger et al. |
| 2003/0175947 A1 | 9/2003 | Liu et al. |
| 2003/0196695 A1 | 10/2003 | O'Connor et al. |
| 2004/0115731 A1 | 6/2004 | Hansen et al. |
| 2004/0141887 A1 | 7/2004 | Mainquist et al. |
| 2004/0180377 A1 | 9/2004 | Manger et al. |
| 2004/0203055 A1 | 10/2004 | Kennedy et al. |
| 2004/0229349 A1* | 11/2004 | Daridon ............ 435/305.2 |
| 2005/0019792 A1 | 1/2005 | McBride et al. |
| 2005/0019794 A1 | 1/2005 | Nassef et al. |
| 2005/0053952 A1 | 3/2005 | Hong et al. |
| 2005/0062196 A1 | 3/2005 | Hansen et al. |
| 2005/0112882 A1 | 5/2005 | Unger et al. |
| 2005/0164376 A1* | 7/2005 | Balagadde et al. ...... 435/289.1 |
| 2005/0166980 A1 | 8/2005 | Unger et al. |
| 2005/0201901 A1 | 9/2005 | Grossman et al. |
| 2005/0205005 A1 | 9/2005 | Hansen et al. |
| 2005/0214173 A1 | 9/2005 | Facer et al. |
| 2005/0221373 A1 | 10/2005 | Enzelberger et al. |
| 2005/0226742 A1 | 10/2005 | Unger et al. |
| 2005/0229839 A1 | 10/2005 | Quake et al. |
| 2005/0282175 A1 | 12/2005 | Taylor et al. |
| 2006/0151322 A1 | 7/2006 | Knebel et al. |
| 2006/0172408 A1 | 8/2006 | Quake et al. |
| 2006/0233674 A1 | 10/2006 | Nelson |
| 2006/0281183 A1 | 12/2006 | Sun et al. |
| 2007/0134807 A1 | 6/2007 | Bao et al. |
| 2007/0224617 A1 | 9/2007 | Quake et al. |
| 2007/0248971 A1 | 10/2007 | Maerkl et al. |
| 2008/0050283 A1 | 2/2008 | Chou et al. |
| 2008/0075380 A1 | 3/2008 | Dube et al. |
| 2008/0108063 A1 | 5/2008 | Lucero et al. |
| 2008/0129736 A1 | 6/2008 | Sun et al. |
| 2008/0176211 A1 | 7/2008 | Spence et al. |
| 2008/0223721 A1 | 9/2008 | Cohen et al. |
| 2008/0230387 A1 | 9/2008 | McBride et al. |
| 2008/0264863 A1 | 10/2008 | Quake et al. |
| 2008/0274493 A1 | 11/2008 | Quake et al. |
| 2008/0281090 A1 | 11/2008 | Lee et al. |
| 2008/0292504 A1 | 11/2008 | Goodsaid et al. |
| 2009/0018195 A1 | 1/2009 | Balagadde et al. |
| 2009/0069194 A1 | 3/2009 | Ramakrishnan |
| 2009/0142236 A1 | 6/2009 | Unger et al. |
| 2009/0147918 A1 | 6/2009 | Fowler et al. |
| 2009/0168066 A1 | 7/2009 | Hansen et al. |
| 2009/0239308 A1 | 9/2009 | Dube et al. |
| 2009/0291435 A1 | 11/2009 | Unger et al. |
| 2010/0104477 A1 | 4/2010 | Liu et al. |
| 2010/0120018 A1 | 5/2010 | Quake et al. |
| 2010/0120077 A1 | 5/2010 | Daridon |
| 2010/0154890 A1 | 6/2010 | Maerkl et al. |
| 2010/0166608 A1 | 7/2010 | Quan et al. |
| 2010/0171954 A1 | 7/2010 | Quake et al. |
| 2010/0183481 A1 | 7/2010 | Facer et al. |
| 2010/0184202 A1 | 7/2010 | McBride et al. |
| 2010/0187105 A1 | 7/2010 | Unger et al. |
| 2010/0196892 A1 | 8/2010 | Quake et al. |
| 2010/0197522 A1 | 8/2010 | Liu et al. |
| 2010/0200782 A1 | 8/2010 | Unger et al. |
| 2010/0230613 A1 | 9/2010 | Pieprzyk et al. |
| 2010/0263732 A1 | 10/2010 | Hansen et al. |
| 2010/0263757 A1 | 10/2010 | Fernandes et al. |
| 2010/0311060 A1 | 12/2010 | Facer et al. |
| 2010/0320364 A1 | 12/2010 | Unger et al. |

FOREIGN PATENT DOCUMENTS

| | | |
|---|---|---|
| EP | 0 579 997 A1 | 1/1994 |
| EP | 0 592 094 A2 | 4/1994 |
| EP | 0 703 364 A1 | 3/1996 |
| EP | 0 706 004 A2 | 4/1996 |
| EP | 0 779 436 A2 | 6/1997 |
| EP | 0 829 360 A2 | 3/1998 |
| EP | 0 845 603 A1 | 6/1998 |
| EP | 0 999 055 A2 | 5/2000 |
| GB | 2 155 152 A | 9/1985 |
| GB | 2 308 460 A | 6/1997 |
| WO | WO 90/15070 A1 | 12/1990 |
| WO | WO 92/16657 A1 | 10/1992 |
| WO | WO 96/27025 A1 | 9/1996 |
| WO | WO 97/27324 A1 | 7/1997 |
| WO | WO 98/00231 A1 | 1/1998 |
| WO | WO 98/04742 A1 | 2/1998 |
| WO | WO 98/07069 A1 | 2/1998 |
| WO | WO 98/45481 A1 | 10/1998 |
| WO | WO 99/00655 A2 | 1/1999 |
| WO | WO 99/04361 A1 | 1/1999 |
| WO | WO 99/14311 A1 | 3/1999 |
| WO | WO 99/17093 A1 | 4/1999 |
| WO | WO 99/52633 A1 | 10/1999 |
| WO | WO 99/61888 A2 | 12/1999 |
| WO | WO 00/00678 A1 | 1/2000 |
| WO | WO 00/43748 A1 | 7/2000 |
| WO | WO 00/53801 A1 | 9/2000 |
| WO | WO 00/60345 A1 | 10/2000 |
| WO | WO 00/68414 A2 | 11/2000 |
| WO | WO 00/70082 A1 | 11/2000 |
| WO | WO 01/01025 A2 | 1/2001 |
| WO | WO 01/07061 A1 | 2/2001 |
| WO | WO 01/09595 A2 | 2/2001 |
| WO | WO 01/09595 A3 | 2/2001 |
| WO | WO 01/24937 A2 | 4/2001 |
| WO | WO 01/32930 A1 | 5/2001 |
| WO | WO 01/67369 A2 | 9/2001 |
| WO | WO 02/00343 A2 | 1/2002 |
| WO | WO 02/29106 A2 | 4/2002 |
| WO | WO 02/30486 A2 | 4/2002 |
| WO | WO 02/40874 A1 | 5/2002 |
| WO | WO 02/43615 A2 | 6/2002 |
| WO | WO 02/065005 A1 | 8/2002 |
| WO | WO 02/072892 A1 | 9/2002 |
| WO | WO 02/081729 A2 | 10/2002 |
| WO | WO 02/081935 A2 | 10/2002 |
| WO | WO 03/048295 A1 | 6/2003 |
| WO | WO 2004/065009 A1 | 8/2004 |
| WO | WO 2007/033385 A2 | 3/2007 |
| WO | WO 2007/044091 A2 | 4/2007 |
| WO | WO 2008/043046 A2 | 4/2008 |
| WO | WO 2009/100449 A1 | 8/2009 |

| WO | WO 2010/011852 A1 | 1/2010 |
| WO | WO 2010/017210 A1 | 2/2010 |
| WO | WO 2010/077618 A1 | 7/2010 |

OTHER PUBLICATIONS

"Biochips," Nature Biotechnology, vol. 18, Supplement 2000, pp. IT43-IT44, 2000.

"Chapter 9: Microfluidic Devices," Micromachined Transducers Sourcebook, pp. 779-882, 1998.

Abola, Enrique et al., "Automation of X-Ray Crystallography," Nature Structural Biology, Structural Genomics Supplement, pp. 973-977, Nov. 2000.

Affholter, Joseph et al., "Engineering a Revolution," Chemistry in Britain, pp. 48-51, Apr. 1999.

Ahn, Chong H. et al., "Fluid Micropumps Based on Rotary Magnetic Actuators," Proceedings of 1995 IEEE Micro Electro Mechanical Systems Workshop (MEMS '95), Amsterdam, Netherlands, pp. 408-412, Jan. 29-Feb. 2, 1995.

Allcock, Harry R. et al., Contemporary Polymer Chemistry, Second Edition, pp. cover, 9-11, (1990).

Andersen, Gregers Rom et al., "A Spreadsheet Approach to Automated Protein Crystallization," Journal of Applied Crystallography, vol. 29, pp. 236-240, 1996.

Anderson, Rolfe C. et al., "Microfluidic Biochemical Analysis System," Transducers '97, 1997 International Conference on Solid-State Sensors and Actuators, Chicago, Illinois, pp. 477-480, Jun. 16-19, 1997.

Andersson et al., "Consecutive Microcontact Printing—Ligands for Asymmetric Catalysis in Silicon Channel," Sensors & Actuators B, vol. 3997, pp. 1-7, 2001.

Angell, James B. et al., "Silicon Micromechanical Devices," Scientific American, pp. cover, 44-55, Apr. 1983.

Applied Biosystems, "TaqMan® PCR Reagent Kit With AmpliTaq Gold® DNA Polymerase Protocol," Jan. 2003.

Armani, Deniz et al., "Re-Configurable Fluid Circuits by PDMS Elastomer Micromachining," IEEE Int. Conf. Micro Electro Mech. Syst. Tech. Digest, vol. 12, pp. 222-227, 1999.

Arnold, Frances H., "Design by Directed Evolution," Accounts of Chemical Research, vol. 31, No. 3, pp. 125-131, 1998.

Ashkin, A. et al., "Optical Trapping and Manipulation of Single Cells Using Infrared Laser Beams," Nature, vol. 330, No. 24, pp. 769-771, Dec. 31, 1987.

Ashkin, A. et al., "Optical Trapping and Manipulation of Viruses and Bacteria," Science, vol. 235, pp. 1517-1520, Mar. 20, 1987.

Axelrod, Daniel, "Cell-Substrate Contacts Illuminated by Total Internal Reflection Fluorescence," Journal of Cell Biology, vol. 89, pp. 141-145, Apr. 1981.

Ballantyne, J. P. et al., "Selective Area Metallization by Electron-Beam Controlled Direct Metallic Deposition," J. Vac. Sci. Technol., vol. 10, No. 6, pp. 1094-1097, Nov. 1973.

Belgrader et al., "PCR Detection of Bacteria in Seven Minutes," Science, 284(5413), pp. 449-450, 1999.

Belgrader, Phillip et al., "Rapid Pathogen Detection Using a Microchip PCR Array Instrument," Clinical Chemistry, vol. 44, No. 10, pp. 2191-2194, 1998.

Benard, W. L. et al., "A Titanium-Nickel Shape-Memory Alloy Actuated Micropump," Transducers '97, 1997 International Conference on Solid-State Sensors and Actuators, Chicago, Illinois, pp. 361-364, Jun. 16-19, 1997.

Berry, Michael B., "Protein Crystallization: Theory and Practice," Excerpts from Doctoral Thesis, 36 pages, Sep. 17, 1995.

Black, Harvey, "Tiny Technology Promises Tremendous Profits," The Scientist, vol. 15, No. 21, 4 pages, Oct. 29, 2001.

Bloomstein, T. M. et al., "Laser-Chemical 3-D Micromachining," Mat. Res. Soc. Symp. Proc., vol. 282, pp. 165-171, 1993.

Bloomstein, T. M. et al., "Laser-Chemical Three-Dimensional Writing of Multimaterial Structures for Microelectromechanics," IEEE, pp. 202-203, 1991.

Bloomstein, T. M. et al., "Laser-Chemical Three-Dimensional Writing for Microelectromechanics and Application to Standard-Cell Microfluidics," J. Vac. Sci. Technol. B, vol. 10, No. 6, pp. 2671-2674, Nov. 1992.

Bousse, Luc et al., "Electrokinetically Controlled Microfluidic Analysis Systems," Annu. Rev. Biophys. Biomol. Struct., vol. 29, pp. 155-181, 2000.

Brechtel, R. et al., "Control of the Electroosmotic Flow by Metal-Salt-Containing Buffers," Journal of Chromatography A, vol. 716, pp. 97-105, 1995.

Brush, Michael, "Automated Laboratories," The Scientist, vol. 13, No. 4, 10 pages, Feb. 15, 1999.

Bryzek, Janusz et al., "Micromachines on the March", IEEE Spectrum, vol. 31, No. 5, pp. 20-31, May 1994.

Buchaillot, Lionel et al., "Silicon Nitride Thin Films Young's Modulus Determination by an Optical Non Destructive Method," Jpn. J. Appl. Phys., vol. 36, Part 2, No. 6B, pp. L794-L797, Jun. 15, 1997.

Buican, Tudor N. et al., "Automated Single-Cell Manipulation and Sorting by Light Trapping," Applied Optics, vol. 26, No. 24, pp. 5311-5316, Dec. 15, 1987.

Burbaum, Jonathan J. et al., "New Technologies for High-Throughput Screening," Current Opinion in Chemical Biology, vol. 1, pp. 72-78, 1997.

Burns et al., "An Integrated Nanoliter DNA Analysis Device," Science, vol. 282, pp. 484-487, 1998.

Calkins, Kathryn, "Mycometrix: Rubber Chips," BioCentury, 2 pages, Oct. 16, 2000.

Carter, Charles W. Jr. et al., "Protein Crystallization Using Incomplete Factorial Experiments," Journal of Biological Chemistry, vol. 254, No. 23, pp. 12219-12223, Dec. 10, 1979.

Carter, Charles W. Jr. et al., "Statistical Design of Experiments for Protein Crystal Growth and the Use of a Precrystallization Assay," Journal of Crystal Growth, vol. 90, pp. 60-73, 1988.

Chang, Jun Keun et al., "Functional Integration of Serial Dilution and Capillary Electrophoresis on a PDMS Microchip," Biotechnology and Bioprocess Engineering, vol. 8, No. 4, pp. 233-239, 2003.

Chaudhari et al., "Transient Liquid Crystal Thermometry of Microfabricated PCR Vessel Arrays," J. Microelectromechanical Systems, 7(4), pp. 345-355, 1998.

Chayen, Naomi E., "A Novel Technique to Control the Rate of Vapour Diffusion, Giving Larger Protein Crystals," Journal of Applied Crystallography, vol. 30, pp. 198-202, 1997.

Chayen, Naomi E., "Comparative Studies of Protein Crystallization by Vapour-Diffusion and Microbatch Techniques," Acta Cryst., vol. D54, pp. 8-15, 1998.

Chayen, Naomi E., "Protein Crystallization for Genomics: Throughput Versus Output," Journal of Structural and Functional Genomics, vol. 4, pp. 115-120, 2003.

Chayen, Naomi E., "The Role of Oil in Macromolecular Crystallisation," Structure, vol. 5, pp. 1269-1274, Oct. 15, 1997.

Chen, Chihchen et al., "Gray-Scale Photolithography Using Microfluidic Photomasks," PNAS, vol. 100, No. 4, pp. 1499-1504, Feb. 18, 2003.

Chiou et al., "A Closed-Cycle Capillary Polymerase Chain," Anal. Chem., vol. 73, pp. 2018-2021, 2001.

Chiu, Daniel T. et al., "Patterned Deposition of Cells and Proteins Onto Surfaces by Using Three-Dimensional Microfluidic Systems," PNAS, vol. 97, No. 6, pp. 2408-2413, Mar. 14, 2000.

Chou, Hou-Pu et al., "A Microfabricated Device for Sizing and Sorting DNA Molecules," Proc. Natl. Acad. Sci., vol. 96, pp. 11-13, Jan. 1999.

Chou, Hou-Pu et al., "A Microfabricated Rotary Pump," Biomedical Microdevices, vol. 3, No. 4, pp. 323-330, 2001.

Chou, Hou-Pu et al., "Disposable Microdevices for DNA Analysis and Cell Sorting," Proc. Solid-State Sensor and Actuator Workshop, Hilton Head, South Carolina, pp. 11-14, Jun. 8-11, 1998.

Chou, Hou-Pu et al., "Integrated Elastomer Fluidic Lab-On-A-Chip-Surface Patterning and DNA Diagnostics," Proceedings of the Solid State Actuator and Sensor Workshop, Hilton Head, South Carolina, 4 pages, 2000.

Chou, Hou-Pu et al., "Microfabricated Devices for Sizing DNA and Sorting Cells," Micro- and Nanofabricated Structures and Devices for Biomedical Environmental Applications, Proceedings of SPIE, vol. 3258, pp. 181-187, 1998.

Chou, Hou-Pu et al., "Multiple Disease Diagnostics on a Single Chip," Biophysics Lab, Caltech, pp. 1-4, Mar. 1, 2000.

Cox, M. Jane et al., "Experiments With Automated Protein Crystallization," J. Appl. Cryst., vol. 20, pp. 366-373, 1987.
D'Arcy, Allan et al., "The Advantages of Using a Modified Microbatch Method for Rapid Screening of Protein Crystallization Conditions," Acta Crystallographica, vol. D59, pp. 1-3, 2003.
Davila, Herman Moreno, "Molecular and Functional Diversity of Voltage-Gated Calcium Channels," Annals of the New York Academy of Sciences, vol. 868, pp. cover, 102-117, 1999.
Delamarche, Emmanuel et al., "Patterned Delivery of Immunoglobulins to Surfaces Using Microfluidic Networks," Science, vol. 276, pp. 779-781, May 2, 1997.
Ducruix A. et al., "Crystallization of Nucleic Acids and Proteins—A Practical Approach," IRL Press, pp. 2 cover pages and 73-98, 1992.
Duffy, David C. et al., "Patterning Electroluminescent Materials With Feature Sizes as Small as 5 μm Using Elastomeric Membranes as Masks for Dry Lift-Off," Advanced Materials, vol. 11, No. 7, pp. 546-552, 1999.
Duffy, David C. et al., "Rapid Prototyping of Microfluidic Switches in Poly(dimethyl siloxane) and Their Actuation by Electro-Osmotic Flow," J. Micromech. Microeng., vol. 9, pp. 211-217, 1999.
Duffy, David C. et al., "Rapid Prototyping of Microfluidic Systems in Poly(dimethylsiloxane)," Analytical Chemistry, vol. 70, No. 23, pp. 4974-4984, Dec. 1, 1998.
Effenhauser, Carlo S. et al., "Integrated Capillary Electrophoresis on Flexible Silicone Microdevices: Analysis of DNA Restriction Fragments and Detection of Single DNA Molecules on Microchips," Analytical Chemistry, vol. 69, No. 17, pp. 3451-3457, Sep. 1, 1997.
Effenhauser, Carlo S. et al., "Integrated Chip-Based Capillary Electrophoresis," Electrophoresis, vol. 18, pp. 2203-2213, 1997.
Eiselé, Jean-Luc, "Preparation of Protein Crystallization Buffers With a Computer-Controlled Motorized Pipette—PIPEX," J. Appl. Cryst., vol. 26, pp. 92-96, 1993.
Erlich, H.A., PCR Technology, Basic Methodology: Stockton Press, New York, pp. 1-5, 1989.
Eyal, Shulamit et al., "Velocity-Independent Microfluidic Flow Cytometry," Electrophoresis, vol. 23, pp. 2653-2657, 2002.
Fahrenberg, J. et al., "A Microvalve System Fabricated by Thermoplastic Molding," J. Micromech. Microeng., vol. 5, pp. 169-171, 1995.
Fenna, R. E., "Crystallization of Human α-Lactalbumin," J. Mol. Biol., vol. 161, pp. 211-215, 1982.
Fettinger, J. C. et al., "Stacked Modules for Micro Flow Systems in Chemical Analysis: Concept and Studies Using an Enlarged Model," Sensors and Actuators B, vol. 17, pp. 19-25, 1993.
Fitzgerald, Deborah A., "Making Every Nanoliter Count," The Scientist, vol. 15, No. 21, 8 pages, Oct. 29, 2001.
Folch, A. et al., "Molding of Deep Polydimethylsiloxane Microstructures for Microfluidics and Biological Applications," Journal of Biomechanical Engineering, vol. 121, pp. 28-34, Feb. 1999.
Fox, Kristin M. et al., "Crystallization of Old Yellow Enzyme Illustrates an Effective Strategy for Increasing Protein Crystal Size," J. Mol. Biol., vol. 234, pp. 502-507, 1993.
Fu, Anne Y. et al., "A Microfabricated Fluorescence-Activated Cell-Sorter," Nature Biotechnology, vol. 17, pp. 1109-1111, Nov. 1999.
Fu, Anne Y. et al., "An Integrated Microfabricated Cell Sorter," Analytical Chemistry, vol. 74, No. 11, pp. 2451-2457, Jun. 1, 2002.
Galambos, Paul et al., "Electrical and Fluidic Packaging of Surface Micromachined Electro-Microfluidic Devices," 8 pages, (2000).
Gao, Jun et al., "Integrated Microfluidic System Enabling Protein Digestion, Peptide Separation, and Protein Identification," Analytical Chemistry, vol. 73, No. 11, pp. 2648-2655, Jun. 1, 2001.
García-Ruiz, J. M. et al., "Agarose as Crystallization Media for Proteins I: Transport Processes," Journal of Crystal Growth, vol. 232, pp. 165-172, 2001.
García-Ruiz, J. M. et al., "Investigations on Protein Crystal Growth by the Gel Acupuncture Method," Acta Cryst., vol. D50, pp. 484-490, 1994.
Garno, Jayne C. et al., "Production of Periodic Arrays of Protein Nanostructures Using Particle Lithography," Langmuir, vol. 18, No. 21, pp. 8186-8192, 2002.
Gass, V. et al., "Integrated Flow-Regulated Silicon Micropump," Sensors and Actuators A, vol. 43, pp. 335-338, 1994.
Gerlach, Torsten, "Pumping Gases by a Silicon Micro Pump With Dynamic Passive Valves," Transducers '97, 1997 International Conference on Solid-State Sensors and Actuators, Chicago, Illinois, pp. 357-360, Jun. 16-19, 1997.
Goll, C. et al., "Microvalves With Bistable Buckled Polymer Diaphragms," J. Micromech. Microeng., vol. 6, pp. 77-79, 1996.
Gonzalez, Jesus E. et al., "Improved Indicators of Cell Membrane Potential That Use Fluorescence Resonance Energy Transfer," Chemistry & Biology, vol. 4, No. 4, pp. 269-277, Apr. 1997.
Gravesen, Peter et al., "Microfluidics—A Review," J. Micromech. Microeng., vol. 3, pp. 168-192, 1993.
Greene, Chana, "Characterizing the Properties of PDMS," pp. 1-11, Summer 2000.
Grover, William H. et al., "Monolithic Membrane Valves and Diaphragm Pumps for Practical Large-Scale Integration Into Glass Microfluidic Devices," Sensors and Actuators B, vol. 89, pp. 315-323, 2003.
Guérin, L. J. et al., "Simple and Low Cost Fabrication of Embedded Micro-Channels by Using a New Thick-Film Photoplastic," Transducers '97, 1997 International Conference on Solid-State Sensors and Actuators, Chicago, Illinois, pp. 1419-1422, Jun. 18-19, 1997.
Hanes, Jozef, et al., "In Vitro Selection and Evolution of Functional Proteins by Using Ribosome Display," Proc. Natl. Acad. Sci. USA, vol. 94, pp. 4937-4942, May 1997.
Hansen, Carl et al., "Crystallography in Drug Discovery," Feb. 20, 2004, Chapter 11, pp. 238-245.
Hansen, Carl. L. et al., "A Robust and Scalable Microfluidic Metering Method That Allows Protein Crystal Growth by Free Interface Diffusion," PNAS, vol. 99, No. 26, pp. 16531-16536, Dec. 24, 2002.
Hansen, Carl. L. et al., "Systematic Investigation of Protein-Phase Behavior With a Microfluidic Formulator," PNAS Early Edition, 6 pages, 2004.
Harrison, D. Jed et al., "Micromachining a Miniaturized Capillary Electrophoresis-Based Chemical Analysis System on a Chip," Science, vol. 261, pp. 895-897, Aug. 13, 1993.
Hermanson, Greg T. et al., "Chapter 2—Activation Methods," Immobilized Affinity Ligand Techniques, Academic Press, pp. 2 cover pages, 51-136, 1992.
Hicks, Jennifer, "Genetics and Drug Discovery Dominate Microarray Research," R&D Magazine, pp. 28-33, Feb. 1999.
Hoffmuller, Ulrich et al., "In Vitro Evolution and Selection of Proteins: Ribosome Display for Larger Libraries," Angew. Chem. Int. Ed., vol. 37, No. 23, pp. 3241-3243, 1998.
Hofmann, Oliver et al., "Modular Approach to Fabrication of Three-Dimensional Microchannel Systems in PDMS—Application to Sheath Flow Microchips," Lab on a Chip, vol. 1, pp. 108-114, 2001.
Hong et al., "Integration of Gene Amplification and Capillary Gel Electrophoresis on a Polydimethylsiloxane-Glass Hybrid Microchip," Electrophoresis, vol. 22, pp. 328-333, 2001.
Hong, Jong Wook et al., "A Nanoliter-Scale Nucleic Acid Processor With Parallel Architecture," Nature Biotechnology, vol. 22, No. 4, pp. 1-5, Apr. 2004.
Horn, Howard, "Lab Chips Sector: Microtechnologies Are Changing Healthcare and More," Life Sciences, pp. 19-21, Mar. 20, 2001.
Hornbeck, Larry J. et al., "Bistable Deformable Mirror Device," Spatial Light Modulators and Applications 1988 Technical Digest Series, vol. 8, Postconference Edition, pp. cover, 107-110, Jun. 15-17, 1988.
Hosokawa, Kazuo et al., "A Microfluidic Device for Mixing of Capillary-Driven Liquids," IEEJ Trans. SM, vol. 123, No. 1, pp. 23-24, 2003.
Hosokawa, Kazuo et al., "Handling of Picoliter Liquid Samples in a Poly(dimethylsiloxane)-Based Microfluidic Device," Analytical Chemistry, vol. 71, No. 20, pp. 4781-4785, Oct. 15, 1999.
Ibrahim et al., "Real-Time Microchip PCR for Detecting Single-Base Differences in Viral and Human DNA," Anal. Chem., vol. 70, pp. 2013-2017, 1998.
Ikuta, Koji et al., "Three Dimensional Micro Integrated Fluid Systems (MIFS) Fabricated by Stereo Lithography," IEEE, pp. 1-6, 1994.
Jacobson, Ken et al., "International Workshop on the Application of Fluorescence Photobleaching Techniques to Problems in Cell Biology," Federation Proceedings, vol. 42, No. 1, pp. 72-79, Jan. 1983.

Jacobson, Stephen C. et al., "High-Speed Separations on a Microchip," Analytical Chemistry, vol. 66, No. 7, pp. 1114-1118, Apr. 1, 1994.

Jacobson, Stephen C. et al., "Microfluidic Devices for Electrokinetically Driven Parallel and Serial Mixing," Analytical Chemistry, vol. 71, No. 20, pp. 4455-4459, Oct. 15, 1999.

Jerman, Hal, "Electrically-Activated, Normally-Closed Diaphragm Valves," Transducers '91, 1991 International Conference on Solid-State Sensors and Actuators, pp. cover, 1045-1048, 1991.

Jo, Byung-Ho et al., "Fabrication of Three-Dimensional Microfluidic Systems by Stacking Molded Polydimethylsiloxane (PDMS) Layers" SPIE, vol. 3877, pp. 222-229, Sep. 1999.

Jo, Byung-Ho et al., "Three-Dimensional Micro-Channel Fabrication in Polydimethylsiloxane (PDMS) Elastomer," Journal of Microelectromechanical Systems, vol. 9, No. 1, pp. 76-81, Mar. 2000.

Juárez-Martínez, G. et al., "High-Throughput Screens for Postgenomics: Studies of Protein Crystallization Using Microsystems Technology," Analytical Chemistry, vol. 74, No. 14, pp. 3505-3510, Jul. 15, 2002.

Judy, J.W., "Surface-machined micromechanical membrane pump." Micro Electro Mechanical Sysitems, 1991, MEMS '91, Proceedings. An Investigation of Micro Structures, Sensors, Actuators, Machines and Robots. IEEE Jan. 30-Feb. 2, 1991: http://ieeexplore.ieee.org/xpls/abs_all.jsp?arnynber=114792.

Jung, D. R. et al., "Chemical and Physical Interactions at Metal/Self-Assembled Organic Monolayer Interfaces," pp. 1-54, 1994.

Kagan, C. R., "Organic-Inorganic Hybrid Materials as Semiconducting Channels in Thin-Film Field-Effect Transistors," Science, vol. 286, pp. 945-947, Oct. 29, 1999.

Kamentsky, Louis A. et al., "Spectrophotometer: New Instrument for Ultrarapid Cell Analysis," Science, vol. 150, pp. 630-631, Oct. 29, 1965.

Kamholz, Andrew Evan et al., "Quantitative Analysis of Molecular Interaction in a Microfluidic Channel: The T-Sensor," Analytical Chemistry, vol. 71, No. 23, pp. 5340-5347, Dec. 1, 1999.

Kane et al., "Finite element analysis of nonsmooth contact", *Computer Methods in Applied Mechanics and Engineering*, 180(1-2):1-26 (1999).

Kapur, Ravi et al., "Fabrication and Selective Surface Modification of 3-Dimensionally Textured Biomedical Polymers From Etched Silicon Substrates," Journal of Biomedical Materials Research, vol. 33, pp. 205-216, 1996.

Kenis, Paul J. A. et al., "Microfabrication Inside Capillaries Using Multiphase Laminar Flow Patterning," Science, vol. 285, pp. 83-85, Jul. 2, 1999.

Khandurina et al., "Integrated System for Rapid PCR-Based DNA Analysis in Microfluidic Devices," Anal. Chem., vol. 72, pp. 2995-3000, 2000.

Khoo, Melvin et al., "A Novel Micromachined Magnetic Membrane Microfluid Pump," pp. 1-4, (2000).

Kim, Enoch et al., "Micromolding in Capillaries: Applications in Materials Science," J. Am. Chem. Soc., vol. 118, No. 24, pp. 5722-5731, 1996.

Kim, Enoch et al., "Polymer Microstructures Formed by Moulding in Capillaries," Nature, vol. 376, pp. 581-584, Aug. 17, 1995.

Kirk-Othmer, "Concise Encyclopedia of Chemical Technology," John Wiley & Sons, 5 pages, 1985.

Kopp, Martin U. et al., "Chemical Amplification: Continuous-Flow PCR on a Chip," Science, vol. 280, pp. 1046-1048, May 15, 1998.

Kuhn, Lawrence et al., "Silicon Charge Electrode Array for Ink Jet Printing," IEEE Transactions on Electron Devices, vol. ED-25, No. 10, pp. 1257-1260, Oct. 1978.

Kuhn, Peter et al., "The Genesis of High-Throughput Structure-Based Drug Discovery Using Protein Crystallography," Current Opinion in Chemical Biology, vol. 6, pp. 704-710, 2002.

Kumar, Amit et al., "Features of Gold Having Micrometer to Centimeter Dimensions Can Be Formed Through a Combination of Stamping With an Elastomeric Stamp and an Alkanethiol 'Ink' Followed by Chemical Etching," Appl. Phys. Lett., vol. 63, No. 14, pp. 2002-2004, Oct. 4, 1993.

Kumar, Amit et al., "Patterning Self-Assembled Monolayers: Applications in Materials Science," Langmuir, vol. 10, pp. 1498-1511, 1994.

Kunz, R. R. et al., "Applications of Lasers in Microelectronics and Micromechanics," Applied Surface Science, vol. 79/80, pp. 12-24, 1994.

Kwong, Peter D. et al., "Probability Analysis of Variational Crystallization and Its Application to gp120, The Exterior Envelope Glycoprotein of Type 1 Human Immunodeficiency Virus (HIV-1)," Journal of Biological Chemistry, vol. 274, No. 7, pp. 4115-4123, Feb. 12, 1999.

Kwong, Peter D. et al., "Structure of an HIV gp 120 Envelope Glycoprotein in Complex With the CD4 Receptor and a Neutralizing Human Antibody," Nature, vol. 393, pp. 648-659, Jun. 18, 1998.

Lagally, E. T. et al., "Single-Molecule DNA Amplification and Analysis in an Integrated Microfluidic Device," Analytical Chemistry, vol. 73, No. 3, pp. 565-570, Feb. 1, 2001.

Lagally, Eric T. et al., "Fully Integrated PCR-Capillary Electrophoresis Microsystem for DNA Analysis," Lab on a Chip, vol. 1, pp. 102-107, 2001.

Lagally, Eric T. et al., "Monolithic Integrated Microfluidic DNA Amplification and Capillary Electrophoresis Analysis System," Sensors and Actuators B, vol. 63, pp. 138-146, 2000.

Lammerink, T. S. J. et al., "Modular Concept for Fluid Handling Systems," IEEE, pp. 389-394, 1996.

Levine, Leanna M. et al., "Measurement of Specific Protease Activity Utilizing Fluorescence Polarization," Analytical Biochemistry, vol. 247, pp. 83-88, 1997.

Li, Paul C. H. et al., "Transport, Manipulation, and Reaction of Biological Cells On-Chip Using Electrokinetic Effects," Analytical Chemistry, vol. 69, No. 8, pp. 1564-1568, Apr. 15, 1999.

Licklider, Larry et al., "A Micromachined Chip-Based Electrospray Source for Mass Spectrometry," Analytical Chemistry, vol. 72, No. 2, pp. 367-375, Jan. 15, 2000.

Lin, H. et al., "Convective-Diffusive Transport in Protein Crystal Growth," Journal of Crystal Growth, vol. 151, pp. 153-162, 1995.

Lin, L. Y. et al., "Free-Space Micromachined Optical Switches for Optical Networking," IEEE Journal of Selected Topics in Quantum Electronics, vol. 5, No. 1, pp. 4-9, Jan. 1999.

Liu, Jian et al., "A Nanoliter Rotary Device for Polymerase Chain Reaction," Electrophoresis, vol. 23, pp. 1531-1536, 2002.

Llopis, Juan et al., "Ligand-Dependent Interactions of Coactivators Steroid Receptor Coactivator-1 and Peroxisome Proliferator-Activated Receptor Binding Protein With Nuclear Hormone Receptors Can Be Imaged in Live Cells and Are Required for Transcription," PNAS, vol. 97, No. 8, pp. 4363-4368, Apr. 11, 2000.

López-Jaramillo, F. J. et al., "Crystallization and Cryocrystallography Inside X-ray Capillaries," Journal of Applied Crystallography, vol. 34, pp. 365-370, 2001.

Lötters, J C et al., "The Mechanical Properties of the Rubber Elastic Polymer Polydimethylsiloxane for Sensor Applications," J. Micromech. Microeng., vol. 7, pp. 145-147, 1997.

Lucy, Charles A. et al., "Characterization of the Cationic Surfactant Induced Reversal of Electroosmotic Flow in Capillary Electrophoresis," Anal. Chem., vol. 68, pp. 300-305, 1996.

Luft, Joseph R. et al., "A Method to Produce Microseed Stock for Use in the Crystallization of Biological Macromolecules," Acta Cryst., vol. D55, pp. 988-993, 1999.

Luft, Joseph R. et al., "Kinetic Aspects of Macromolecular Crystallization," Methods in Enzymology, vol. 276, pp. 110-131, 1997.

Luft, Joseph R. et al., "Macromolecular Crystallization in a High Throughput Laboratory—The Search Phase," Journal of Crystal Growth, vol. 232, pp. 591-595, 2001.

Luft, Joseph R. et al., "Microbatch Macromolecular Crystallization in Micropipettes—Structure, Function and Genetics," Journal of Crystal Growth, North-Holland Publishing Co., Amsterda, NL, vol. 196, No. 204, pp. 450-455, 1999.

Mahajan, Nupam P. et al., "Novel Mutant Green Fluorescent Protein Protease Substrates Reveal the Activation of Specific Caspases During Apoptosis," Chemistry & Biology, vol. 6, No. 6, pp. 401-409, Jun. 1999.

Maluf, N., "An Introduction to Microelectromechanical Systems Engineering," Artech House Publishers, Boston London, pp. 42-45, Dec. 1999.

Manz, A. et al., "Micromachining of Monocrystalline Silicon and Glass for Chemical Analysis Systems," Trends in Analytical Chemistry, vol. 10, No. 5, pp. 144-149, 1991.

Marshall, SID, "Fundamental Changes Ahead for Lab Instrumentation," R&D Magazine, 5 pages, Feb. 1999.

Marsili, Ray, "Lab-On-A-Chip Poised to Revolutionize Sample Prep," R&D Magazine, 5 pages, Feb. 1999.

McDonald, J. Cooper et al., "Fabrication of Microfluidic Systems in Poly(dimethylsiloxane)," Electrophoresis, vol. 21, pp. 27-40, 2000.

McDonald, J. Cooper et al., "Poly(dimethylsiloxane) as a Material for Fabricating Microfluidic Devices," Accounts of Chemical Research, vol. 35, No. 7, pp. 491-499, 2002.

McPherson, Alexander et al., "Use of Polyethylene Glycol in the Crystallization of Macromolecules," Methods in Enzymology, vol. 114, pp. 120-125, 1985.

McPherson, Alexander, "Crystallization of Macromolecules: General Principles," Methods in Enzymology, vol. 114, pp. 112-120, 1985.

McPherson, Alexander, "Crystallization of Proteins by Variation of pH or Temperature," Methods in Enzymology, vol. 114, pp. 125-127, 1985.

Miller, Teresa Y. et al., "A Comparison Between Protein Crystals Grown With Vapor Diffusion Methods in Microgravity and Protein Crystals Using a Gel Liquid-Liquid Diffusion Ground-Based Method," Journal of Crystal Growth, vol. 122, pp. 306-309, 1992.

Morris, Daniel W. et al., "Automation of Protein Crystallization Trials: Use of a Robot to Deliver Reagents to a Novel Multi-Chamber Vapor Diffusion Plate," BioTechniques, vol. 7, No. 5, pp. 522-527, 1989.

Muller, Richard S. et al., "Surface-Micromachined Microoptical Elements and Systems," Proceedings of the IEEE, vol. 86, No. 8, pp. 1705-1720, Aug. 1998.

Nagai, Yasuo et al., "A Fluorescent Indicator for Visualizing cAMP-Induced Phosphorylation In Vivo," Nature Biotechnology, vol. 18, pp. 313-316, Mar. 2000.

Nakano et al., "High Speed Polymerase Chain Reaction in Constant Flow," Biosci. Biotech. Biochem., 58(2), pp. 349-352, 1994.

Nassuphis, N. et al., "Three-Dimensional Laser Direct Writing: Applications to Multichip Modules," J. Vac. Sci. Technol. B, vol. 12(6), pp. 3294-3299, Nov./Dec. 1994.

Nerad, B. A. et al., "Ground-Based Experiments on the Minimization of Convection During the Growth of Crystals From Solution," Journal of Crystal Growth, vol. 75, pp. 591-608, 1986.

Ng, Jessamine M. K. et al., "Components for Integrated Poly(Dimethylsiloxane) Microfluidic Systems," Electrophoresis, vol. 23, pp. 3461-3473, 2002.

Nollert, Peter et al., "Crystallization of Membrane Proteins *in Cubo*," Methods in Enzymology, vol. 343, pp. 183-199, 2002.

Oakley and Knight, "Adaptive dynamic relaxation algorithm for non-linear hyperelastic structures", *Computer Methods in Applied Mechanics and Engineering*, 126:67-89 (1995).

Ogden, "Elastic Deformations of Rubberlike Solids", in *Mechanics of Solids*, pp. 499-537 (1982).

Oldfield, T. J. et al., "A Flexible Approach to Automated Protein Crystallization," J. Appl. Cryst., vol. 24, pp. 255-260, 1991.

Oleschuk, Richard D. et al., "Analytical Microdevices for Mass Spectrometry," Trends in Analytical Chemistry, vol. 19, No. 6., pp. 379-388, 2000.

Olsson, Anders et al., "Simulation Studies of Diffuser and Nozzle Elements for Valve-Less Micropumps," Transducers '97, 1997 International Conference on Solid-State Sensors and Actuators, Chicago, Illinois, pp. 1039-1042, Jun. 16-19, 1997.

Parker, Gregory J. et al., "Development of High Throughput Screening Assays Using Fluorescence Polarization: Nuclear Receptor-Ligand-Binding and Kinase/Phophatase Assays," Journal of Biomolecular Screening, vol. 5, No. 2, pp. 77-88, 2000.

Pethig, Ronald et al., "Applications of Dielectrophoresis in Biotechnology," Tibtech, vol. 15, pp. 426-432, Oct. 1997.

Phillips, George N. Jr., "Crystallization in Capillary Tubes," Methods in Enzymology, vol. 114, pp. 128-131, 1985.

Phillips, W.C. and Rayment, I. "A systematic method for aligning double focusing mirrors." Methods in Enzymology, 1985, vol. 114 (Wyckoff, Hirs and Timasheff, eds.), 316-329, Academic Press.

Qin, Dong et al., "Photolithography With Transparent Reflective Photomasks," J. Vac. Sci. Technol. B, vol. 16, No. 1, pp. 98-103, Jan. 1998.

Qin, Dong et al., "Elastomeric Light Valves," Adv. Mater., vol. 9, No. 5, pp. 407-410, 1997.

Quake, Stephen R. et al., "From Micro-to Nanofabrication With Soft Materials," Science, vol. 290, pp. 1536-1540, Nov. 24, 2000.

Rapp, R. et al., "LIGA Micropump for Gases and Liquids," Sensors and Actuators A, vol. 40, pp. 57-61, Jan. 1994.

Reshetnyak, I. I., "Characteristics of the Influence of Ultrasound on the Crystallization Kinetics in Small-Volume Solutions," Sov. Phys. Acoust., vol. 21, No. 1, pp. 61-63, Jul. 1975.

Roberts, Richard W. et al., "RNA-Peptide Fusions for the In Vitro Selection of Peptides and Proteins," Proc. Natl. Acad. Sci. USA, vol. 94, pp. 12297-12302, Nov. 1997.

Roylance, Lynn Michelle et al., "A Batch-Fabricated Silicon Accelerometer," IEEE Transactions on Electron Devices, vol. ED-26, No. 12, pp. 1911-1917, Dec. 1979.

Rubin, Byron et al., "Minimal Intervention Robotic Protein Crystallization," Journal of Crystal Growth, vol. 110, pp. 156-163, 1991.

Rummel, Gabriele et al., "Lipidic Cubic Phases: New Matrices for the Three-Dimensional Crystallization of Membrane Proteins," Journal of Structural Biology, vol. 121, pp. 82-91, 1998.

Sadaoui, Nouredine et al., "TAOS: An Automatic System for Protein Crystallization," Journal of Applied Crystallography, vol. 27, pp. 622-626, 1994.

Salemme, F. R., "A Free Interface Diffusion Technique for the Crystallization of Proteins for X-Ray Crystallography," Archives of Biochemistry and Biophysics, vol. 151, pp. 533-539, 1972.

Sandia National Laboratories, "Electro Microfluidic Dual In-Line Package (EMDIP)," 2 pages, no date.

Sanjoh, Akira et al., "Spatiotemporal Protein Crystal Growth Studies Using Microfluidic Silicon Devices," Journal of Crystal Growth, vol. 196, pp. 691-702, 1999.

Santarsiero, B. D. et al., "An Approach to Rapid Protein Crystallization Using Nanodroplets," Journal of Applied Crystallography, vol. 35, pp. 278-281, 2002.

Sasserath, J. et al., "Rapid Prototyping and Development of Microfluidic and BioMEMS Devices," IVD Technology, 12 pages, Jun. 2002.

Schaffer, Chris B. et al., "Laser-Induced Breakdown and Damage in Bulk Transparent Materials Induced by Tightly Focused Femtosecond Laser Pulses," Meas. Sci. Technol., vol. 12, pp. 1784-1794, 2001.

Schasfoort, Richard B. M. et al., "Field-Effect Flow Control for Microfabricated Fluidic Networks," Science, vol. 286, pp. 942-945, Oct. 29, 1999.

Schueller, Olivier J. A. et al., "Fabrication of Glassy Carbon Microstructures by Soft Lithography," Sensors and Actuators A, vol. 72, pp. 126-139, 1999.

Seethala, Ramakrishna et al., "A Fluorescence Polarization Competition Immunoassay for Tyrosine Kinases," Analytical Biochemistry, vol. 255, pp. 257-262, 1998.

Sherlin, Luke D. et al., "Chemical and Enzymatic Synthesis of tRNAs for High-Throughput Crystallization," RNA, vol. 7, pp. 1671-1678, 2001.

Shoji, Shuichi et al., "Smallest Dead Volume Microvalves for Integrated Chemical Analyzing Systems," Transducers '91, 1991 International Conference on Solid-State Sensors and Actuators, San Francisco, California, pp. cover, 1052-1055, 1991.

Shoji, Shuichi, "Fluids for Sensor Systems," Topics in Current Chemistry, vol. 194, pp. 163-188, 1998.

Sklar, Larry A. et al., Sample Handling for Kinetics and Molecular Assembly in Flow Cytometry, SPIE, vol. 3256, pp. 144-153, 1998.

Smits, J.G., "Piezoelectric Micropump With Three Valves Working Peristaltically," Sensors and Actuators, vol. A21-A23, pp. 203-206, 1990.

Snook, Christopher F. et al., "Use of a Crystallization Robot to Set Up Sitting-Drop Vapor-Diffusion Crystallization and in situ Crystallization Screens," Journal of Applied Crystallography, vol. 33, pp. 344-349, 2000.

Sohn, L. L. et al., "Capacitance Cytometry: Measuring Biological Cells One by One," PNAS, vol. 97, No. 20, pp. 10687-10690, Sep. 26, 2000.

Soriano, Thierry M. B. et al., "ASTEC: An Automated System for Sitting-Drop Protein Crystallization," Journal of Applied Crystallography, vol. 26, pp. 558-562, 1993.

Southern, E. M. et al., "Analyzing and Comparing Nucleic Acid Sequences by Hybridization to Arrays of Oligonucleotides: Evaluation Using Experimental Models," Genomics, vol. 13, pp. 1008-1017, 1992.

Southern, Edwin M. & Maskos, Uwe "Parallel synthesis and analysis of large numbers of related chemical compounds: applications to oligonucleotides" *Journal of Biotechnology*, 1994, pp. 217-227, vol. 35.

Stevens, Raymond C., "High-Throughput Protein Crystallization," Current Opinion in Structural Biology, vol. 10, pp. 558-563, 2000.

Stevens, Raymond C., "The Cost and Value of Three-Dimensional Protein Structure," Drug Discovery World, pp. 35-48, Summer 2003.

Takahashi, Akiyuki et al., "Measurement of Intracellular Calcium," Physiological Reviews, vol. 79, No. 4, pp. 1089-1125, Oct. 1999.

Tawfik, Dan S. et al., "Man-Made Cell-Like Compartments for Molecular Evolution," Nature Biotechnology, vol. 16, pp. 652-656, Jul. 1998.

Thomas, B. R. et al., "Distribution Coefficients of Protein Impurities in Ferritin and Lysozyme Crystals Self-Purification in Microgravity," Journal of Crystal Growth, vol. 211, pp. 149-156, 2000.

Thompson, L. F. et al., "Introduction to Microlithography," 185th Meeting of the American Chemical Society, Seattle, WA, pp. 2 cover pages, 1-13, Mar. 20-25, 1983.

Thorsen, Todd et al., "Dynamic Pattern Formation in a Vesicle-Generating Microfluidic Device," Physical Review Letters, vol. 86, No. 18, pp. 4163-4166, Apr. 30, 2001.

Thorsen, Todd et al., "Microfluidic Large-Scale Integration," Science, vol. 298, No. 5593, pp. 580-584, Oct. 18, 2002.

Todd, Paul et al., "Application of Osmotic Dewatering to the Controlled Crystallization of Biological Macromolecules and Organic Compounds," Journal of Crystal Growth, vol. 110, pp. 283-292, 1991.

Tufte, O. N. et al., "Silicon Diffused-Element Piezoresistive Diaphragms," Journal of Applied Physics, vol. 33, No. 11, pp. 3322-3327, Nov. 1962.

Tyagi et al., "Molecular Beacons: Probes that Fluoresce upon Hybridization," Nature Biotechnology, 14:303-308 (1996).

Ullmann's Encyclopedia of Industrial Chemistry, Sections 6 to 6.3, Topic: Carbon Black, Sixth Edition, 7 pages, 1999.

Unger, M et al., "Single-Molecule Fluorescence Observed With Mercury Lamp Illumination," Biotechniques, vol. 27, No. 5, pp. 1008-1014, Nov. 1999.

Unger, Marc A. et al., "Monolithic Microfabricated Valves and Pumps by Multilayer Soft Lithography," Science, vol. 288, pp. 113-116, Apr. 7, 2000.

Van Dam, R. Michael et al., "Gene Expression Analysis With Universal n-mer Arrays," Genome Research, vol. 12, pp. 145-152, 2002.

Van De Pol, F.C.M. et al., "A Thermo-Pneumatic Actuation Principle for a Microminiature Pump and Other Micromechanical Devices," Sensors and Actuators, vol. 17, Nos. 1-2, pp. 139-143, May 3, 1989.

Van De Pol, F.C.M. et al., "Micro Liquid Handling Devices—A Review," Micro Systems Technologies, vol. 90, pp. 799-805, 1990.

Van Den Berg, A. et al., "Micro Total Analysis Systems," Proceedings of the µTAS '94 Workshop, University of Twente, The Netherlands, 17 pages, Nov. 21-22, 1994.

Van Der Woerd, Mark et al., "Lab-On-A-Chip Based Protein Crystallization," National Aeronautics and Space Administration and Caliper, pp. 1-27, Oct. 25, 2001.

Van Der Woerd, Mark et al., "The Promise of Macromolecular Crystallization in Microfluidic Chips," Journal of Structural Biology, vol. 142, pp. 180-187, 2003.

Velev, Orlin D., "On-Chip Manipulation of Free Droplets," Nature, vol. 426, pp. 515-516, Dec. 4, 2003.

Verpoorte, Elisabeth M. J. et al., "Three-Dimensional Micro Flow Manifolds for Miniaturized Chemical Analysis Systems," J. Micromech. Microeng., vol. 7, pp. 246-256, 1994.

Vieider, Christian et al., "A Pneumatically Actuated Micro Valve With a Silicon Rubber Membrane for Integration With Fluid Handling Systems," Transducers '95, 8th International Conference on Solid-State Sensors and Actuators and Eurosensors IX, Stockholm, Sweden, pp. 284-286, Jun. 25-29, 1995.

Vogelstein, Bert et al., "Digital PCR," Proc. Natl. Acad. Sci. USA, vol. 96, pp. 9236-9241, Aug. 1999.

Wallraff, G. et al. "DNA sequencing on a chip" *Chemtech*, Feb. 1997, pp. 22-32.

Ward, Keith B. et al., "Automatic Preparation of Protein Crystals Using Laboratory Robotics and Automated Visual Inspection," Journal of Crystal Growth, vol. 90, pp. 325-339, 1988.

Washizu, Masao et al., "Molecular Dielectrophoresis of Biopolymers," IEEE Transactions on Industry Applications, vol. 30, No. 4, pp. 835-843, Jul. 1994.

Weber, Patricia C. et al., "Applications of Calorimetric Methods to Drug Discovery and the Study of Protein Interactions," Current Opinion in Structural Biology, vol. 13, pp. 115-121, 2003.

Webster's II Dictionary, p. 421, 1984.

Weselak, Mark et al., "Robotics for Automated Crystal Formation and Analysis," Methods in Enzymology, pp. 1-13, 2002.

Whelen, A. Christian et al., "The Role of Nucleic Acid Amplification and Detection in the Clinical Microbiology Laboratory," Annu. Rev. Microbiol., vol. 50, pp. 349-373, 1996.

Whitesides, George M. et al., "Flexible Methods for Microfluidics," Physics Today, pp. 42-48, Jun. 2001.

Whitesides, George M. et al., "Soft Lithography in Biology and Biochemistry," Annu. Rev. Biomed. Eng., vol. 3, pp. 335-373, 2001.

Wiencek, J. M., "New Strategies for Protein Crystal Growth," Annu. Rev. Biomed. Eng., vol. 1, pp. 505-534, 1999.

Wilbur, James L. et al., "Lithographic Molding: A Convenient Route to Structures With Sub-Micrometer Dimensions," Adv. Mater., vol. 7, No. 7, pp. 649-652, 1995.

Wooley et al., "Functional Integration of PCR Amplification and Capillary Electrophoresis in a Microfabricated DNA Analysis Device," Anal. Chem., vol. 68, pp. 4081-4086, 1996.

Wu, Hongkai et al., "Fabrication of Complex Three-Dimensional Microchannel Systems in PDMS," J. Am. Chem. Soc., vol. 125, No. 2, pp. 554-559, 2003.

Wu, Shuyun et al., "MEMS Flow Sensors for Nano-Fluidic Applications," Sensors and Actuators A, vol. 89, pp. 152-158, 2001.

Xia, Younan et al., "Micromolding of Polymers in Capillaries: Applications in Microfabrication," Chem. Mater., vol. 8, No. 7, pp. 1559-1566, 1996.

Xia, Younan et al., "Complex Optical Surfaces Formed by Replica Molding Against Elastomeric Masters," Science, vol. 273, pp. 347-349, Jul. 19, 1996.

Xia, Younan et al., "Reduction in the Size of Features of Patterned SAMs Generated by Microcontact Printing With Mechanical Compression of the Stamp," Adv. Mater., vol. 7, No. 5, pp. 471-473, 1995.

Xia, Younan et al., "Soft Lithography," Angew. Chem. Int. Ed., vol. 37, pp. 551-575, 1998.

Xu, Bing et al., "Making Negative Poisson's Ratio Microstructures by Soft Lithography," Adv. Mater., vol. 11, No. 14, pp. 1186-1189, 1999.

Xu, Xiang et al., "Detection of Programmed Cell Death Using Fluorescence Energy Transfer," Nucleic Acids Research, vol. 26, No. 8, pp. 2034-2035, 1998.

Yang, Xing et al., "A Low Power MEMS Silicone/Parylene Valve," Solid-State Sensor and Actuator Workshop, Hilton Head Island, South Carolina, 4 pages, Jun. 7-11, 1998.

Yang, Xing et al., "A MEMS Thermopneumatic Silicone Membrane Valve," IEEE 10th Annual International Workshop of Micro Electro Mechanical Systems, Nagoya, Japan, pp. cover, 114-118, Jan. 26-30, 1997.

Yazdi, Navid et al., "Micromachined Inertial Sensors," Proceedings of IEEE, vol. 86, No. 8, pp. 1640-1659, Aug. 1998.

Yeh, Joanne I., "A Manual Nanoscale Method for Protein Crystallization," Acta Crystallographica, vol. D59, pp. 1408-1413, 2003.

Young, A. M. et al., "Contoured Elastic-Membrane Microvalves for Microfluidic Network Integration," Journal of Biomechanical Engineering, vol. 121, pp. 2-6, Feb. 1999.

Zaccolo, Manuela et al., "A Genetically Encoded, Fluorescent Indicator for Cyclic AMP in Living Cells," Nature Cell Biology, vol. 2, pp. 25-29, Jan. 2000.

Zdeblick, Mark J. et al., "A Microminiature Electric-To-Fluidic Valve," Transducers '87, Proceedings of the 4th International Conference on Solid-State Sensors and Actuators, reprinted in Micromechanics and MEMS Classic and Seminal Papers to 1990, pp. 2 cover pages 437-439, Jun. 1987.

Zengerle, R. et al. "A Micro Membrane Pump With Electrostatic Actuation," Micro Electro Mechanical Systems '92, Travemünde, Germany, pp. 19-24, Feb. 4-7, 1992.

Zengerle, R. et al., "Performance Simulation of Microminiaturized Membrane Pumps," 7th International Conference on Solid-State Sensors and Actuators, Yokohama, Japan, pp. 2 cover pages, 106-109, Jun. 7-10, 1993.

Zhao, Zhan, et al., "An Integrated Biochip Design and Fabrication," Proceedings of SPIE, vol. 4936, pp. 321-326, 2002.

Zheng, Bo et al., "A Droplet-Based, Composite PDMS/Glass Capillary Microfluidic System for Evaluating Protein Crystallization Conditions by Microbatch and Vapor-Diffusion Methods With On-Chip X-Ray Diffraction," Angew. Chem., pp. 1-4, 2004.

\* cited by examiner

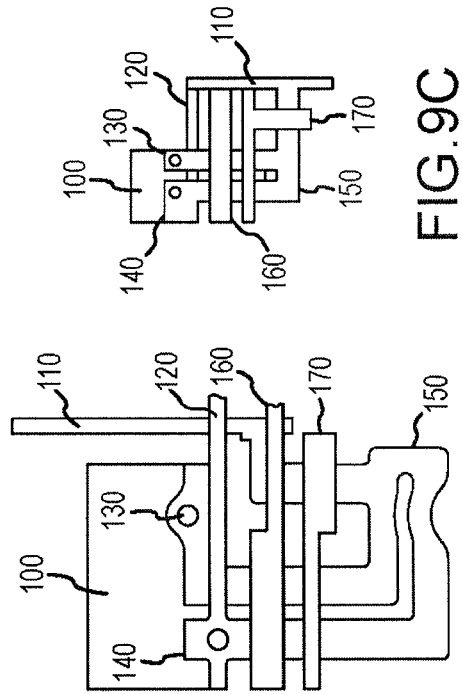
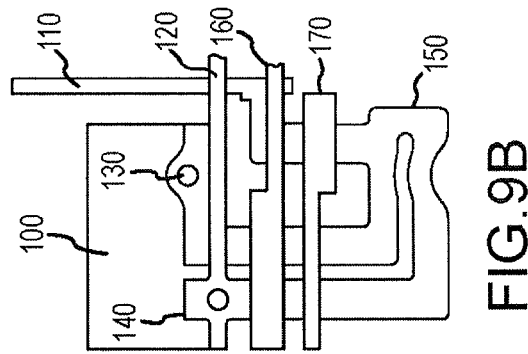
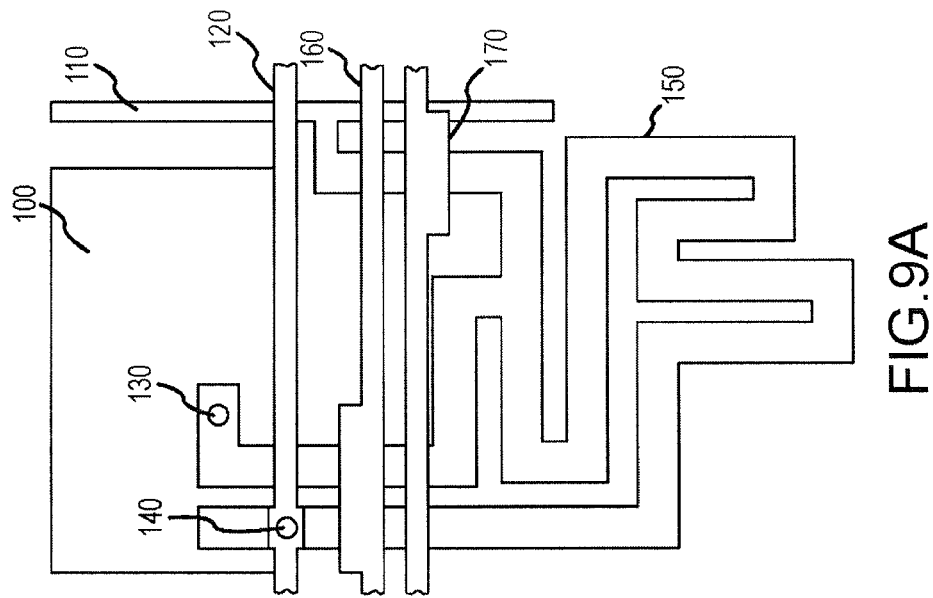
FIG. 9A
FIG. 9B
FIG. 9C
REACTION WELL .......... 100
CONTROL #1 ................ 160
CONTROL #2 ................ 170
SLUG (ROUNDED) ........ 150
REAGENT INPUT .......... 110
SAMPLE INPUT ............. 120
VIA (SAMPLE-TO-SLUG) ..... 140
VIA (SLUG-TO-REACTION WELL) ..... 130

INTERFACE VALVES CLOSED

REAGENT LOAD

CONTAINMENT VALVES CLOSED

SAMPLE LOAD

INTERFACE VALVE OPEN

SAMPLE PUSHES REAGENT INTO REACTION CHAMBER

REAGENT AND SAMPLE LOADED AND MIXED IN REACTION CELL

INTERFACE VALVE CLOSED

MICROFLUIDIC REACTION APPARATUS FOR HIGH THROUGHPUT SCREENING

CROSS-REFERENCES TO RELATED APPLICATIONS

This application is a continuation of U.S. patent application Ser. No. 11/680,541, now U.S. Pat. No. 7,815,868, filed Feb. 28, 2007, which application claims priority to U.S. Provisional Application Ser. No. 60/777,972 filed Feb. 28, 2006, U.S. Provisional Application Ser. No. 60/849,223 filed Oct. 4, 2006, and U.S. Provisional Application Ser. No. 60/881,627 filed Jan. 19, 2007, of which the entire contents of all the applications are herein incorporated by reference for all purposes.

In addition, embodiments of microfluidic structures and materials used in the devices of the present invention are described in U.S. patent application Ser. No. 11/006,522, filed Dec. 6, 2004, and published Sep. 22, 2005 as U.S. Pat. Pub. No. 20050205005, with the title "MICROFLUIDIC PROTEIN CRYSTALLOGRAPHY", the entire contents of which are hereby incorporated by reference for all purposes. Applications of the methods and devices of the present invention are also related to the inventions described in PCT application PCT/US01/44869, filed Nov. 16, 2001, and entitled "CELL ASSAYS AND HIGH THROUGHPUT SCREENING"; U.S. patent application Ser. No. 10/116,761, filed Apr. 3, 2002, and published Jan. 9, 2003 as U.S. Pat. Pub. No. 20030008411, with the title "COMBINATORIAL SYNTHESIS SYSTEM"; U.S. patent application Ser. No. 10/416,418, filed Nov. 16, 2001, and published Jun. 17, 2004 as U.S. Pat. Pub. No. 20040115838, with the title "APPARATUS AND METHODS FOR CONDUCTING ASSAYS AND HIGH THROUGHPUT SCREENING"; and U.S. patent application Ser. No. 10/118,466, filed Apr. 5, 2002, and issued Nov. 1, 2005 as U.S. Pat. No. 6,960,437, with the title "NUCLEIC ACID AMPLIFICATION UTILIZING MICROFLUIDIC DEVICES", which are also hereby incorporated by reference for all purposes.

Additional information relating to the formation of microfabricated fluidic devices utilizing elastomer materials are described generally in U.S. Pat. No. 6,408,878, filed Feb. 28, 2001, entitled "MICROFLUIDIC ELASTOMERIC VALVE AND PUMP SYSTEMS"; U.S. Pat. No. 6,899,137, filed Apr. 6, 2001, entitled "MICROFABRICATED ELASTOMERIC VALVE AND PUMP SYSTEMS"; U.S. patent application Ser. No. 09/724,784 filed Nov. 28, 2000, entitled "MICROFABRICATED ELASTOMERIC VALVE AND PUMP SYSTEMS"; and U.S. Ser. No. 09/605,520, filed Jun. 27, 2000, entitled "MICROFABRICATED ELASTOMERIC VALVE AND PUMP SYSTEMS." These patents and patent applications are also hereby incorporated by reference for all purposes.

BACKGROUND OF THE INVENTION

Microtiter plates have become a standard tool in chemistry, biology and medical laboratories. The plates are typically flat glass or plastic trays in which an array of circular reagent wells are formed. Each well can typically hold between from a few microliters to hundreds of microliters of fluid reagents and samples, which may be loaded into the wells with automated delivery equipment. Plate readers are used to detect biological, chemical and/or physical events in the fluids placed in each well.

As the fields of combinatorial chemistry and high throughput screening have grown, so has equipment and laboratory instrumentation that has been designed to fill, manipulate and read microtiter plates. Unfortunately, the equipment makers made little effort develop systems that were cross-compatible with the systems of other manufacturers. By the mid-1990s, the Society for Biomolecular Screening (SBS) formed a standards group to address these cross-compatibility problems. A final set of standards was published by SBS and the American National Standards Institute 2003.

These standards define the overall dimensions of a compliant microtiter plate, as well as the diameter, depth and spacing of the reagent wells in the plate. The plates may include 96, 384, 1536, etc., wells arranged in a 2:3 rectangular matrix. While some manufacturers have made plates packing even larger numbers of reagent wells into the dimensions of an SBS-formatted plate, the small-sizes of the wells can make filling and reading the plates more difficult. Thus, there is a need for devices, systems and methods that can rapidly and accurately deliver small volumes of samples and reagents to reaction sites in high throughput microtiter plates. There is also a need for devices, systems and methods that provide monitoring, detecting and reading of reactions performed at the reaction sites of such microtiter plates. There is also a need to design such microtiter plates to SBS compatible standards, so they can take advantage of the large amount of SBS-formatted equipment and instrumentation that is currently in use. These and other needs are addressed by the present invention.

BRIEF SUMMARY OF THE INVENTION

Embodiments of the invention include SBS-formatted microfluidic devices that include a plate having an upper surface and a lower surface, where the geometry of the plate defines an array of interrogation areas. The perimeter of each interrogation area defines a region on the plate where SBS-compatible equipment can measure and/or influence reactions taking place on the plate. Typically, the interrogation areas have the same size and position as the reaction wells in a conventional SBS-formatted microtiter plate. Each interrogation area may encompass one or more reaction sites. These reaction sites may be sealable chambers in which reactants, samples, etc., may be brought into contact and reacted. The reaction sites may be isolated from each other, allowing multiple different reactions to take place at the same time in the same interrogation area. The reaction sites may lie beside each other within an interrogation area and be defined by the presence of one or more reactants or analytes that have been deposited upon a specific area on the substrate surface of the plate.

The devices may also include one or more elastomeric layers, generally positioned upon a rigid substrate surface, wherein a plurality of channels is disposed within the elastomeric layers or is defined at the interface between the elastomeric layers or at the interface of an elastomeric layer and the rigid substrate surface. In certain embodiments, a first elastomeric layer in contact with the upper surface of the plate, where the first elastomeric layer comprises a network of microfluidic flow channels formed therein in fluid communication with an array of reaction sites. The devices may further include a second elastomeric layer in contact with the first elastomeric layer, where the second elastomeric layer includes a network of control channels formed therein, configured to control the flow of fluids within the flow channels.

It should be noted that all reference to relative positions of the plate and elastomeric layers, such as "upper surface" and "lower surface" are provided solely for the purpose of conceptual convenience, and are not meant to restrict the invention to such arrangements. The devices of the invention may be made with the plate either above or below the elastomeric layers or in any other arrangement such that the elements provide a functioning microfluidic system.

Embodiments of the invention may also include systems of SBS-formatted microfluidic devices that can process at least one flowable reagent. The reagent may include any liquid, and may include a dye or other reagent detectable by optical or other sensors. The systems may also be compatible with machines used to read the device or to monitor a reaction performed upon the device. The machines may be SBS compatible and able to accept, use, manipulate, and read an SBS-formatted plate. In addition, the systems may include machines for dispensing and/or pumping fluids into the microfluidic devices. These dispensing and pumping machines may also be SBS compatible and able to accept an SBS-formatted plate.

Embodiments may still further include systems to manipulate, read and/or monitor one or more reactions performed upon or within a SBS-formatted microfluidic device. The systems may include a SBS-formatted microfluidic device and a machine for reading, monitoring and/or manipulating a reaction performed upon or within the SBS-formatted microfluidic device.

Embodiments of the invention may still also include processes for conducting microfluidic high throughput sample reaction measurements. The processes may include the step of providing a microfluidic testing device comprising a reaction plate that has an array of reaction sites, such as within one or more wells. In certain embodiments, each well defines a single reaction site for the performance of a single reaction. In additional embodiments each well has at least two reaction sites, allowing two or more reactions to be performed in a single well. The reaction sites may be physically defined by a reaction chamber. The reaction chambers may be coupled to reagent flow channels and sample flow channels that are formed in a first elastomeric layer adjacent to the reaction plate. The processes may also include loading a set of reagents into an array of reagent reservoirs, and loading a set of samples into an array of sample reservoirs of the microfluidic testing device. Each of the reagent reservoirs is fluidly coupled to one of the reagent flow channels, and each of the sample reservoirs is fluidly coupled to one of the sample flow channels. The processes may further include transporting at least one of the reagents through at least one of the reagent flow channels to a designated reaction chamber and at least one of the samples through at least one of the sample flow channels to the designated reaction chamber. The control channels control the flow of the reagent and the sample through the flow channels to the designated reaction chamber, and are formed in a second elastomeric layer adjacent to the first elastomeric layer. The processes may still further include the step of measuring a reaction response from the reagent and the sample in the designated reaction chamber.

In certain embodiments, two or more reaction sites may be present within a single interrogation site. The interrogation site may be defined, for example, as an imaging area upon an SBS-formatted chip, which is imaged by a single lens at a single set position. This interrogation area may have defined within it any number of reaction sites. Any or all of these reaction sites may be imaged simultaneously by a lens positioned above the reaction site. A single image of a single interrogation area captured by a single lens may contain information pertaining to any number of reaction sites within the imaged interrogation area. The information associated with each reaction site may be parsed and differentiated from the information associated with any other reaction site in a number of ways.

For example, a device having four reaction sites within a single reaction area (e.g., FIG. 2) may be set-up such that each reaction at each of the four reactions sites produces a different colored signal signifying completion of a reaction (e.g., green, red, yellow, and blue colored signals). The optical image captured by a single lens may be optically or electronically split up into its component colors to provide for separate signals. These signals may be processed either quantitatively (to determine signal strength at a particular reaction site) or qualitatively (to determine the presence or absence of a reaction). Alternatively, with a single color reaction, the reaction could be set up to sequentially run a reaction at each of the four reaction sites. One reaction per interrogation area may be performed at a time, and then be read. That reaction chamber may then be bleached or washed out and a second reaction may be performed at the second reaction site, and so forth, until all four reactions had been completed and read.

Embodiments of the invention still also include systems having lens to focus light on the reaction sites in interrogation areas.

Additional embodiments and features are set forth in part in the description that follows, and in part will become apparent to those skilled in the art upon examination of the specification or may be learned by the practice of the invention.

BRIEF DESCRIPTION OF THE DRAWINGS

FIGS. 9A-C are diagrams of exemplary carry-on reaction cell designs.

DETAILED DESCRIPTION OF THE INVENTION

Devices, systems and processes are described that integrate microfluidic sample delivery and reaction technology with existing laboratory devices and methods that may be used for performing high throughput testing of chemical and biological samples, and for carrying out chemical and biological reactions, especially those employing small liquid volumes. These devices and systems may include fluorescent plate readers, real-time PCR machines, robotic plate handlers, and pipetting robots, and devices designed to load, manipulate and read elastomeric microfluidic devices, among other types of equipment. The devices, systems and methods of the invention are compatible with one or more standards that allow them to easily interface with existing laboratory equipment. For example, the components may conform to the widely adopted SBS format for automated laboratory instrumentation.

The devices and systems of the invention may include arrays of reaction reservoirs that are formatted for compatibility with automated reactant loading equipment (e.g., pipetting robots) that already exist and are in common usage in laboratories and manufacturing facilities. The devices and systems may also include arrays of reaction product reservoirs that receive reaction products from reactions chambers where selected combinations of the reactants were combined. The reaction product reservoirs may also be formatted for compatibility with pre-existing automated sample extraction equipment to transport reaction product samples to analysis equipment, storage containers, etc.

Integrating microfluidic sample delivery technology with high throughput testing equipment combines advantages from both fields. Microfluidic systems have fewer moving parts and simpler operational logistics than robotic fluid delivery systems. In general, the microfluidic systems cost less to manufacture and require less maintenance and repair. In addition, microfluidic systems can be manufactured with smaller sized conduits and chambers, allowing them to deliver smaller volumes of samples, reagents, etc., than practicable with, for example, pipetting robots. This can reduce the costs and waste products generated for large screening studies involving thousands or more combinations of reagents and samples. The small volumes can also make screening and combinatorial studies practical when only a small amount of a sample is available.

Smaller component dimensions also permit more densely packed arrangements of the reaction sites. For example, two, four, eight, or more microfluidic reaction chambers (each defining a reaction site) may be packed into the interrogation area of a single site for a standardized high throughput screening device. This can allow the microfluidic device to achieve a twofold, fourfold, eightfold, or more, increase in the throughput rate using an existing screening device.

Microfluidic Device Overview

Figure 1A:
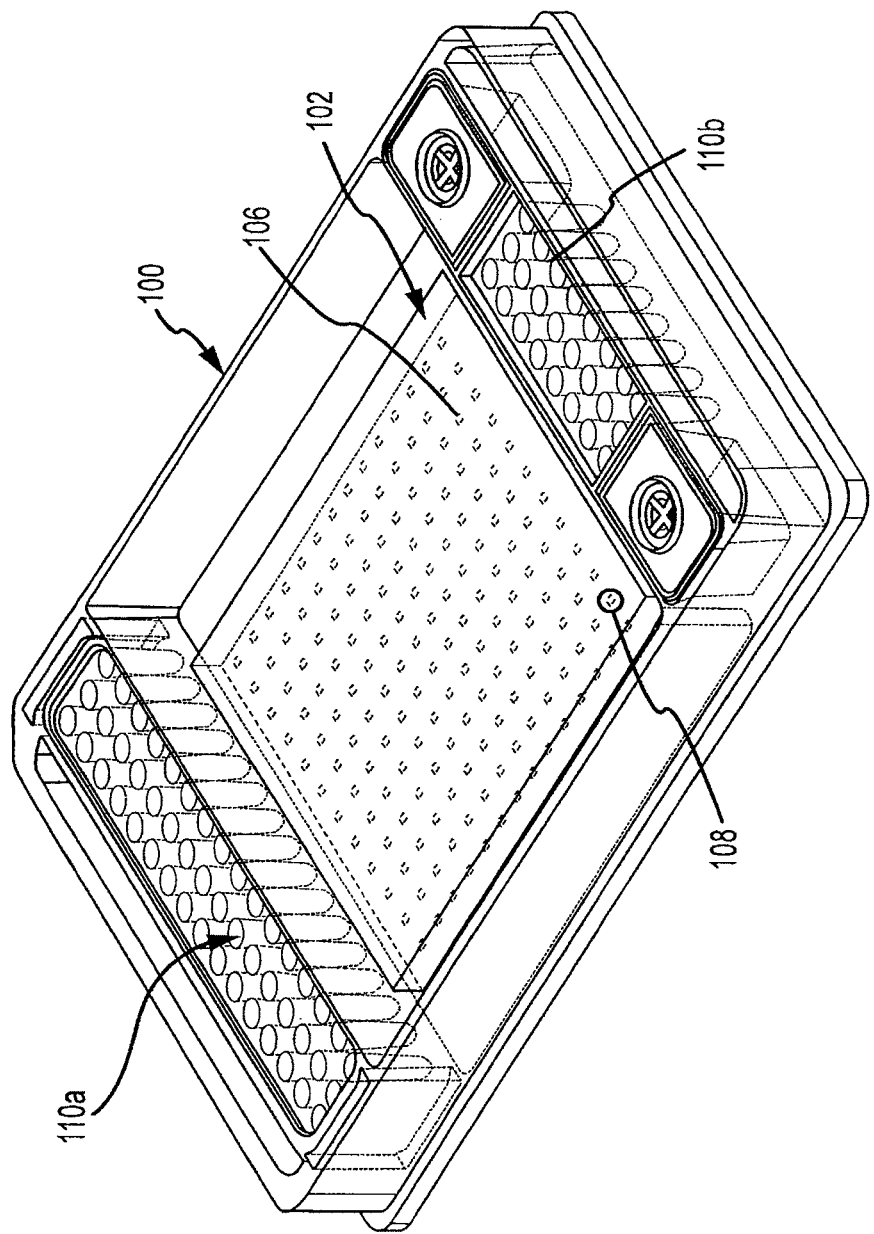
FIG. 1A is a perspective view of a SBS-formatted microfluidic plate according to embodiments of the invention.
Figure 1B:
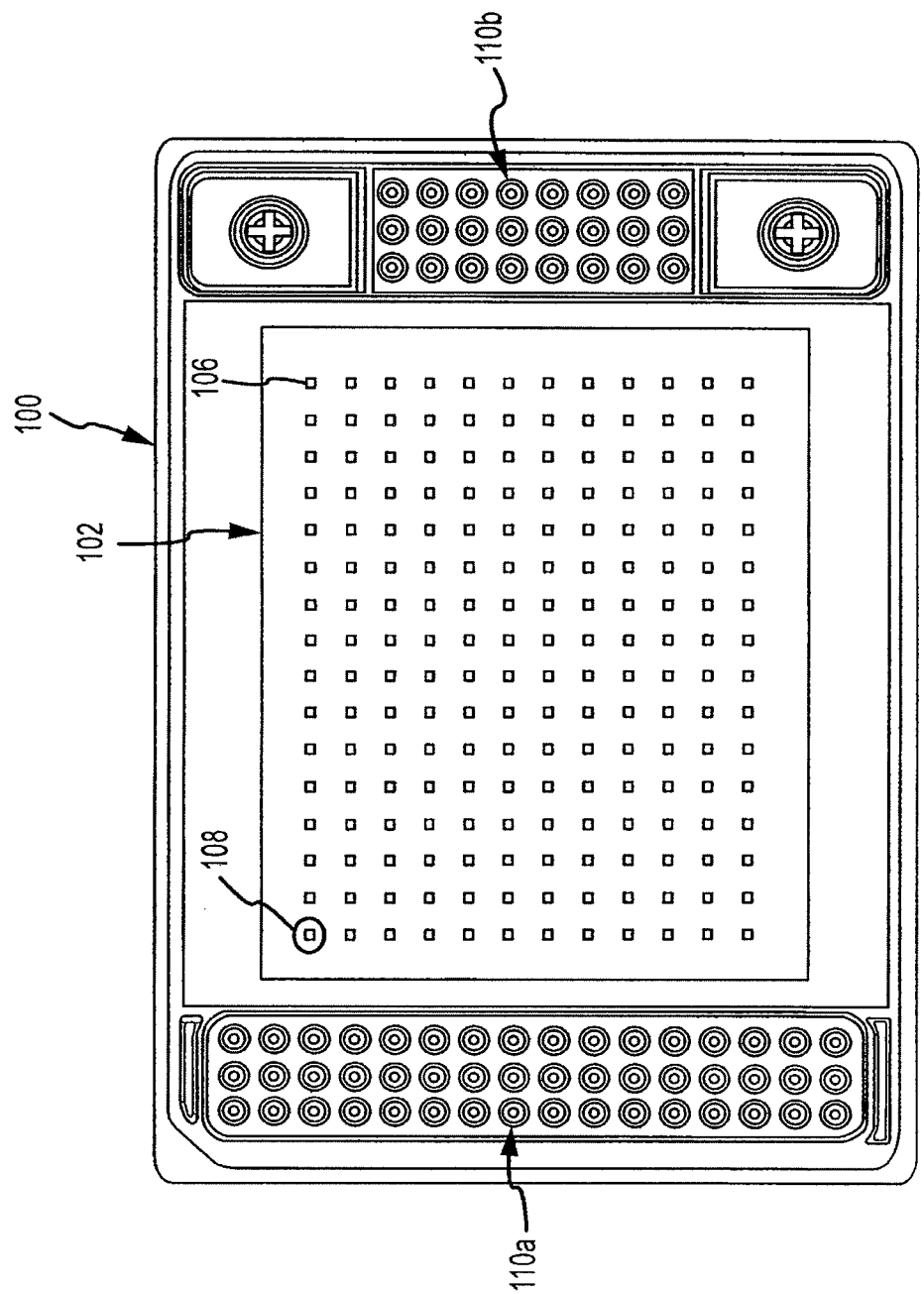
FIG. 1B is a plan view of an SBS-formatted microfluidic plate according to embodiments of the invention.

FIG. 1A shows a microfluidics plate 100 that includes a reaction site array 102 positioned between two reservoir arrays 110*a-b*. Each reaction site 106 may have a surface area from about 0.5 mm$^2$ to about 315 mm$^2$, and may have a volume of about 1 nL to about 1000 nL each, and may be configured to make the array 102 compatible with an SBS formatted microplate reader. As FIG. 1B shows for this example, there are 192 reaction sites 106 in the array 102 arranged in 12 rows by 16 columns. This array of reaction sites 106 overlaps an equal number of interrogation areas 108 in the SBS-formatted interrogation area array. The 384 well SBS-formatted plate 100, has a 16×24 array of interrogation areas 108. The reaction sites 106 overlap with a subset of the interrogation area array in the middle of the plate 100. In this arrangement, space for four additional SBS-formatted columns exists on either side of the 16 columns of reaction sites 106, and space for 2 additional SBS-formatted rows exists on either side of the 12 rows of reaction sites 106.

As FIG. 1B shows, some of the space on the sides of the reaction site array 102 may be used for the reservoir arrays 110*a-b*. In the example shown, a 16 row by 3 column reservoir array 110*a* is positioned on one side of the array 102, and an 8 row by 3 column reservoir array 110*b* is positioned on the opposed side of the array 102. The configuration of the individual reservoirs in the arrays 110*a-b* may also be formatted according to the SBS standard. Thus, automated filling and extracting equipment, such as a pipetting robot, may be programmed to fill or remove fluids from the reservoirs in the same manner as the reagent wells of a conventional, SBS-formatted, microtiter plate.

The reservoir arrays 110*a-b* may be filled with reagents, reactants, samples, reaction products, etc., in any configuration. For example, one of the reservoir arrays (e.g., array 110*a*) may be filed with reagents, and the second array 110*b* may be filled with samples. Individual combinations of the reagents and samples may be combined at the reaction sites in array 102 and monitored by SBS-formatted measuring equipment that defines an interrogation area 108 each of the reaction sites. In another example, one of the reservoir arrays (e.g., array 110*a*) may hold reactants, and the second array 110*b* may receive reaction products from the reactions that take place in the reaction sites of array 102. The reservoir arrays 110*a-b* may also be subdivided into sub-arrays and/or at the level of individual reservoirs into different groupings of fluids.

The space around the perimeter of plate 100 occupied by the reservoir arrays 110*a-b*, channels that supply fluid to the array 102, pumping equipment, etc., may take up space that would otherwise be occupied by wells in a conventional microtiter plate. This may result in fewer interrogation areas 108 in plate 100 than wells in a conventional plate (which can define the size and position of the interrogation areas 108). For example, the reaction site array 102 of plate 100 shown in FIG. 1B encompasses 192 interrogation areas 108, which is half the number of wells in a conventional SBS-formatted 384 well microtiter plate. When the reaction sites 106 in array 102 overlap the interrogation areas 108 in a 1:1 ratio, there are half the number of reaction sites (i.e., 192) as available in a conventional SBS-formatted microtiter plate (i.e., 384 wells). But packing more reaction sites within the perimeter of each interrogation area 108 can quickly increase total number of reactions sites beyond what is possible with a conventional microtiter plate.

For example, if just 2 reaction sites 106 were packed into each interrogation area 108 (i.e., a 2:1 ratio of reaction sites to interrogation areas) the total number of reaction sites would be back up to 384 (i.e., equal to the number of wells in a conventional 384 well SBS microtiter plate). Using microfluidics production technology, arrays of reaction sites can be constructed with 2, 3, 4, 6, 8, 10, 11, 12, 20, or more reaction sites overlapping each SBS-formatted interrogation area. This results in throughputs that are double, triple, quadruple, etc., those of a conventional SBS-formatted microtiter plate.

Figure 2:
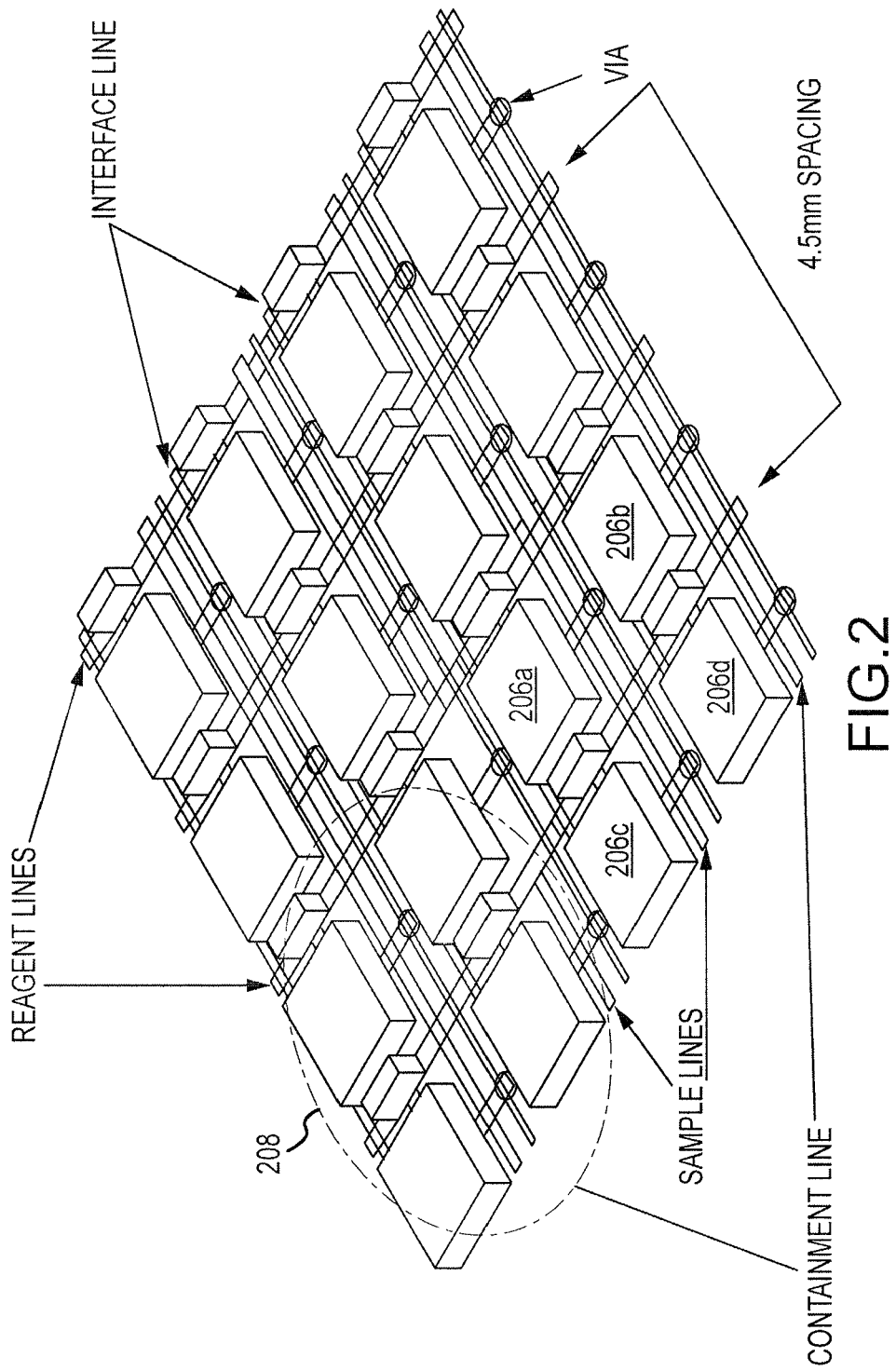
FIG. 2 is a group of 2×2 reaction sites that make up a portion of a reaction site array according to embodiments of the invention.

For example, FIG. 2 shows a portion of a reaction site array 202 where each SBS-formatted interrogation area 208 encompasses four reaction sites 206*a-d*. The 4:1 ratio of reaction sites to interrogation areas gives the reaction site array 202 twice the number of reaction sites (i.e., 768 reaction sites) versus a conventional 384 well SBS-formatted microtiter plate. Each reaction site 206 may be individually addressable by one or more fluid flow lines, including sample lines 212 and reagent lines 213. The lines act as channels to guide the flow of a fluid from a reservoir to a reaction site. Flow through the fluid flow lines may also be controlled by control lines 214. These lines 214 can be pressure actuated to open and close the fluid flow lines to form a fluid path from the reservoir to the reaction site. The lines 214 can also control the amount of fluid that enters the reaction site.

The 2×2 unit cells of reaction sites 206a-d encompassed by the interrogation areas 208 can boost the efficiency of SBS-formatted equipment a number of ways. For example, SBS-formatted screening equipment can monitor sequential reactions that would be run at each of the reaction sites 206a-d and then read. This may start with a sample and reagent being introduced to the first reaction site 206a and reading the results (e.g., a change in absorbance or fluorescence caused by a product species). The first site 206a may be bleached or washed after the run. Then, a second sample and reagent may be introduced to the second reaction site 206b while reading the results of this combination. The process may then be repeated for the third site 206c and, finally, the fourth reaction site 206d.

The plate has 192 interrogation areas that each have 4 reaction sites, allowing a total of 768 reactions to be run on the plate, either simultaneously or sequentially. This is twice the number of reactions possible using a conventional 384 well microtiter plate. Still more reactions are possible by packing 5, 6, 7, 8, 9, 10, etc., reaction sites 206 into each of the interrogation areas 208.

Additional methods include running reactions in all four reaction sites 206a-d simultaneously instead of sequentially. For example, reagents may be labeled with different colored dyes in each of the reaction sites 206a-d that absorb and/or fluoresce light of different colored wavelengths. Spectrally discriminating detection equipment that monitors each wavelength independently can detect changes in all four reaction sites at the same time. These multiple color reactions can significantly increase the throughput rate of for an SBS-formatted reaction plate by running two, three, four, five, etc., times the number of reactions in the same period of time as a conventional 384 well microtiter plate.

There are also methods and processes for using reaction sites 206 to make reaction product samples that can be transported to product sample reservoirs in the reservoir arrays 110 on plate 100. SBS-formatted equipment (e.g., pipetting robots) can be programmed to automatically extract the product samples from the reservoirs and place them in storage containers or instrumentation for additional chemical and/or biological analysis.

Embodiments of these methods may also include multi-stage reactions and syntheses where reaction products from one reaction site are actually intermediates in a more complex reaction scheme. In these methods, a first reaction product formed from reactants in a first reaction site 206 are combined with additional reagents and/or reaction products from a second reaction site. The products made by reacting the first reaction product with the additional reactants and/or reaction products may be the final reaction products that are transported to the product sample reservoir. The methods may include even more complexity by forming a plurality of reaction product intermediates in multiple reaction sites 206 that are combined at various stages leading to a final product or group of products.

At each reaction site, SBS-formatted equipment may be used to monitor and/or influence the reactions taking place in the reaction sites 206. For example, spectral analysis equipment may be used to monitor the consumption or production of chemical species in a reaction site 206. Equipment may also be used to apply localized heating and/or light exposure (e.g., UV light exposure) to influence the types of reaction products that are generated.

Further methods include using the reaction sites 206 in high-throughput molecular genetics analyses. For example, SBS-formatted plate 100 may be used with a standard real-time PCR instrument to perform an automated DNA analysis of single nucleotide polymorphisms (SNPs) from one or more samples of genetic material. Multiple SNP reactions (e.g., SNP restriction fragment length polymorphism) may be performed in reaction sites 206 and the reaction products amplified by polymerase chain reaction (PCR). The PCR product samples may then be transported to product reservoirs 110 where automated DNA analysis equipment can extract the samples and run them through electrophoresis equipment (e.g., gel or capillary electrophoresis equipment).

Figure 4:
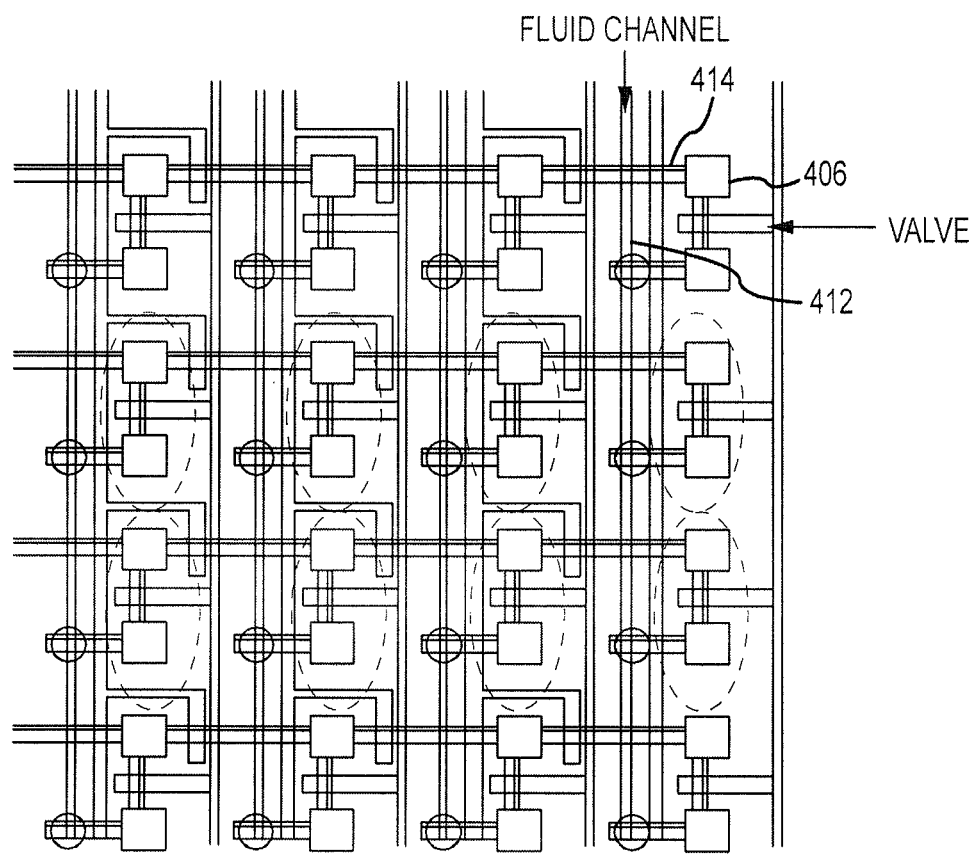
FIG. 4 is an illustration of a portion a network of control and flow channels that supply fluids to reaction sites according to embodiments of the invention.

Fluids may be supplied via supply channels (not shown) to the reaction sites 106 in the reaction site array 102 from the reservoir arrays 110a-b. The reservoir arrays 110a-b may be filed with samples and reagents that are delivered in various combinations to the reaction sites 106. As shown in FIG. 4, the fluids are delivered through fluid channels 412 in the reaction site array 402. The flow of fluids through the fluid channels 412 are controlled by pressure actuation of intersecting control channels 414. Increasing the pressure in a control channel 414 causes it to dilate and close the flow channel at a point where the channels intersect. Conversely, decreasing the pressure in the pressurized control valve causes it to constrict and reopen the flow channel. A series of control channels can be configured into a peristaltic pump (not shown) to transport fluids through the flow channels.

By selectively actuating the control channels 414, specific combinations of fluid samples from the fluid reservoir array (not shown) may be added to individual reaction sites 406. For example, a first reservoir array may hold M samples and a second reservoir array may hold N reagents. Selective actuation of the control channels 414 may be done to deliver combinations of each M sample and N reagent to one of the N×M discrete reaction sites 406. Measurements may then be taken to determine how each combination of sample and reagent react.

Figure 5:
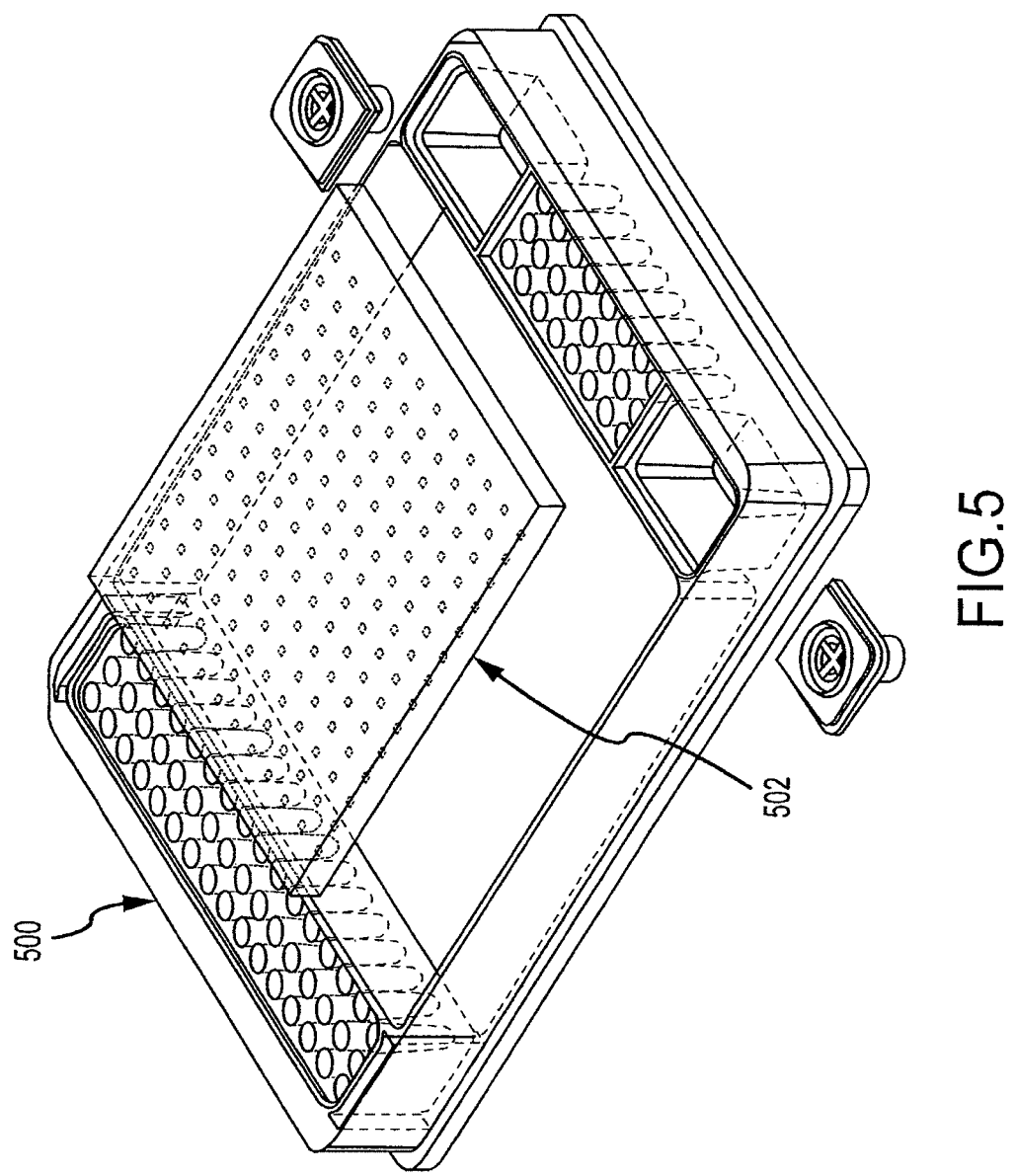
FIG. 5 is an exploded view of the SBS-formatted microfluidic plate according to embodiments of the invention.

FIG. 5 shows an exploded view of a microfluidics plate 500. In this view, the reaction site array 502 is shown separated from the rest of plate 500. Embodiments of the invention are contemplated where the array 502 may be detached from the rest of the plate 500, allowing multiple reaction site arrays 502 to be cycled through the device. The plate 500 and/or array 502 may include an asymmetrical shape or alignment notch to help couple connectors for the flow and control lines in the array 502 with the complementary connectors on plate 500 when the pieces are joined. An array 502 that has been used in the plate 500 may be permanently disposed of, or if possible, recycled using accepted cleaning and/or sterilization procedures. In other embodiments the reaction site array 502 may be permanently affixed or formed integral with plate 500.

Exemplary Device Optics

Optical lenses may be used to position and concentrate light on the reactions sites in the microfluidic plates. This can increase the signal sensitivity and/or reduce the cross-talk in spectroscopic detection equipment measuring spectral events (e.g., absorption spectroscopy, fluorescence spectroscopy, etc.). The lenses can also concentrate light that may be used to enhance photochemical reactions in a selected reaction site.

The lenses may be integral to the microfluidic plate, for example, present within the elastomeric structure of the device. An integrated lens may be formed from any material that has an index of refraction that is different from the surrounding material. In certain embodiments, the lens is provided by molding a generally bi-convex-shaped void into the structure of the elastomeric material. Air or another fluid is pumped into the void such that it inflates to provide a predetermined bi-convex shape within the elastomeric material that acts as a lens. Alternatively, the space may be evacuated to cause the surface layer to recess into the plate and form a concave lens. Adjustments in the pressure may be made to adjust the curvature and optical properties of the lenses, such as the focal point. The integral lenses may also be used with external lenses to form compound lenses. In certain embodiments, two or more integral lenses are provided to provide a multi-lens system within the device. Integral lenses are generally positioned within the device above a reaction site so as to provide optical magnification of the reaction site. In certain embodiments, the integrated lens is inflated with a gas, such as air, and in additional embodiments, the lens may be inflated using a liquid such as water, saline, an oil, an alcohol, a polyol, an isobutyrate, etc. The inflating fluid may be selected to provide the desired optical (e.g., light focusing) properties.

Figure 3A:
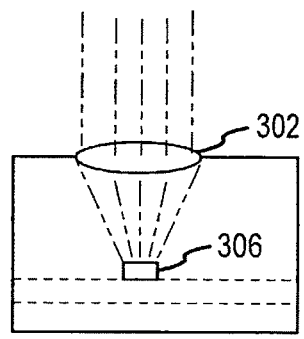
FIGS. 3A-B are illustrations of optical arrangements that may be used with spectral measurement instrumentation according to embodiments of the invention.
Figure 3B:
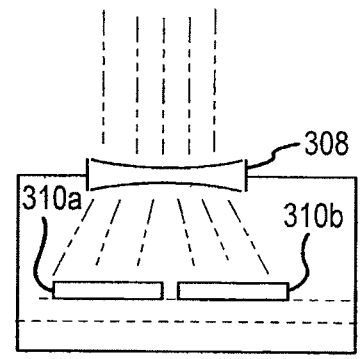

As shown in FIG. 3A, a biconvex focusing lens 302 for focusing a light source into the area of an individual reaction site 306. Concentrating the detection light on the reaction site can increase the strength of an absorbance and/or fluorescence signal from the site. Also, focusing the light source reduces the intensity of stray and scatted light that may interfere with measurements in nearby reactions sites (i.e., crosstalk). FIG. 3B shows a biconcave lens 308 that may be used to diffuse the source light more evenly across a plurality of reaction sites 310a-b. These lenses may provide a more uniform distribution of source light across multiple reaction sites 310 that are packed into an interrogation area.

Additional types of lenses (not shown) may also be used to control the position and concentration of light impinging on the microfluidics plate. For example, plano-covex lenses, convex-concave lenses, meniscus lenses, plano-concave lenses, and fresnel lenses may also be used with the invention. The lenses may be used alone (e.g., a simple lens) or in combination (e.g., a compound lens) to control the focus of the light impinging on, or emitted from, the microfluidics plate.

The SBS Dimensional Standards for Microplates

The Society for Biomolecular Screening ("SBS") has developed formatting standards for microplates used in high throughput screening processes for biological and chemical compounds. These automated processes included the use of robot pipetting to transfer fluid samples to an array of reaction wells formed in the microplate. Detection equipment was aligned with the wells to observe and measure events (e.g., chemical reactions, enzymatic catalysis, crystallizations, etc.). As the number of vendors and systems proliferated, standards were clearly needed to address compatibility problems. SBS developed dimensional standards for microplates that are followed by a significant number of microplate manufacturers and instrument makers that utilize microplates.

SBS has defined dimensional standards for 96, 384, and 1536 well microplates. In each case, the microplate has a rectangular shape that measures 127.76 mm±0.5 mm in length by 85.48 mm±0.5 mm in width. The four corners of the plate are rounded with a corner radius to the outside of 3.18±1.6 mm. The complete definitions for these standards were published by the American National Standards Institute on Mar. 28, 2005, in publications ANSI/SBS 1-2004, ANSI/SBS 2-2004; ANSI/SBS 3-2004; and ANSI/SBS 4-2004, the entire contents of which are herein incorporated by reference for all purposes. A summary of the definitions for 96, 384 and 1536 well plates are provided here:

The 96 Well Format

Figure 6A:
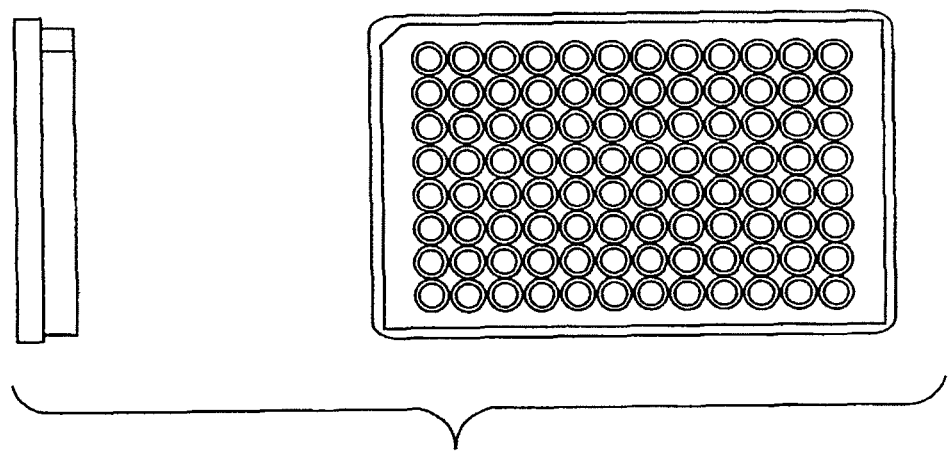
FIGS. 6A-C are schematic views of SBS-formatted microtiter plates for 96, 384 and 1536 reagent wells.

FIG. 6A shows an arrangement for a 96 well microplate, arranged in an 8 row by 12 column rectangular array. The columns of the array are defined by the distance between the left outside edge of the plate and the center of the first column of wells being 14.38 mm. Each additional column is an additional 9 mm in distance from the left outside edge of the plate. The top edge of the part is defined as the two 12.7 mm areas measured from the corners of the plate. The rows of the 96 well array are defined by a distance of 11.24 mm between the top outside edge of the plate and the center of the first row of wells. Each additional row is an additional 9 mm from the top outside edge of the plate. The top edge of the part is defined as the two 12.7 mm areas measured from the corners of the plate.

The 384 Well Format

Figure 6B:
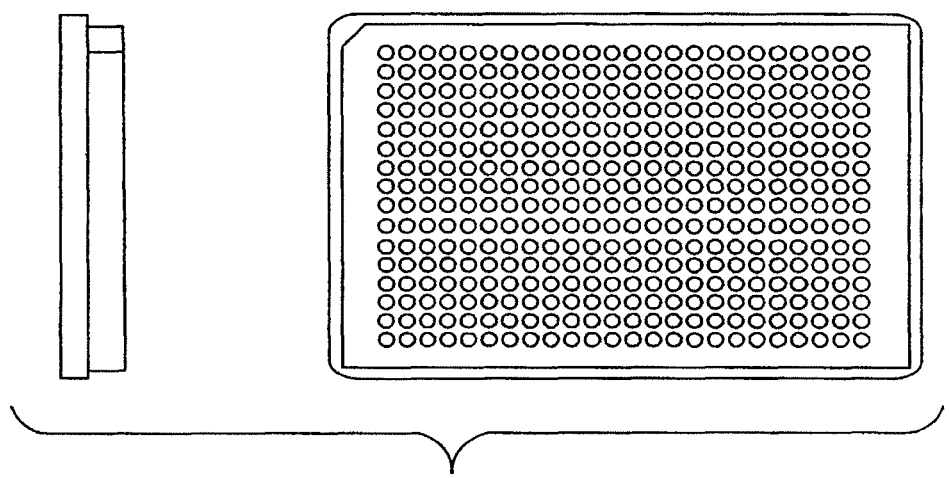

FIG. 6B shows an arrangement for a 384 well microplate, arranged in an 16 row by 24 column rectangular array. The columns of the array are defined by the distance between the left outside edge of the plate and the center of the first column of wells being 12.13 mm. Each additional column is an additional 4.5 mm in distance from the left outside edge of the plate. The top edge of the part is defined as the two 12.7 mm areas measured from the corners of the plate. The rows of the 384 well array are defined by a distance of 8.99 mm between the top outside edge of the plate and the center of the first row of wells. Each additional row is an additional 4.5 mm from the top outside edge of the plate. The top edge of the part is defined as the two 12.7 mm areas measured from the corners of the plate.

The 1536 Well Format

Figure 6C:
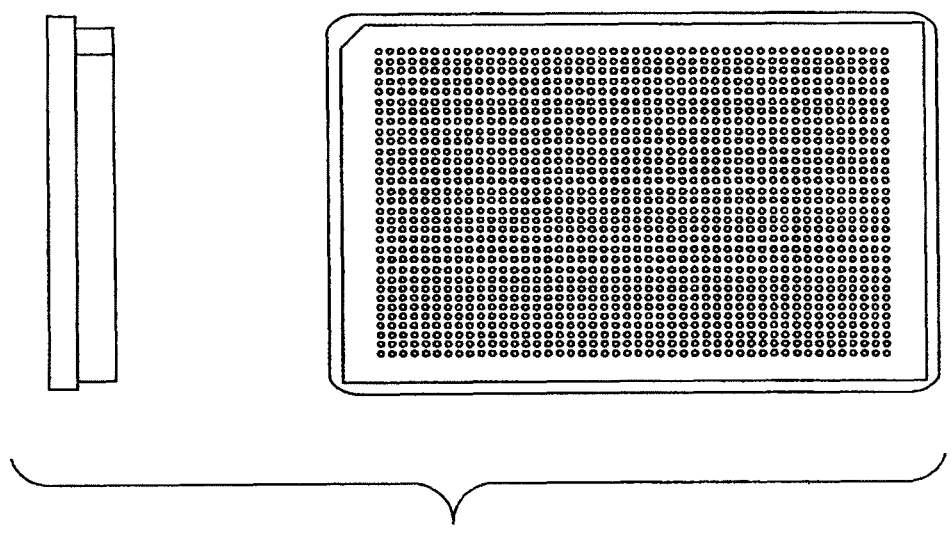

FIG. 6C shows an arrangement for a 1536 well microplate, arranged in an 32 row by 48 column rectangular array. The columns of the array are defined by the distance between the left outside edge of the plate and the center of the first column of wells being 11.005 mm. Each additional column is an additional 2.25 mm in distance from the left outside edge of the plate. The top edge of the part is defined as the two 12.7 mm areas measured from the corners of the plate. The rows of the 1536 well array are defined by a distance of 7.865 mm between the top outside edge of the plate and the center of the first row of wells. Each additional row is an additional 2.25 mm from the top outside edge of the plate. The top edge of the part is defined as the two 12.7 mm areas measured from the corners of the plate.

Carry-On Mixing and Metering in the SBS Formatted Devices

This invention further relates to microfluidic devices and methods of using the devices that provide precise metering of fluid volumes and efficient mixing of the metered volumes. The devices are useful for analytical assays for research or diagnostic purposes where high density, high throughput, sample parsimony, and lower cost are desired. The devices and methods are also useful as tools for the synthesis, sorting, and storage of high value chemical and biological entities. The application of microfluidic devices with high sensitivity and reproducibility may require the carry-on mixing and metering approach of the present invention in order to achieve practical and enhanced sensitivity and dynamic range to be of practical value in a research setting.

The microfluidic devices of the present invention may also utilize a configuration in which at least one solution is metered into a segment of a flow channel, typically through a junction disposed between valves along the flow channel. The junction typically has an on/off valve or a one way check valve at the inlet portion of the junction. The flow channel valves that bracket the junction are closed and the junction inlet valve is opened. A solution is instilled into the segment of the flow channel. The filling of the segment is preferably performed by "blind filling" the segment. Blind filling takes advantage of the permeability of the material defining at least one side of the flow channel to gases and not to liquid. The first solution is filled into the flow channel segment by placing the solution under pressure at the junction and allowing the first solution to fill the segment as the gases that are present in the flow channel diffuses out through the gas permeable material. Once the segment of the flow channel defined by the valves is filled, the inlet junction is closed or allowed to close and a precisely defined volume is contained within the flow channel segment. The exact volume is determined by the flow channel dimensions and the spacing of the valves along the segment that are closed to define the blind filled portion of the flow channel. With the valves remaining closed, a second solution is introduced into an empty portion of the flow channel by blind filling against one of the closed valves. By maintaining the second solution under pressure and then opening the valves on the flow channel segment, the second solution pushes the first solution through the flow channel. In a preferred embodiment, the flow channel segment valve opposite the valve against which the second solution is blind filled, is adjacent to a reaction well of a defined volume. When the flow channel segment valves are opened, the second solution pushes the first solution into the reaction well. By fabricating the reaction well such that the reaction well volume is greater that the volume of the first solution in the flow channel, a precisely defined amount of the second solution is pushed into the reaction well along with the known volume of the first solution. The volume of the second solution that fills the reaction well is defined by the volume of the reaction well minus the volume of the first solution. As both solutions fill the reaction well, mixing of the solutions occurs. The mixing of the solutions is typically efficient and is greater that 25% efficient, preferably greater than 35% efficient, more preferably greater than 50% efficient, more preferably greater that 65% efficient, more preferably greater than 75% efficient, more preferably greater than 85% efficient, more preferably greater than 90% efficient, more preferably greater than 95% efficient, more preferably greater that 99% efficient, and more preferably about 100% efficient. In one embodiment, the reaction well has only the flow channel entering the chamber defined by its volume. In another embodiment, the reaction well has a separate opening for an additional inlet or outlet channel. In an additional embodiment, the reaction well has a plurality of openings for other channels in addition to the described flow channel.

Various terms such as "pulse-chase," "carry-on," slug mixing," pig mixing," and "bolus mixing" may be used to describe the described mixing technique.

Microfluidic Chip Construction
Preferred Layer, Channel, and Reaction Well Dimensions:

Microfabricated refers to the size of features of an elastomeric structure fabricated in accordance with an embodiment of the present invention. In general, variation in at least one dimension of microfabricated structures is controlled to the micron level, with at least one dimension being microscopic (i.e. below 1000 µm). Microfabrication typically involves semiconductor or MEMS fabrication techniques such as photolithography and spincoating that are designed for to produce feature dimensions on the microscopic level, with at least some of the dimension of the microfabricated structure requiring a microscope to reasonably resolve/image the structure.

In preferred aspects, flow channels preferably have width-to-depth ratios of about 10:1. A non-exclusive list of other ranges of width-to-depth ratios in accordance with embodiments of the present invention is 0.1:1 to 100:1, more preferably 1:1 to 50:1, more preferably 2:1 to 20:1, and most preferably 3:1 to 15:1. In an exemplary aspect, flow channels have widths of about 1 to 1000 microns. A non-exclusive list of other ranges of widths of flow channels in accordance with embodiments of the present invention is 0.01 to 1000 microns, more preferably 0.05 to 1000 microns, more preferably 0.2 to 500 microns, more preferably 1 to 250 microns, and most preferably 10 to 200 microns. Exemplary channel widths include 0.1 µm, 1 µm, 2 µm, 5 µm, 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, and 250 µm.

Flow channels have depths of about 1 to 100 microns. A non-exclusive list of other ranges of depths of flow channels in accordance with embodiments of the present invention is 0.01 to 1000 microns, more preferably 0.05 to 500 microns, more preferably 0.2 to 250 microns, and more preferably 1 to 100 microns, more preferably 2 to 20 microns, and most preferably 5 to 10 microns. Exemplary channel depths include including 0.01 µm, 0.02 µm, 0.05 µm, 0.1 µm, 0.2 µm, 0.5 µm, 1 µm, 2 µm, 3 µm, 4 µm, 5 µm, 7.5 µm, 10 µm, 12.5 µm, 15 µm, 17.5 µm, 20 µm, 22.5 µm, 25 µm, 30 µm, 40 µm, 50 µm, 75 µm, 100 µm, 150 µm, 200 µm, and 250 µm.

Elastomeric layers may be cast thick for mechanical stability. In an exemplary embodiment, a layer is 50 microns to over a centimeter thick, and more preferably approximately 4 mm thick. A non-exclusive list of ranges of thickness of the elastomer layer in accordance with other embodiments of the present invention is between about 0.1 micron to 1 cm, 1 micron to 1 cm, 10 microns to 0.5 cm, 100 microns to 10 mm.

Accordingly, membranes separating flow channels have a typical thickness of between about 0.01 and 1000 microns, more preferably 0.05 to 500 microns, more preferably 0.2 to 250, more preferably 1 to 100 microns, more preferably 2 to 50 microns, and most preferably 5 to 40 microns. Exemplary membrane thicknesses include 0.01 µm, 0.02 µm, 0.03 µm, 0.05 µm, 0.1 µm, 0.2 µm, 0.3 µm, 0.5 µm, 1 µm, 2 µm, 3 µm, 5 µm, 7.5 µm, 10 µm, 12.5 µm, 15 µm, 17.5 µm, 20 µm, 22.5 µm, 25 µm, 30 µm, 40 µm, 50 µm, 75 µm, 100 µm, 150 µm, 200 µm, 250 µm, 300 µm, 400 µm, 500 µm, 750 µm, and 1000 µm.

Furthermore, embodiments of the present invention provide reduced reaction volumes. In embodiments of the present invention, reaction volumes ranging from 10 picoliters to 100 nanoliters are utilized. In some embodiments, reaction volumes greater than 100 nanoliters are utilized. Reaction wells may also be in the microliter, nanoliter, picoliter, femtoliter or lower range of volume. In one embodiment, the reaction well volume is between 1-1000 femtoliters. Merely by way of example, in an embodiment, the methods and systems of the present invention are utilized with reaction volumes of 10 picoliters, 50 picoliters, 100 picoliters, 250 picoliters, 500 picoliters, and 1 nanoliter. In alternative embodiments, reaction volumes of 2 nanoliters, 5 nanoliters, 10 nanoliters, 20 nanoliters, 30 nanoliters, 40 nanoliters, 50 nanoliters, 75 nanoliters, and 100 nanoliters are utilized. In another embodiment, the reaction well volume is between 1-1000 picoliters. In another embodiment, the reaction well volume is between 0.01-100 nanoliters, preferably between 1-75 nanoliters. In one embodiment the reaction well volume is about 50 nanoliters. In one embodiment the reaction well volume is about 7.6 nanoliters. In another embodiment, the reaction well volume is 6 nL. The volume defined for the first solution in the flow channel (the slug volume or carry-on volume) is a fraction of the reaction well volume. In various embodiments, the fraction may be ⅞, ¾, ⅝, ½, ⅜, ¼, ⅕, ⅛, 1/10, 1/12, 1/20, 1/25, 1/50, 1/100, or less of the total reaction well volume.

Multilayer Soft Lithography Construction Techniques and Materials:

Soft Lithographic Bonding:

Preferably, elastomeric layers are bonded together chemically, using chemistry that is intrinsic to the polymers comprising the patterned elastomer layers. Most preferably, the bonding comprises two component "addition cure" bonding.

In one aspect, the various layers of elastomer are bound together in a heterogenous bonding in which the layers have a different chemistry. Alternatively, a homogenous bonding may be used in which all layers would be of the same chemistry. Thirdly, the respective elastomer layers may optionally be glued together by an adhesive instead. In a fourth aspect, the elastomeric layers may be thermoset elastomers bonded together by heating.

In one aspect of homogeneous bonding, the elastomeric layers are composed of the same elastomer material, with the same chemical entity in one layer reacting with the same chemical entity in the other layer to bond the layers together. In one embodiment, bonding between polymer chains of like elastomer layers may result from activation of a crosslinking agent due to light, heat, or chemical reaction with a separate chemical species.

Alternatively in a heterogeneous aspect, the elastomeric layers are composed of different elastomeric materials, with a first chemical entity in one layer reacting with a second chemical entity in another layer. In one exemplary heterogenous aspect, the bonding process used to bind respective elastomeric layers together may comprise bonding together two layers of RTV 615 silicone. RTV 615 silicone is a two-part addition-cure silicone rubber. Part A contains vinyl groups and catalyst; part B contains silicon hydride (Si—H) groups. The conventional ratio for RTV 615 is 10A:1B. For bonding, one layer may be made with 30A:1B (i.e. excess vinyl groups) and the other with 3A:1B (i.e. excess Si—H groups). Each layer is cured separately. When the two layers are brought into contact and heated at elevated temperature, they bond irreversibly forming a monolithic elastomeric substrate.

Alternatively, other bonding methods may be used, including activating the elastomer surface, for example by plasma exposure, so that the elastomer layers/substrate will bond when placed in contact. For example, one possible approach to bonding together elastomer layers composed of the same material is set forth by Duffy et al, "Rapid Prototyping of Microfluidic Systems in Poly (dimethylsiloxane)", Analytical Chemistry (1998), 70, 4974-4984, incorporated herein by reference. This paper discusses that exposing polydimethylsiloxane (PDMS) layers to oxygen plasma causes oxidation of the surface, with irreversible bonding occurring when the two oxidized layers are placed into contact.

Yet another approach to bonding together successive layers of elastomer is to utilize the adhesive properties of uncured elastomer. Specifically, a thin layer of uncured elastomer such as RTV 615 is applied on top of a first cured elastomeric layer. Next, a second cured elastomeric layer is placed on top of the uncured elastomeric layer. The thin middle layer of uncured elastomer is then cured to produce a monolithic elastomeric structure. Alternatively, uncured elastomer can be applied to the bottom of a first cured elastomer layer, with the first cured elastomer layer placed on top of a second cured elastomer layer. Curing the middle thin elastomer layer again results in formation of a monolithic elastomeric structure.

Elastomeric layers may be created by spin-coating an RTV mixture on microfabricated mold at 2000 rpm for 30 seconds yielding a thickness of approximately 40 microns. Additional elastomeric layers may be created by spin-coating an RTV mixture on microfabricated mold. Both layers may be separately baked or cured at about 80° C. for 1.5 hours. The additional elastomeric layer may be bonded onto first elastomeric layer at about 80° C. for about 1.5 hours.

Suitable Elastomeric Materials:

Allcock et al, Contemporary Polymer Chemistry, 2nd Ed. describes elastomers in general as polymers existing at a temperature between their glass transition temperature and liquefaction temperature. Elastomeric materials exhibit elastic properties because the polymer chains readily undergo torsional motion to permit uncoiling of the backbone chains in response to a force, with the backbone chains recoiling to assume the prior shape in the absence of the force. In general, elastomers deform when force is applied, but then return to their original shape when the force is removed. The elasticity exhibited by elastomeric materials may be characterized by a Young's modulus.

The systems of the present invention may be fabricated from a wide variety of elastomers. In an exemplary aspect, elastomeric layers may preferably be fabricated from silicone rubber. However, other suitable elastomers may also be used.

In an exemplary aspect of the present invention, the present systems are fabricated from an elastomeric polymer such as GE RTV 615 (formulation), a vinyl-silane crosslinked (type) silicone elastomer (family). However, the present systems are not limited to this one formulation, type or even this family of polymer; rather, nearly any elastomeric polymer is suitable. An important requirement for the preferred method of fabrication of the present microvalves is the ability to bond multiple layers of elastomers together. In the case of multilayer soft lithography, layers of elastomer are cured separately and then bonded together. This scheme requires that cured layers possess sufficient reactivity to bond together. Either the layers may be of the same type, and are capable of bonding to themselves, or they may be of two different types, and are capable of bonding to each other. Other possibilities include the use an adhesive between layers and the use of thermoset elastomers.

Given the tremendous diversity of polymer chemistries, precursors, synthetic methods, reaction conditions, and potential additives, there are a huge number of possible elastomer systems that could be used to make monolithic elastomeric microvalves and pumps. Variations in the materials used will most likely be driven by the need for particular material properties, i.e. solvent resistance, stiffness, gas permeability, or temperature stability.

There are many, many types of elastomeric polymers. A brief description of the most common classes of elastomers is presented here, with the intent of showing that even with relatively "standard" polymers, many possibilities for bonding exist. Common elastomeric polymers include polyisoprene, polybutadiene, polychloroprene, polyisobutylene, poly(styrene-butadiene-styrene), the polyurethanes, and silicones.

Polyisoprene, Polybutadiene, Polychloroprene:

Polyisoprene, polybutadiene, and polychloroprene are all polymerized from diene monomers, and therefore have one double bond per monomer when polymerized. This double bond allows the polymers to be converted to elastomers by vulcanization (essentially, sulfur is used to form crosslinks between the double bonds by heating). This would easily allow homogeneous multilayer soft lithography by incomplete vulcanization of the layers to be bonded; photoresist encapsulation would be possible by a similar mechanism.

Polyisobutylene:

Pure polyisobutylene has no double bonds, but is crosslinked to use as an elastomer by including a small amount ($\approx 1\%$) of isoprene in the polymerization. The isoprene monomers give pendant double bonds on the polyisobutylene backbone, which may then be vulcanized as above.

Poly(Styrene-Butadiene-Styrene):

Poly(styrene-butadiene-styrene) is produced by living anionic polymerization (that is, there is no natural chain-terminating step in the reaction), so "live" polymer ends can exist in the cured polymer. This makes it a natural candidate for the present photoresist encapsulation system (where there will be plenty of unreacted monomer in the liquid layer poured on top of the cured layer). Incomplete curing would allow homogeneous multilayer soft lithography (A to A bonding). The chemistry also facilitates making one layer with extra butadiene ("A") and coupling agent and the other layer ("B") with a butadiene deficit (for heterogeneous multilayer soft lithography). SBS is a "thermoset elastomer", meaning that above a certain temperature it melts and becomes plastic (as opposed to elastic); reducing the temperature yields the elastomer again. Thus, layers can be bonded together by heating.

Polyurethanes:

Polyurethanes are produced from di-isocyanates (A--A) and di-alcohols or di-amines (B--B); since there are a large variety of di-isocyanates and di-alcohols/amines, the number of different types of polyurethanes is huge. The A vs. B nature of the polymers, however, would make them useful for heterogeneous multilayer soft lithography just as RTV 615 is: by using excess A--A in one layer and excess B--B in the other layer.

Silicones:

Silicone polymers probably have the greatest structural variety, and almost certainly have the greatest number of commercially available formulations. The vinyl-to-(Si—H) crosslinking of RTV 615 (which allows both heterogeneous multilayer soft lithography and photoresist encapsulation) has already been discussed, but this is only one of several crosslinking methods used in silicone polymer chemistry.

Cross Linking Agents:

In addition to the use of the simple "pure" polymers discussed above, crosslinking agents may be added. Some agents (like the monomers bearing pendant double bonds for vulcanization) are suitable for allowing homogeneous (A to A) multilayer soft lithography or photoresist encapsulation; in such an approach the same agent is incorporated into both elastomer layers. Complementary agents (i.e. one monomer bearing a pendant double bond, and another bearing a pendant Si—H group) are suitable for heterogeneous (A to B) multilayer soft lithography. In this approach complementary agents are added to adjacent layers.

Other Materials:

In addition, polymers incorporating materials such as chlorosilanes or methyl-, ethyl-, and phenylsilanes, and polydimethylsiloxane (PDMS) such as Dow Chemical Corp. Sylgard 182, 184 or 186, or aliphatic urethane diacrylates such as (but not limited to) Ebecryl 270 or Irr 245 from UCB Chemical may also be used.

The following is a non-exclusive list of elastomeric materials which may be utilized in connection with the present invention: polyisoprene, polybutadiene, polychloroprene, polyisobutylene, poly(styrene-butadiene-styrene), the polyurethanes, and silicone polymers; or poly(bis(fluoroaLkoxy) phosphazene) (PNF, Eypel-F), poly(carborane-siloxanes) (Dexsil), poly(acrylonitrile-butadiene) (nitrile rubber), poly (1-butene), poly(chlorotrifluoroethylene-vinylidene fluoride) copolymers (Kel-F), poly(ethyl vinyl ether), poly(vinylidene fluoride), poly(vinylidene fluoride-hexafluoropropylene) copolymer (Viton), elastomeric compositions of polyvinylchloride (PVC), polysulfone, polycarbonate, polymethylmethacrylate (PMMA), and polytertrafluoroethylene (Teflon).

Doping and Dilution:

Elastomers may also be "doped" with uncrosslinkable polymer chains of the same class. For instance RTV 615 may be diluted with GE SF96-50 Silicone Fluid. This serves to reduce the viscosity of the uncured elastomer and reduces the Young's modulus of the cured elastomer. Essentially, the crosslink-capable polymer chains are spread further apart by the addition of "inert" polymer chains, so this is called "dilution". RTV 615 cures at up to 90% dilution, with a dramatic reduction in Young's modulus.

Other examples of doping of elastomer material may include the introduction of electrically conducting or magnetic species, as described in detail below in conjunction with alternative methods of actuating the membrane of the device. Should it be desired, doping with fine particles of material having an index of refraction different than the elastomeric material (i.e. silica, diamond, sapphire) is also contemplated as a system for altering the refractive index of the material. Strongly absorbing or opaque particles may be added to render the elastomer colored or opaque to incident radiation. This may conceivably be beneficial in an optically addressable system.

Finally, by doping the elastomer with specific chemical species, these doped chemical species may be presented at the elastomer surface, thus serving as anchors or starting points for further chemical derivitization.

In the present application, references are made to certain types of "reaction" chambers or wells in a microfluidic device. In general and in addition to those characteristics described above, these include processing sites, processing chambers, and/or reaction sites, any combination of these, and the like. These chambers may be closed, partially closed, open, partially open, sealed, or combinations thereof, including any temporary or transient conditions involving any of these states, and the like. In some embodiments, the chambers are sealed, capable of being sealed, closeable, isolated, capable of being isolated, and combinations thereof, and any combination or single condition of any temporary or transient conditions involving any of these states, and the like. Therefore, use of the term reaction chamber is not intended to limit the present invention, but to include these other structures. Additionally, the term chamber is not intended to limit the present invention, but should be used in its ordinary meaning, unless specific features associated with the chamber have been recited. Of course, there can be other variations, modifications, and alternatives.

The microfluidic devices that are described herein are further characterized in part in some embodiments by utilizing various components such as flow channels, control channels, valves and/or pumps fabricated from elastomeric materials. In some instances, essentially the entire device is made of elastomeric materials. Consequently, such devices differ significantly in form and function from the majority of conventional microfluidic devices that are formed from plastics or silicon-based materials. The number of reaction chambers provided varies according to embodiments of the present invention. Other microfluidic devices fabricated by non elastomeric materials such as glass, silicon, rigid plastics, and metal are possible, however, elastomeric microfluidic devices are a preferred embodiment of the invention.

The design of the devices enables them to be utilized in combination with a number of different heating systems. Thus, the devices are useful in conducting diverse analyses that require temperature control. Additionally, those microfluidic devices adapted for use in heating applications can incorporate a further design feature to minimize evaporation of sample from the reaction sites. Devices of this type in general include a number of guard channels and/or reservoirs or chambers formed within the elastomeric device through which water can be flowed to increase the water vapor pressure within the elastomeric material from which the device is formed, thereby reducing evaporation of sample material from the reaction sites.

In another embodiment, a temperature cycling device may be used to control the temperature of the microfluidic devices. Preferably, the microfluidic device would be adapted to make thermal contact with the microfluidic device. Where the microfluidic device is supported by a substrate material, such as a glass slide or the bottom of a carrier plate, such as a plastic carrier, a window may be formed in a region of the carrier or slide such that the microfluidic device, preferably a device having an elastomeric block, may directly contact the heating/cooling block of the temperature cycling device. In a preferred embodiment, the heating/cooling block has grooves therein in communication with a vacuum source for applying a suction force to the microfluidic device, preferably a portion adjacent to where the reactions are taking place. Alternatively, a rigid thermally conductive plate may be bonded to the microfluidic device that then mates with the heating and cooling block for efficient thermal conduction resulting.

The array format of certain of the devices means the devices can achieve high throughput. Collectively, the high throughput and temperature control capabilities make the devices useful for performing large numbers of nucleic acid amplifications (e.g., polymerase chain reaction (PCR)). Such reactions will be discussed at length herein as illustrative of the utility of the devices, especially of their use in any reaction requiring temperature control. However, it should be understood that the devices are not limited to these particular applications. The devices can be utilized in a wide variety of other types of analyses or reactions. Examples include analyses of protein-ligand interactions and interactions between cells and various compounds. Further examples are provided throughout the present specification.

The microfluidic devices disclosed herein are typically constructed at least in part from elastomeric materials and constructed by single and multilayer soft lithography (MSL) techniques and/or sacrificial-layer encapsulation methods (see, e.g., Unger et al. (2000) Science 288:113-116, and PCT Publication WO 01/01025, both of which are incorporated by reference herein in their entirety for all purposes). Utilizing such methods, microfluidic devices can be designed in which solution flow through flow channels of the device is controlled, at least in part, with one or more control channels that are separated from the flow channel by an elastomeric membrane or segment. This membrane or segment can be deflected into or retracted from the flow channel with which a control channel is associated by applying an actuation force to the control channels. By controlling the degree to which the membrane is deflected into or retracted out from the flow channel, solution flow can be slowed or entirely blocked through the flow channel. Using combinations of control and flow channels of this type, one can prepare a variety of different types of valves and pumps for regulating solution flow as described in extensive detail in Unger et al. (2000) Science 288:113-116, and PCT Publication WO/02/43615 and WO 01/01025.

If the device is to be utilized in temperature control reactions (e.g., thermocycling reactions), then, as described in greater detail infra, the elastomeric device is typically fixed to a support (e.g., a glass slide). The resulting structure can then be placed on a temperature control plate, for example, to control the temperature at the various reaction sites. In the case of thermocycling reactions, the device can be placed on any of a number of thermocycling plates.

Because the devices are made of elastomeric materials that are relatively optically transparent, reactions can be readily monitored using a variety of different detection systems at essentially any location on the microfluidic device. Most typically, however, detection occurs at the reaction site itself (e.g., within a region that includes an intersection of flow channels or at the blind end of a flow channel). The fact that the device is manufactured from substantially transparent materials also means that certain detection systems can be utilized with the current devices that are not usable with traditional silicon-based microfluidic devices. Detection can be achieved using detectors that are incorporated into the device or that are separate from the device but aligned with the region of the device to be detected.

Some high-density matrix designs utilize fluid communication vias between layers of the microfluidic device to weave control lines and fluid lines through the device. For example, by having a fluid line in each layer of a two layer elastomeric block, higher density reaction cell arrangements are possible. As will be evident to one of skill in the art, multi-layer devices allow fluid lines to cross over or under each other without being in fluid communication. The microfluidic devices utilized in embodiments of the present invention may be further integrated into the carrier devices described in co-pending and commonly owned U.S. patent application Ser. No. 11/058,106 by Unger filed on Feb. 14, 2005, which is incorporated herein for all purposes. The carrier of Unger provides on-board continuous fluid pressure to maintain valve closure away from a source of fluid pressure, e.g., house air pressure. Unger further provides for an automated system for charging and actuating the valves of the present invention as described therein. An another preferred embodiment, the automated system for charging accumulators and actuating valves employs a device having a platen that mates against one or more surfaces of the microfluidic device, wherein the platen has at least two or more ports in fluid communication with a controlled vacuum or pressure source, and may include mechanical portions for manipulating portions of the microfluidic device, for example, but not limited to, check valves. Check valves may be incorporated into the chip design to provide for a one-way flow of fluid (either reagent, sample, first reactant, second reactant, third reactant, etc.). Check valves and their fabrication are described in commonly owned U.S. Provisional Application Ser. No. 60/849,223 by Wang filed on Oct. 4, 2006 which is incorporated herein for all purposes.

Another device utilized in embodiments of the present invention provides a carrier used as a substrate for stabilizing an elastomeric block. Preferably the carrier has one or more of the following features; a well or reservoir in fluid communication with the elastomeric block through at least one channel formed in or with the carrier; an accumulator in fluid communication with the elastomeric block through at least one channel formed in or with the carrier; and, a fluid port in fluid communication with the elastomeric block, wherein the fluid port is preferably accessible to an automated source of vacuum or pressure, such as the automated system described above, wherein the automated source further comprises a platen having a port that mates with the fluid port to form an isolated fluid connection between the automated system for applying fluid pressure or vacuum to the elastomeric block. In devices utilized in certain embodiments, the automated source can also make fluid communication with one or more accumulators associated with the carrier for charging and discharging pressure maintained in an accumulator. In certain embodiments, the carrier may further comprise a region located in an area of the carrier that contacts the microfluidic device, wherein the region is made from a material different from another portion of the carrier, the material of the region being selected for improved thermal conduction and distribution properties that are different from the other portion of the carrier. Preferred materials for improved thermal conduction and distribution include, but are not limited to silicon, preferably silicon that is highly polished, such as the type of silicon available in the semiconductor field as a polished wafer or a portion cut from the wafer, e.g., chip.

As described more fully below, embodiments of the present invention utilize a thermal source, for example, but not limited to a PCR thermocycler, which may have been modified from its original manufactured state. Generally the thermal source has a thermally regulated portion that can mate with a portion of the carrier, preferably the thermal conduction and distribution portion of the carrier, for providing thermal control to the elastomeric block through the thermal conduction and distribution portion of the carrier. In a preferred embodiment, thermal contact is improved by applying a source of vacuum to a one or more channels formed within the thermally regulated portion of the thermal source, wherein the channels are formed to contact a surface of the thermal conduction and distribution portion of the carrier to apply suction to and maintain the position of the thermal conduction and distribution portion of the carrier. In a preferred embodiment, the thermal conduction and distribution portion of the carrier is not in physical contact with the remainder of the carrier, but is associated with the remainder of the carrier and the elastomeric block by affixing the thermal conduction and distribution portion to the elastomeric block only and leaving a gap surrounding the edges of the thermal conduction and distribution portion to reduce parasitic thermal effects caused by the carrier. It should be understood that in many aspects of the invention described herein, the preferred elastomeric block could be replaced with any of the known microfluidic devices in the art not described herein, for example devices produced such as the GeneChip (R) by Affymetrix(R) of Santa Clara, Calif., USA, or by Caliper of Mountain View, Calif., USA. U.S. patents issued to Soane, Parce, Fodor, Wilding, Ekstrom, Quake, or Unger, describe microfluidic or mesoscale fluidic devices that can be substituted for the elastomeric block of the present invention to take advantage of the thermal advantages and improvements, e.g., suction positioning, reducing parasitic thermal transfer to other regions of the fluidic device, which are described above in the context of using an elastomeric block.

Utilizing systems and methods provided according to embodiments of the present invention, throughput increases are provided over 384 well systems. As an example, throughput increases of a factor of 4, 6, 12, and 24 and greater are provided in some embodiments. These throughput increases are provided while reducing the logistical friction of operations. Moreover the systems and methods of embodiments of the present invention enable multiple assays for multiple samples. For example, in a specific embodiment 24 samples and 24 assays are utilized to provide a total of 576 data points. In another embodiment, 32 samples and 32 assays are utilized to provide a total of 1024 data points. In another embodiment, 48 samples and 48 assays are utilized to provide 2304 data points. In another embodiment, 96 samples and 48 assays are utilized to provide 4608 data points. In another embodiment, 96 samples and 96 assays are utilized to provide a total of 9,216 data points. In a particular example, the 96 assays are components of a TaqMan 5' Nuclease Assay.

Depending on the geometry of the particular microfluidic device and the size of the microfluidic device and the arrangement of the fluid communication paths and processing site, embodiments of the present invention provide for a range of processing site (or reaction chamber) densities. In some embodiments, the methods and systems of the present invention are utilized with chamber densities ranging from about 100 chambers per $cm^2$ to about 1 million chambers per $cm^2$. Merely by way of example, microfluidic devices with chamber densities of 250, 1,000, 2,500, 10,000, 25,000, 100,000, and 250,000 chambers per $cm^2$ are utilized according to embodiments of the present invention. In some embodiments, chamber densities in excess of 1,000,000 chambers per $cm^2$ are utilized, although this is not required by the present invention.

Operating microfluidic devices with such small reaction volumes reduces reagent usage as well as sample usage. Moreover, some embodiments of the present invention provide methods and systems adapted to perform real-time detection, when used in combination with real-time quantitative PCR. Utilizing these systems and methods, three, four, five, or six orders of linear dynamic range are provided for some applications as well as quantitative resolution high enough to allow for the detection of sub-nanoMolar fluorophore concentrations in 10 nanoliter volumes.

Smart Chip Assays and Reactions

Through the present application, references are made to fluorescent indications from a microfluidic device. Included within the scope of the present invention are not only fluorescent indications, but luminescent indications, including chemiluminescent, electroluminescent, electrochemiluminescent, and phospholuminescent, bioluminescent, and other luminescent processes, or any other processing involving any other type of indications that may be detected using a detection device. As will be evident to one of skill in the art, methods and systems operable in the detection and analysis of these fluorescent and luminescent indications are transferable from one indication to another. Additionally, although some embodiments of the present invention utilize spectral filters as optical elements, this is not required by the present invention. Some fluorescent and luminescent applications do not utilize spectral filters in the optical excitation path, the optical emission path, or both. As described herein, other embodiments utilize spectral filters. One of skill in the art will appreciate the differences associated with particular applications.

In some embodiments, a variety of devices and methods for conducting microfluidic analyses are utilized herein, including devices that can be utilized to conduct thermal cycling reactions such as nucleic acid amplification reactions. The devices differ from conventional microfluidic devices in that they include elastomeric components; in some instances, much or all of the device is composed of elastomeric material. For example, amplification reactions can be linear amplifications, (amplifications with a single primer), as well as exponential amplifications (i.e., amplifications conducted with a forward and reverse primer set).

The methods and systems provided by some embodiments of the present invention utilize blind channel type devices in performing nucleic acid amplification reactions. In these devices, the reagents that are typically deposited within the reaction sites are those reagents necessary to perform the desired type of amplification reaction. Usually this means that some or all of the following are deposited: primers, polymerase, nucleotides, metal ions, buffer, and cofactors, for example. The sample introduced into the reaction site in such cases is the nucleic acid template. Alternatively, however, the template can be deposited and the amplification reagents flowed into the reaction sites. As discussed in more detail throughout the present specification, when a matrix device is utilized to conduct an amplification reaction, samples containing nucleic acid template are flowed through the vertical flow channels and the amplification reagents through the horizontal flow channels or vice versa.

PCR is perhaps the best known amplification technique. The devices utilized in embodiments of the present invention are not limited to conducting PCR amplifications. Other types of amplification reactions that can be conducted include, but are not limited to, (i) ligase chain reaction (LCR) (see Wu and Wallace, Genomics 4:560 (1989) and Landegren et al., Science 241:1077 (1988)); (ii) transcription amplification (see Kwoh et al., Proc. Natl. Acad. Sci. USA 86:1173 (1989)); (iii) self-sustained sequence replication (see Guatelli et al., Proc. Nat. Acad. Sci. USA, 87:1874 (1990)); and (iv) nucleic acid based sequence amplification (NASBA) (see, Sooknanan, R. and Malek, L., BioTechnology 13: 563-65 (1995)). Each of the foregoing references is incorporated herein by reference in their entirety for all purposes.

Moreover, certain devices are designed to conduct thermal cycling reactions (e.g., PCR) with devices that include one or more elastomeric valves to regulate solution flow through the device. Thus, methods for conducting amplification reactions with devices of this design are also provided.

Amplification products (amplicons) can be detected and distinguished (whether isolated in a reaction chamber or at any subsequent time) using routine methods for detecting nucleic acids. Many different signal moieties may be used in various embodiments of the present invention. For example, signal moieties include, but are not limited to, fluorophores, radioisotopes, chromogens, enzymes, antigens, heavy metals, dyes, phosphorescence groups, chemiluminescent groups, and electrochemical detection moieties. Exemplary fluorophores that may be used as signal moieties include, but are not limited to, rhodamine, cyanine 3 (Cy 3), cyanine 5 (Cy 5), fluorescein, VIC™, LIZ™, Tamra™, 5-FAM™, 6-FAM™, and Texas Red (Molecular Probes). (VIC™, LIZ™, Tamra™, 5-FAM™, and 6-FAM™ (all available from Applied Biosystems, Foster City, Calif.) Exemplary radioisotopes include, but are not limited to, $^{32}P$, $^{33}P$, and $^{35}S$. Signal moieties also include elements of multi-element indirect reporter systems, e.g., biotin/avidin, antibody/antigen, ligand/receptor, enzyme/substrate, and the like, in which the element interacts with other elements of the system in order to effect a detectable signal. Certain exemplary multi-element systems include a biotin reporter group attached to a probe and an avidin conjugated with a fluorescent label. Detailed protocols for methods of attaching signal moieties to oligonucleotides can be found in, among other places, G. T. Hermanson, Bioconjugate Techniques, Academic Press, San Diego, Calif. (1996) and S. L. Beaucage et al., Current Protocols in Nucleic Acid Chemistry, John Wiley & Sons, New York, N.Y. (2000).

Amplicons comprising double-stranded DNA can be detected using intercalation dyes such as SYBR™, Pico Green (Molecular Probes, Inc., Eugene, Oreg.), ethidium bromide and the like (see Zhu et al., 1994, Anal. Chem. 66:1941-48) and/or gel electrophoresis. More often, sequence-specific detection methods are used (i.e., amplicons are detected based on their nucleotide sequence). Examples of detection methods include hybridization to arrays of immobilized oligo or polynucleotides, and use of differentially labeled molecular beacons or other "fluorescence resonance energy transfer" (FRET)-based detection systems. FRET—based detection is a preferred method for detection according to some embodiments of the present invention. In FRET-based assays a change in fluorescence from a donor (reporter) and/or acceptor (quencher) fluorophore in a donor/acceptor fluorophore pair is detected. The donor and acceptor fluorophore pair are selected such that the emission spectrum of the donor overlaps the excitation spectrum of the acceptor. Thus, when the pair of fluorophores are brought within sufficiently close proximity to one another, energy transfer from the donor to the acceptor can occur and can be detected. A variety of assays are known including, for example and not limitation, template extension reactions, quantitative RT-PCR, Molecular Beacons, and Invader assays, these are described briefly below.

FRET and template extension reactions utilize a primer labeled with one member of a donor/acceptor pair and a nucleotide labeled with the other member of the donor/acceptor pair. Prior to incorporation of the labeled nucleotide into the primer during an template-dependent extension reaction, the donor and acceptor are spaced far enough apart that energy transfer cannot occur. However, if the labeled nucleotide is incorporated into the primer and the spacing is sufficiently close, then energy transfer occurs and can be detected. These methods are particularly useful in conducting single base pair extension reactions in the detection of single nucleotide polymorphisms and are described in U.S. Pat. No. 5,945,283 and PCT Publication WO 97/22719. The reactions can optionally be thermocycled to increase signal using the temperature control methods and apparatus described throughout the present specification.

A variety of so-called "real time amplification" methods or "real time quantitative PCR" methods can also be used to determine the quantity of a target nucleic acid present in a sample by measuring the amount of amplification product formed during or after the amplification process itself. Fluorogenic nuclease assays are one specific example of a real time quantitation method which can be used successfully with the devices described herein. This method of monitoring the formation of amplification product involves the continuous measurement of PCR product accumulation using a dual-labeled fluorogenic oligonucleotide probe—an approach frequently referred to in the literature as the "TaqMan" method. See, for example, U.S. Pat. No. 5,723,591.

With molecular beacons, a change in conformation of the probe as it hybridizes to a complementary region of the amplified product results in the formation of a detectable signal. The probe itself includes two sections: one section at the 5' end and the other section at the 3' end. These sections flank the section of the probe that anneals to the probe binding site and are complementary to one another. One end section is typically attached to a reporter dye and the other end section is usually attached to a quencher dye. In solution, the two end sections can hybridize with each other to form a hairpin loop. In this conformation, the reporter and quencher dye are in sufficiently close proximity that fluorescence from the reporter dye is effectively quenched by the quencher dye. Hybridized probe, in contrast, results in a linearized conformation in which the extent of quenching is decreased. Thus, by monitoring emission changes for the two dyes, it is possible to indirectly monitor the formation of amplification product. Probes of this type and methods of their use are described further, for example, by Piatek et al., 1998, Nat. Biotechnol. 16:359-63; Tyagi, and Kramer, 1996, Nat. Biotechnology 14:303-308; and Tyagi, et al., 1998, Nat. Biotechnol. 16:49-53 (1998).

The Scorpion detection method is described, for example, by Thelwell et al. 2000, Nucleic Acids Research, 28:3752-3761 and Solinas et al., 2001, "Duplex Scorpion primers in SNP analysis and FRET applications" Nucleic Acids Research 29:20. Scorpion primers are fluorogenic PCR primers with a probe element attached at the 5'-end via a PCR stopper. They are used in real-time amplicon-specific detection of PCR products in homogeneous solution. Two different formats are possible, the 'stem-loop' format and the 'duplex' format. In both cases the probing mechanism is intramolecular. The basic elements of Scorpions in all formats are: (i) a PCR primer; (ii) a PCR stopper to prevent PCR read-through of the probe element; (iii) a specific probe sequence; and (iv) a fluorescence detection system containing at least one fluorophore and quencher. After PCR extension of the Scorpion primer, the resultant amplicon contains a sequence that is complementary to the probe, which is rendered single-stranded during the denaturation stage of each PCR cycle. On cooling, the probe is free to bind to this complementary sequence, producing an increase in fluorescence, as the quencher is no longer in the vicinity of the fluorophore. The PCR stopper prevents undesirable read-through of the probe by Taq DNA polymerase.

Invader assays (Third Wave Technologies, Madison, Wis.) are used particularly for SNP genotyping and utilize an oligonucleotide, designated the signal probe that is complementary to the target nucleic acid (DNA or RNA) or polymorphism site. A second oligonucleotide, designated the Invader Oligo, contains the same 5' nucleotide sequence, but the 3' nucleotide sequence contains a nucleotide polymorphism. The Invader Oligo interferes with the binding of the signal probe to the target nucleic acid such that the 5' end of the signal probe forms a "flap" at the nucleotide containing the polymorphism. This complex is recognized by a structure specific endonuclease, called the Cleavase enzyme. Cleavase cleaves the 5' flap of the nucleotides. The released flap binds with a third probe bearing FRET labels, thereby forming another duplex structure recognized by the Cleavase enzyme. This time the Cleavase enzyme cleaves a fluorophore away from a quencher and produces a fluorescent signal. For SNP genotyping, the signal probe will be designed to hybridize with either the reference (wild type) allele or the variant (mutant) allele. Unlike PCR, there is a linear amplification of signal with no amplification of the nucleic acid. Further details sufficient to guide one of ordinary skill in the art are provided by, for example, Neri, B. P., et al., Advances in Nucleic Acid and Protein Analysis 3826:117-125, 2000) and U.S. Pat. No. 6,706,471.

A variety of multiplex amplification systems can be used in conjunction with the present invention. In one type, several different targets can be detected simultaneously by using multiple differently labeled probes each of which is designed to hybridize only to a particular target. Since each probe has a different label, binding to each target to be detected based on the fluorescence signals. By judicious choice of the different labels that are utilized, analyses can be conducted in which the different labels are excited and/or detected at different wavelengths in a single reaction. See, e.g., Fluorescence Spectroscopy (Pesce et al., Eds.) Marcel Dekker, New York, (1971); White et al., Fluorescence Analysis: A Practical Approach, Marcel Dekker, New York, (1970); Berlman, Handbook of Fluorescence Spectra of Aromatic Molecules, 2nd ed., Academic Press, New York, (1971); Griffiths, Colour and Constitution of Organic Molecules, Academic Press, New York, (1976); Indicators (Bishop, Ed.). Pergamon Press, Oxford, 19723; and Haugland, Handbook of Fluorescent Probes and Research Chemicals, Molecular Probes, Eugene (1992).

Many diseases linked to genome modifications, either of the host organism or of infectious organisms, are the consequence of a change in a small number of nucleotides, frequently involving a change in a single nucleotide. Such single nucleotide changes are referred to as single nucleotide polymorphisms or simply SNPs, and the site at which the SNP occurs is typically referred to as a polymorphic site. The devices described herein can be utilized to determine the identify of a nucleotide present at such polymorphic sites. As an extension of this capability, the devices can be utilized in genotyping analyses. Genotyping involves the determination of whether a diploid organism (i.e., an organism with two copies of each gene) contains two copies of a reference allele (a reference-type homozygote), one copy each of the reference and a variant allele (i.e., a heterozygote), or contains two copies of the variant allele (i.e., a variant-type homozygote). When conducting a genotyping analysis, the methods of the invention can be utilized to interrogate a single variant site. However, as described further below in the section on multiplexing, the methods can also be used to determine the genotype of an individual in many different DNA loci, either on the same gene, different genes or combinations thereof.

Genotyping analyses can be conducted using a variety of different approaches. In these methods, it is generally sufficient to obtain a "yes" or "no" result, i.e., detection need only be able to answer the question whether a given allele is present. Thus, analyses can be conducted only with the primers or nucleotides necessary to detect the presence of one allele potentially at a polymorphic site. However, more typically, primers and nucleotides to detect the presence of each allele potentially at the polymorphic site are included.

Single Base Pair Extension (SBPE) reactions are one technique specifically developed for conducting genotyping analyses. Although a number of SPBE assays have been developed, the general approach is quite similar. Typically, these assays involve hybridizing a primer that is complementary to a target nucleic acid such that the 3' end of the primer is immediately 5' of the variant site or is adjacent thereto. Extension is conducted in the presence of one or more labeled non-extendible nucleotides that are complementary to the nucleotide(s) that occupy the variant site and a polymerase. The non-extendible nucleotide is a nucleotide analog that prevents further extension by the polymerase once incorporated into the primer. If the added non-extendible nucleotide(s) is (are) complementary to the nucleotide at the variant site, then a labeled non-extendible nucleotide is incorporated onto the 3' end of the primer to generate a labeled extension product. Hence, extended primers provide an indication of which nucleotide is present at the variant site of a target nucleic acid. Such methods and related methods are discussed, for example, in U.S. Pat. Nos. 5,846,710; 6,004,744; 5,888,819; 5,856,092; and 5,710,028; and in WO 92/16657.

Genotyping analyses can also be conducted using quantitative PCR methods. In this case, differentially labeled probes complementary to each of the allelic forms are included as reagents, together with primers, nucleotides and polymerase. However, reactions can be conducted with only a single probe, although this can create ambiguity as to whether lack of signal is due to absence of a particular allele or simply a failed reaction. For the typical biallelic case in which two alleles are possible for a polymorphic site, two differentially labeled probes, each perfectly complementary to one of the alleles are usually included in the reagent mixture, together with amplification primers, nucleotides and polymerase. Sample containing the target DNA is introduced into the reaction site. If the allele to which a probe is complementary is present in the target DNA, then amplification occurs, thereby resulting in a detectable signal as described in the detection above. Based upon which of the differential signal is obtained, the identity of the nucleotide at the polymorphic site can be determined. If both signals are detected, then both alleles are present. Thermocycling during the reaction is performed as described in the temperature control section supra.

Gene expression analysis involves determining the level at which one or more genes is expressed in a particular cell. The determination can be qualitative, but generally is quantitative. In a differential gene expression analysis, the levels of the gene(s) in one cell (e.g., a test cell) are compared to the expression levels of the same genes in another cell (control cell). A wide variety of such comparisons can be made. Examples include, but are not limited to, a comparison between healthy and diseased cells, between cells from an individual treated with one drug and cells from another untreated individual, between cells exposed to a particular toxicant and cells not exposed, and so on. Genes whose expression levels vary between the test and control cells can serve as markers and/or targets for therapy. For example, if a certain group of genes is found to be up-regulated in diseased cells rather than healthy cells, such genes can serve as markers of the disease and can potentially be utilized as the basis for diagnostic tests. These genes could also be targets. A strategy for treating the disease might include procedures that result in a reduction of expression of the up-regulated genes.

The devices of the present application are not limited to biological assays such as PCR reactions. The efficient mixing of the carry-slug design is an enhancement to any chemical or biochemical assay and can be utilized in chemical synthesis (in particular where it is desirable to monitor reaction progress or degree of completion of the reaction in an SBS formatted reader). Other assays that benefit from the present invention include immunological and enzymatic assays.

Exemplary Chip Holder

Figure 7:
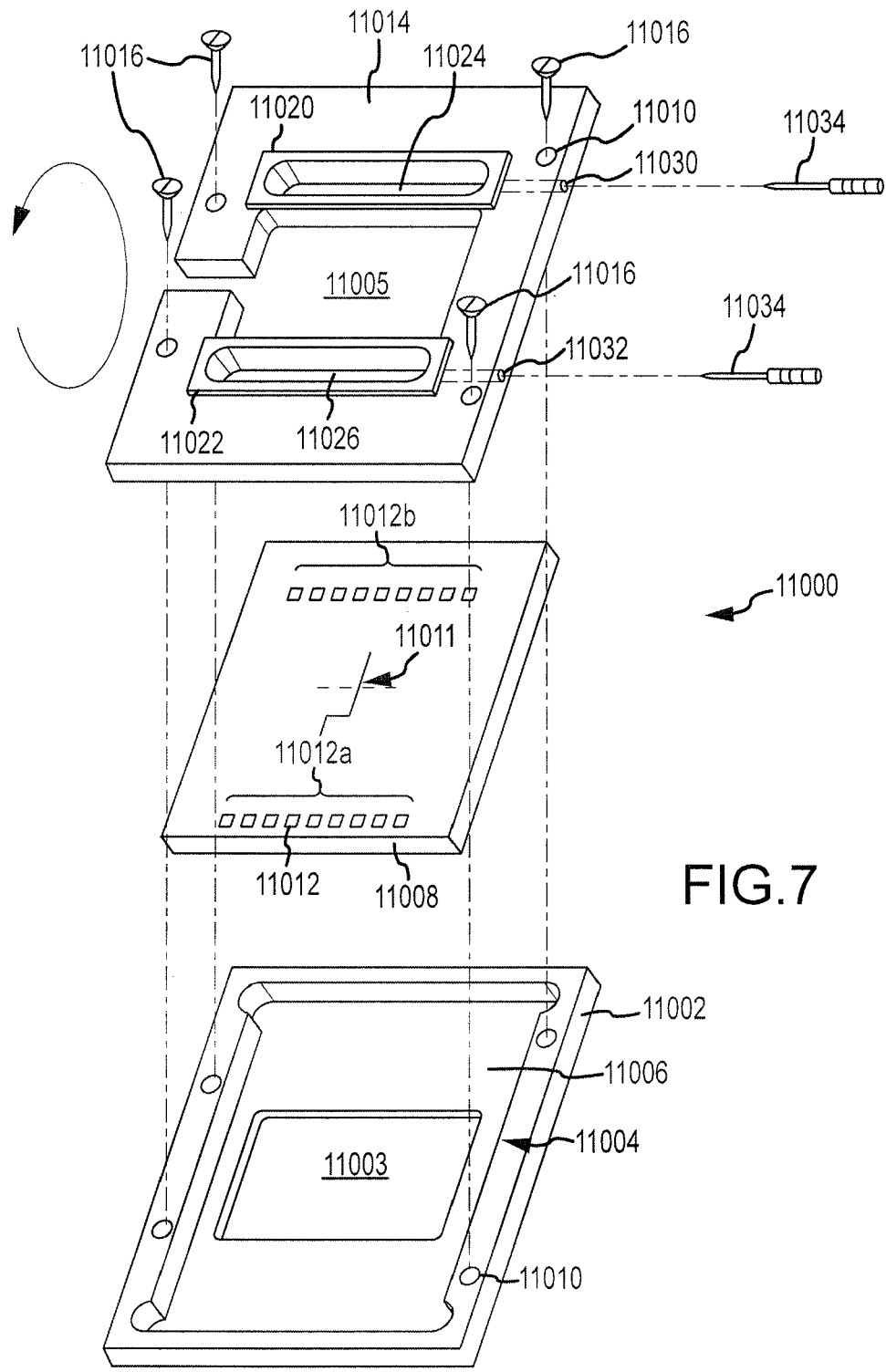
FIG. 7 shows an enlarged view of one embodiment of a chip holder in accordance with the present invention.

FIG. 7 shows an exploded view of a chip holder 11000 in accordance with one embodiment of the present invention. Bottom portion 11002 of chip holder 11000 includes raised peripheral portion 11004 surrounding recessed area 11006 corresponding in size to the dimensions of chip 11008, allowing microfluidic chip 11008 to be positioned therein. Peripheral region 11004 further defines screw holes 11010.

Microfluidic device 11008 is positioned within recessed area 11006 of bottom portion 11002 of chip holder 11000. Microfluidic device 11008 comprises an active region 11011 that is in fluidic communication with peripheral wells 11012 configured in first and second rows 11012a and 11012b, respectively. Wells 11012 hold sufficient volumes of material to allow device 11008 to function. Wells 11012 may contain, for example, solutions of crystallizing agents, solutions of target materials, or other chemical reagents such as stains. Bottom portion 11002 contains a window 11003 that enables active region 11011 of chip 11008 to be observed.

Top portion 11014 of chip holder 11000 fits over bottom chip holder portion 11002 and microfluidic chip 11008 positioned therein. For ease of illustration, in FIG. 7 top chip holder portion 11014 is shown inverted relative to its actual position in the assembly. Top chip holder portion 11014 includes screw holes 11010 aligned with screw holes 11010 of lower holder portion 11002, such that screws 11016 may be inserted through holes 11010 secure chip between portions 11002 and 11014 of holder 11000. Chip holder upper portion 11014 contains a window 11005 that enables active region 11011 of chip 11008 to be observed.

Lower surface 11014a of top holder portion 11014 includes raised annular rings 11020 and 11022 surrounding recesses 11024 and 11026, respectively. When top portion 11014 of chip holder 11000 is pressed into contact with chip 11008 utilizing screws 11016, rings 11020 and 11022 press into the soft elastomeric material on the upper surface of chip 11008, such that recess 11024 defines a first chamber over top row 11012a of wells 11012, and recess 11026 defines a second chamber over bottom row 11012b of wells 11012. Holes 11030 and 11032 in the side of top holder portion 11014 are in communication with recesses 11024 and 11026 respectively, to enable a positive pressure to be applied to the chambers through pins 11034 inserted into holes 11030 and 11032, respectively. A positive pressure can thus simultaneously be applied to all wells within a row, obviating the need to utilize separate connecting devices to each well.

In operation, solutions are pipetted into the wells 11012, and then chip 11008 is placed into bottom portion 11002 of holder 11000. The top holder portion 11014 is placed over chip 11008, and is pressed down by screws. Raised annular rings 11020 and 11022 on the lower surface of top holder portion 11014 make a seal with the upper surface of the chip where the wells are located. Solutions within the wells are exposed to positive pressures within the chamber, and are thereby pushed into the active area of microfluidic device.

The downward pressure exerted by the chip holder may also pose the advantage of preventing delamination of the chip from the substrate during loading. This prevention of delamination may enable the use of higher priming pressures.

The chip holder shown in FIG. 7 represents only one possible embodiment of a structure in accordance with the present invention.

Exemplary Systems for Delivery Fluids to Reaction Sites

The positive-displacement cross-injection metering scheme allows for sequential injection of precise sample aliquots from a single microfluidic channel into an array of reaction chambers through a positive displacement cross-injection (PCI) junction. FIGS. 8A-D show simplified schematic views of positive displacement cross-injection (PCI) for robust and programmable high precision dispensing on chip.

Figure 8A:
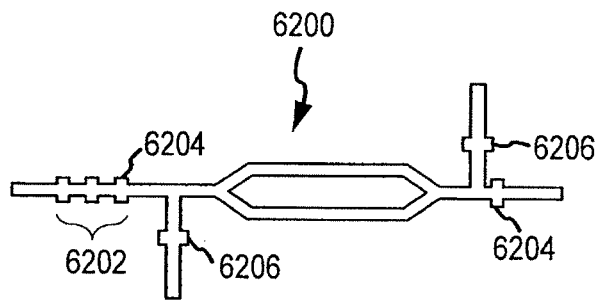
FIGS. 8A-D are simplified schematic diagrams illustrating positive displacement cross-injection (PCI) dispensing.

FIG. 8A shows a schematic view of a four port PCI junction. As shown in FIG. 8A, the PCI junction 6200 is formed by the combination of a three-valve peristaltic pump 6202 and a novel four-port cross-injection junction with integrated valves on each port. At each junction, two sets of valves 6204 and 6206 are actuated to direct the flow either horizontally or vertically. The split channel architecture creates a larger volume injector region, thereby allowing for an increased number of injections before recharging.

Figure 8B:
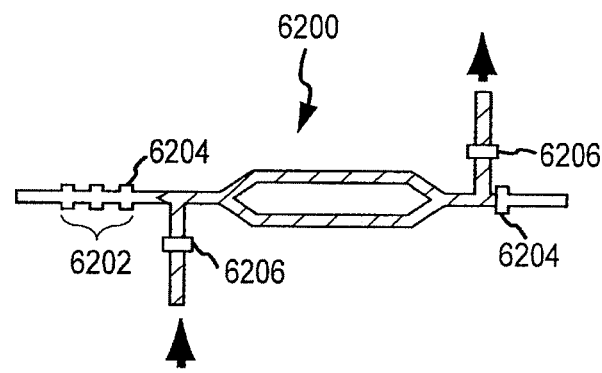

FIG. 8B shows charging the injector region of the PCI junction. To execute the metering task, the flow is switched vertically through the junction, charging the cross-injector with the sample fluid. Junction valves are actuated to direct the flow vertically through the junction, filling the injector region.

Figure 8C:
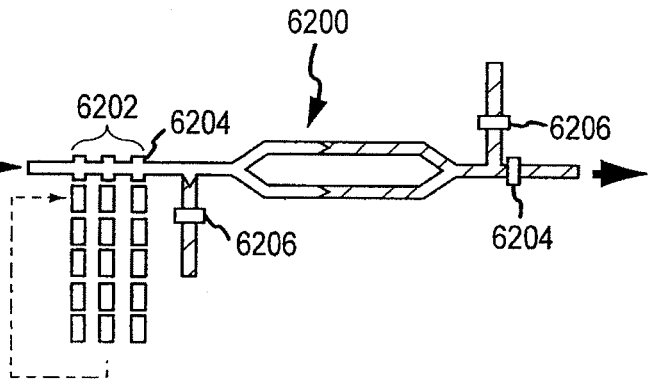

FIG. 8C shows precise positive displacement metering by actuation of peristaltic pump valves in pumping sequence. The flow is then directed horizontally through the junction and the three valves forming the peristaltic pump are actuated in a five state sequence to advance the fluid in the horizontal direction.

Figure 8D:
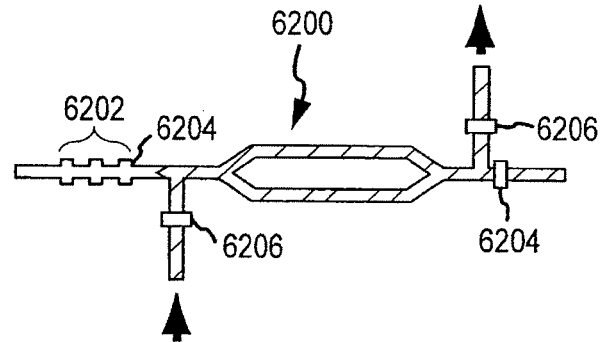

FIG. 8D shows the PCI junction sequentially charged with different solutions to create complex multi-component mixtures. Each cycle of the peristaltic pump injects a well-defined volume of sample (approximately 80 pL), determined by the dead volume under the middle valve of the peristaltic pump. The deflection of the valve membranes when not actuated is determined by the pressure difference across the membrane. The volume injected during each cycle therefore may be tuned continuously, allowing for variable positive displacement metering. By repeating the injection sequence, the volume of injected solution may be increased in 80 pL increments, allowing for the dynamic quantized control of the final downstream sample concentration.

EXAMPLES

Example 1

Fabrication and Operation of Carry-On Reaction Cells

Reaction cells are fabricated in 100 nL (FIG. 9A), 10 nL (FIG. 9B), and 1.5 nL (FIG. 9C) volumes by multilayer soft lithography. A reaction chamber 100 is prepared on a first spin layer of varying thicknesses. For a 100 nL reaction chamber, a 100 um recess is patterned with SU8 photoresist and a first polydimethylsiloxane (PDMS) elastomeric layer is prepared by spin coating the resist pattern to define a 100 nL reaction chamber (100) with an open side and a closed side. Once the first layer is cured, a via (130) is laser punched through the closed side of the reaction chamber. A second elastomeric layer is prepared by spin coating a resist pattern to define a 10 um rounded reagent slug channel (150) in fluidic communication with a 30 um rounded reagent input flow channel (110). The channels are formed as recesses in the second layer. The reagent input flow channel is formed as a bus channel to connect with additional reagent slug flow channels when forming multiple reaction cells. When the second layer is cured, via (140) is laser punched through the ceiling of one end of the reagent slug flow channel. A third elastomeric layer is prepared as a pour layer over a photoresist mold. The photoresist pattern defines recesses for a first 28 um control channel (160) and a second 28 um control channel (170). The control channels have a widened recess area that is intended to overlie the ceiling membranes of the flow channels for which they are intended to control. When the control channel is sufficiently pressurized, the ceiling membrane of the flow channel that is beneath the widened control channel recess area will be deflected into the flow channel beneath it thus sealing off the flow channel. When pressure is reduced or removed, the ceiling membrane of the flow channel will deflect upward to reopen the flow channel. A narrow portion of the control channel carries the control fluid for pressurizing the control channel. By selecting proper control channel geometries and flow channel ceiling membrane thicknesses, the narrow portion of the control channel overlies portions of flow channels but does not deflect the flow channels ceiling membrane into the flow channel at these intersections upon pressurization of the control channel. Also defined in the third elastomeric layer is recess for a sample inlet channel (120). Once the third elastomeric layer is cured, it is removed from the photoresist mold. The layers are then aligned and assembled—first by assembling the "third" and "second" layers, and then by assembling the "third/second" layer with the "first". The elastomeric layers are bonded together by first plasma treating the surfaces of the layers and then contacting the layers. The layers are aligned such that: 1) the first layer is placed with the reaction chamber opening downward; 2) second elastomeric layer is aligned on top of the first layer so that the reagent slug channel recess (150) is in fluid communication with the slug to reaction chamber via (130); and 3) the third elastomeric layer is aligned so that the recess defining the sample input channel (140) is in fluid communication with the sample to slug via (140). The third elastomeric layer is also aligned so that the recesses that define control channel 1 (160) with a widened control channel recess area overlies two ends of the reagent slug flow channel. The widened control channel recess area of control channel 2 (170) is aligned so that it overlies a portion of the reagent slug flow channel that interfaces to the reagent input flow channel (110). The assembled elastomeric layers form a microfluidic reaction cell that is bonded to a silicon base layer. In this example, the base layer is a solid monolithic slab of silicon that seals the open end of the reaction chamber and also functions as a heat transfer surface for temperature control of reactions such as polymerase chain reaction (PCR). Reaction chamber volumes of 10 nl and 1.5 nl are prepared with 60 um recess in the first elastomeric layer that defines the reaction chamber depth and with reduced length and width dimensions.

To operate the carry-slug reaction cell, control channel 1 is pressurized to deflect the elastomeric membrane valve and close the slug reagent flow channel at its interface with the sample to slug via and the slug to reaction chamber via. The reagent input flow channel is pressurized and the entire slug reagent flow channel is blind filled with the desired reagent. Simultaneously, the sample input flow channel is also pressurized and the entire sample flow channel is blind filled up to the valve delineated by control channel 1. Control channel 2 is then pressurized to deflect the elastomeric membrane valve that closes the slug reagent flow channel near its interface with the reagent input flow channel. The sample input flow channel is then re-pressurized and control channel 1 is depressurized to open the slug reagent flow channel at its via connections. The contents of the slug reagent flow channel are then transferred into the reaction chamber through blind filling and under pressure from the sample input flow channel. The volume of the reaction chamber is in excess of the volume of the slug reagent flow channel which allows for sample to continue flowing from the sample input flow channel and the slug reagent flow channel and to fill up the reaction chamber in the amount that is the difference of the reaction chamber volume and the slug reagent flow channel volume. Control channel 1 is repressurized to close off the reaction chamber. The reagent and sample are retained in a mixed solution in the reaction chamber and the reaction is allowed to proceed.

Example 2

Fabrication of a Matrix Reaction Array

A 32×32 elastomeric microfluidic matrix reaction array with slug mixing was constructed and mixing efficiency was compared to a conventional 32×32 elastomeric microfluidic matrix reaction array constructed with a sample/reaction chamber adjacent to a reagent chamber and separated by an interface valve.

Figure 10:
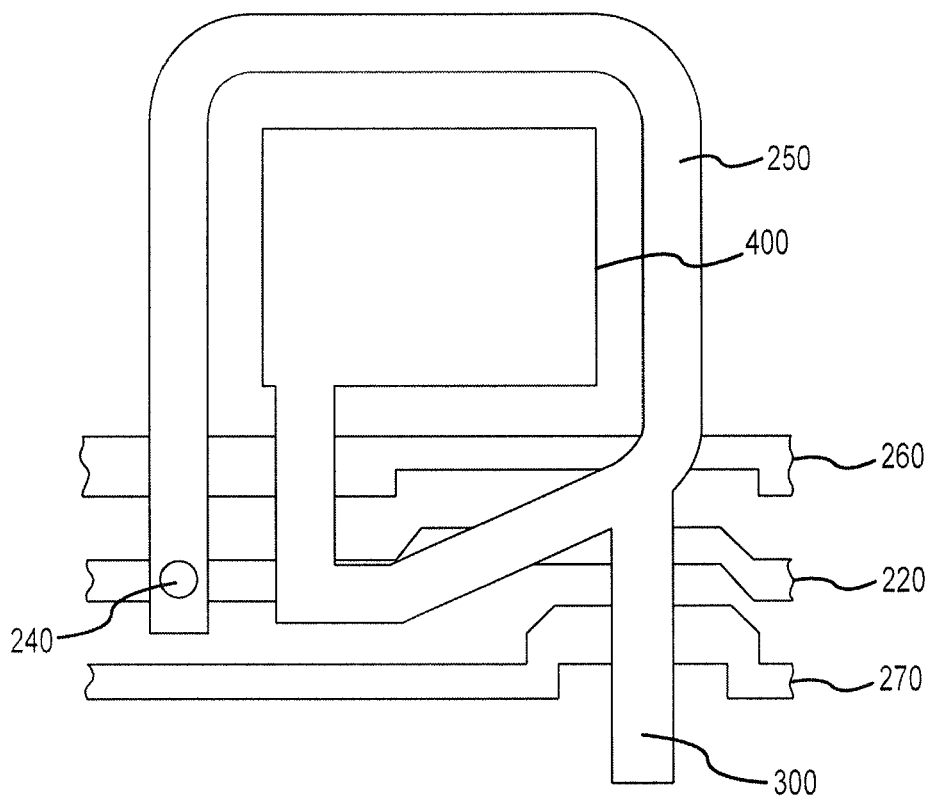
FIG. 10 is an embodiment of a carry-on (or pig mix) reaction cell design.

The matrix reaction array was constructed with each reaction cell comprising a central 50 nL reaction chamber (400) and a 5 nL slug channel (250) as shown in FIG. 10. The unit reaction cell of FIG. 2 was repeated to prepare a 32×32 matrix fluidic circuit. Using multilayer soft lithography, a first pour layer was patterned with SU8 photoresist to form a mold and then cast with PDMS. The features of the pour layer included a 350 um tall reaction chamber and a 30 um tall slug channel. The other, feature, a connecting channel (300) was constructed with a height of 10 um. A second spin layer was prepared with 15 um tall features for sample input channel (220) and control channel 1 (260) and control channel 2 (270). The second layer was laser punched to form the sample-to-slug via (240). The first pour layer was aligned and bonded to the second spin layer and the bonded assembly then removed from the resist pattern. The bonded assembly comprising layers 1 and 2 was then bonded to a thin spun base layer to complete the elastomeric assembly.

Figure 11:
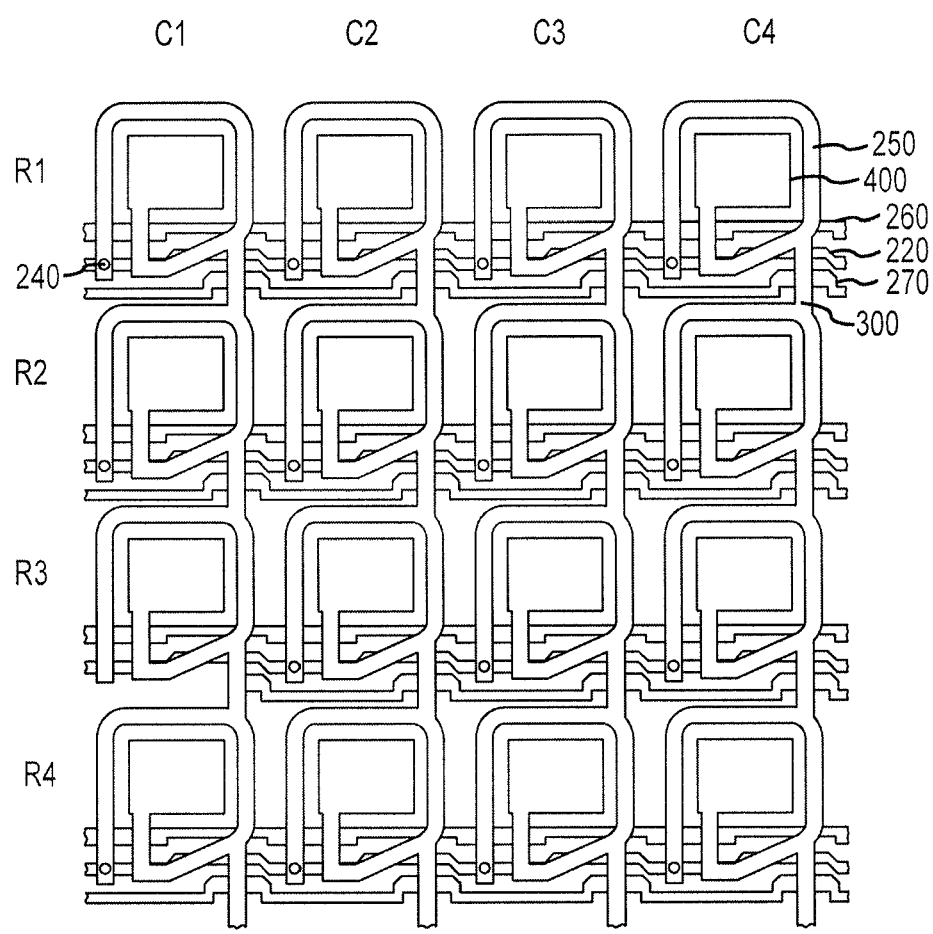
FIG. 11 is a diagram of a portion of a 32×32 carry-on reaction cell matrix.

FIG. 11 depicts a representative portion of the 32×32 matrix fluidic circuit. The matrix circuit was divided by column (eg C1, C2, C3, C4) and rows (eg R1, R2, R3, R4). The slug channels 250 of cells in a particular column, such as column C4, are in fluidic communication via connecting channels (300). Connecting channel 300 constitutes a fill inlet for the slug channel. A valve defined by a deflectable membrane of control channel 2 (270) can fluidically isolate the slug channels of the individual unit cells of a given column. The isolation of the slug channels from each other is accomplished by pressurization of control channel 2 causing the deflectable membrane portions to deflect into the connecting channels and sealing off flow through the connecting channels. The slug channels of a given column are therefore interconnected in their native state and capable of being isolated upon actuation of control channel 2. A similar arrangement of interconnects exists for the rows of the matrix device. A common bus line, sample input channel (220), exists in the second layer of the device. This bus line provides a common sample input for all of the unit reaction cells of a particular row of the device. The sample input channel is connected to the individual slug channels through the sample-to-slug via connecting the sample input channel in the second layer to the first end of the slug channel in the first layer. The second end of the slug channel connects directly to the reaction well (400). The configuration of the slug channel allows the first end to be fluidically isolated from the sample-to-slug via and the second end to be isolated from the reaction well with the actuation the valves formed from control channel 1. The pressurization of control channel 1, which resides in the second layer, causes the deflection of a membrane in the top of the control channel to deflect into slug channel near the first end and the second end to fluidically isolate the ends of the slug channel.

Example 3

Demonstration of the Filling and Mixing of a 32×32 Matrix Reaction Array

Figure 12A:
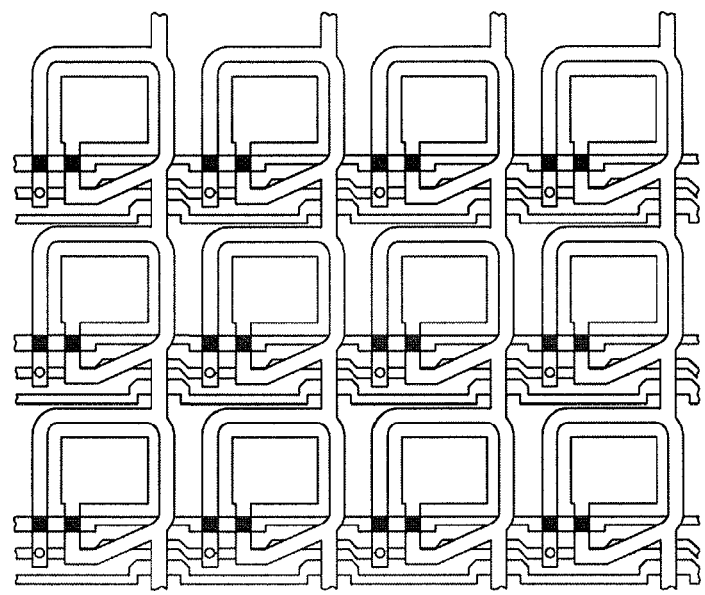
FIGS. 12A-H are micrographs showing mixing in a portion of a 32×32 carry-on reaction cell matrix.
Figure 12B:
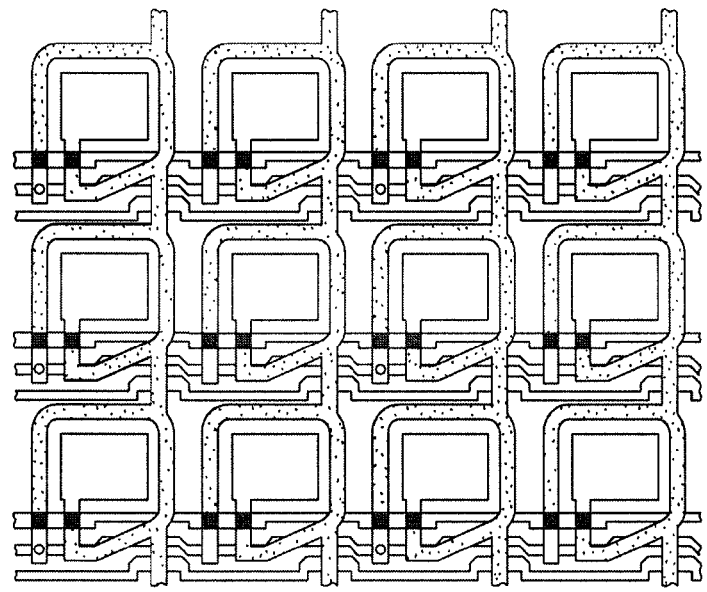
Figure 12C:
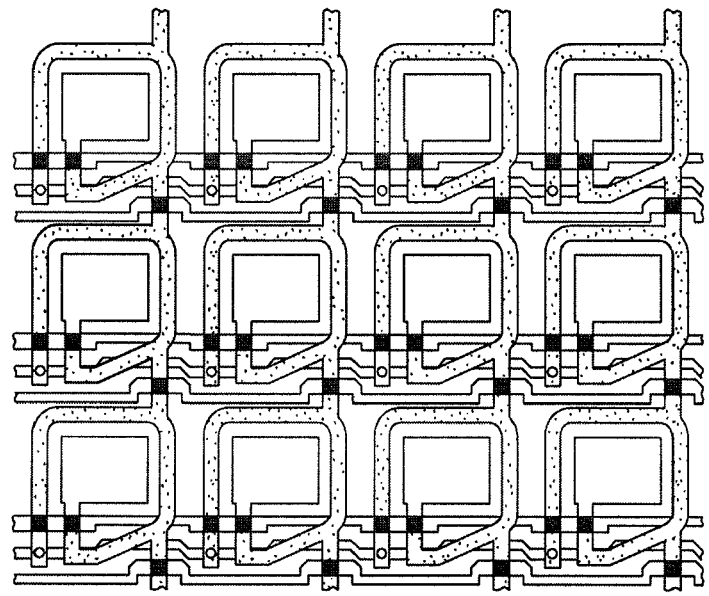
Figure 12D:
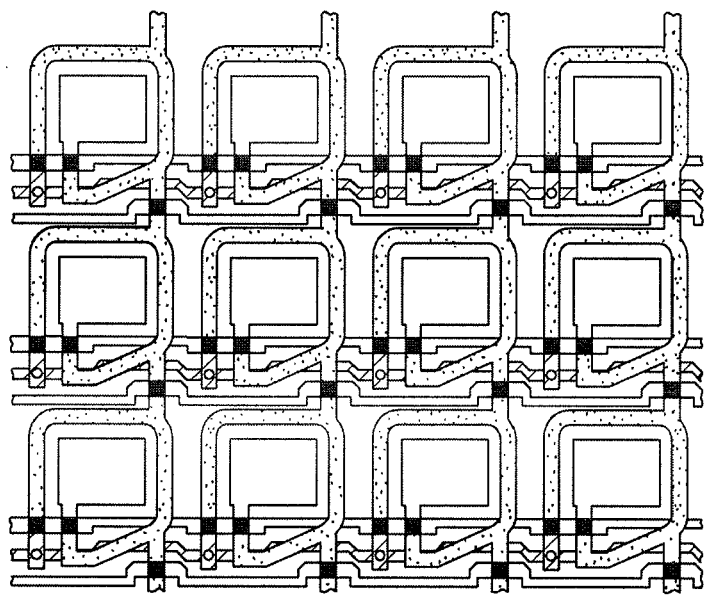
Figure 12E:
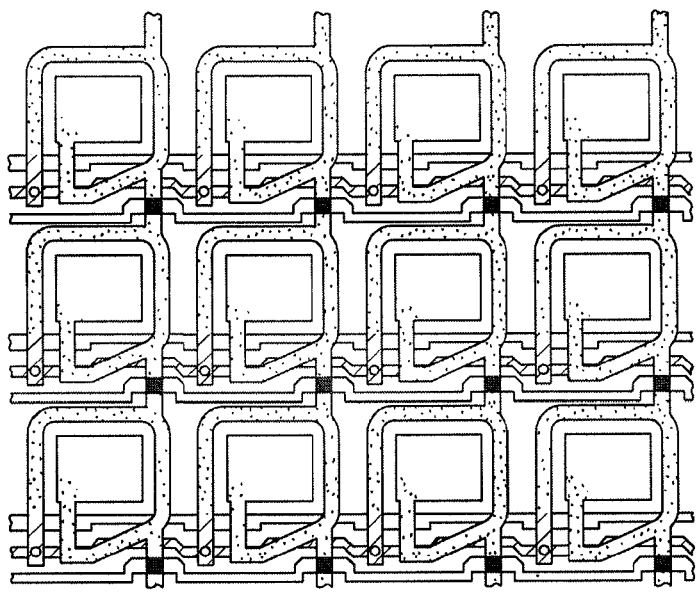
Figure 12F:
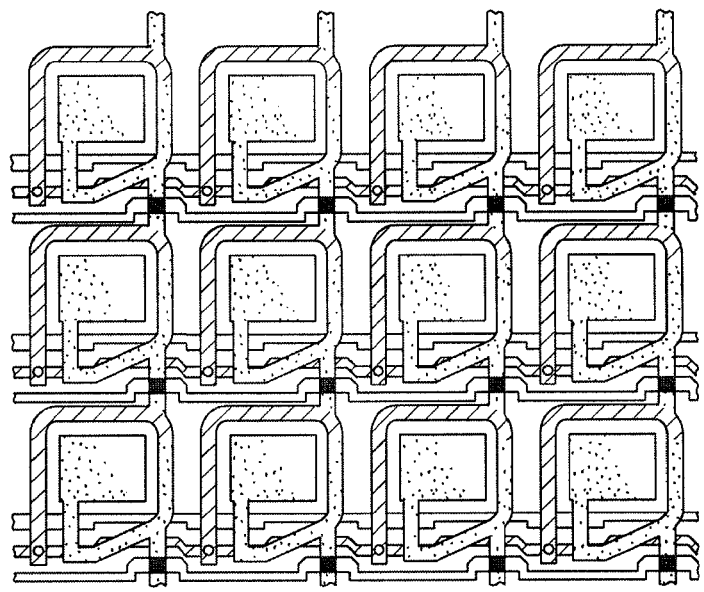
Figure 12G:
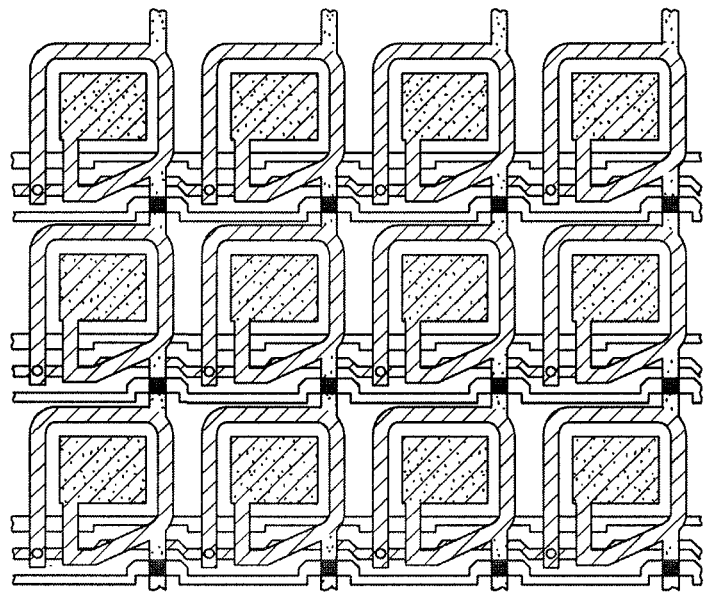
Figure 12H:
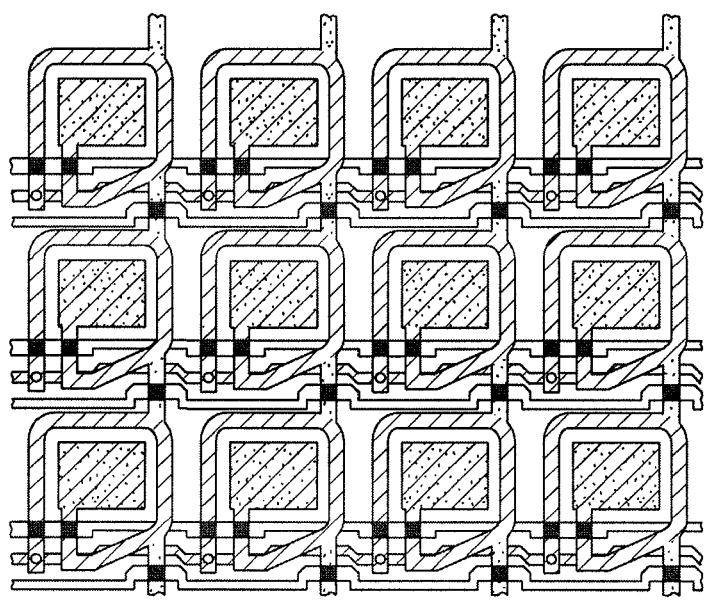

Operation of the matrix reaction array was performed by the following steps. Control channel 1 (260) was pressurized to close the valves that fluidically isolate the ends of the slug channel (FIG. 12A). A yellow food dye was introduced under pressure through the connecting channels (300) and the slug channels were blind-filled (FIG. 12B). This step simulates the filling of the slug channel with reagent. Following the filling of the slug channels, control channel 2 (270) is pressurized to actuate the valves that close off the connecting channels (300) and thereby isolate the individual slug channels from the other slug channels in the columns. Although all columns in the reaction array and, accordingly, all slug channels, are filled with the same yellow food dye in this example, there is no interconnection between the connecting channels and the slug channels of the individual columns. Following the blind filling of the slug channels and their isolation, a blue food dye was introduced under pressure into all sample input channels (220) (FIG. 12D). The control channels 1 were then depressurized to open the interface valves that were previously closed to isolate the ends of the slug channels (FIG. 12E). The blue food dye that represents the sample in this Example, enters the slug channel at the first end and pushes the reagent into the reaction well (FIG. 12F). This resulted in a highly mixed, loaded reaction well (400) containing the 5 nL of yellow food dye reagent surrogate and 45 nL of blue food dye sample surrogate (50 nL total reaction well volume) (FIG. 12G). Finally, in this demonstration, control channels 1 are pressurized which results in the closure of the interface valves (FIG. 12H). Although all rows in the reaction array and, accordingly, all sample input channels, are filled with the same blue food dye in this example, there is no interconnection between the sample input channels of the individual rows and different samples can be introduced into the individual rows. In the configuration of this Example, 32 separate samples can be simultaneously mixed and loaded into reaction wells with 32 separate reagents for 1024 individual experiments.

Example 4

Flow Channel Provided with Multiple Mixing Segments

Figure 13:
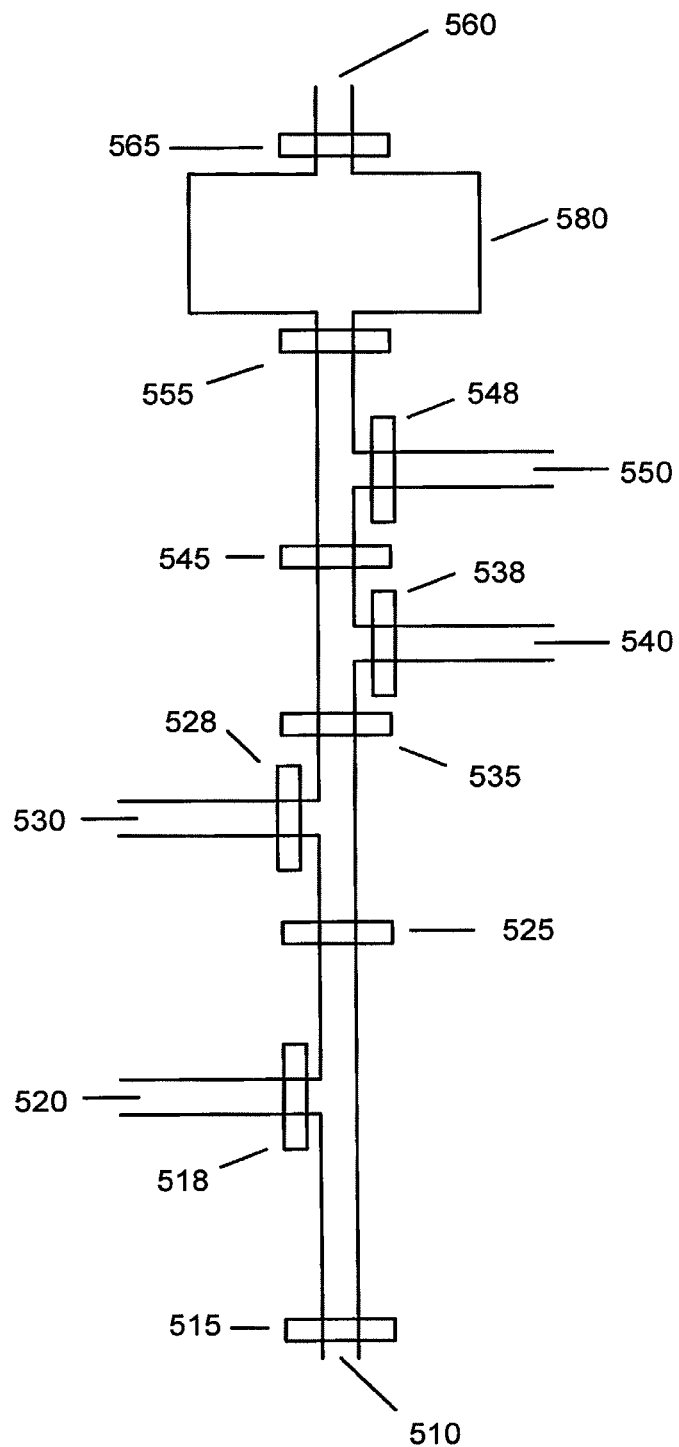
FIG. 13 is a diagram of an exemplary carry-on mixing and metering channel with multiple slug injection segments.

FIG. 13 is a representation of a flow channel that provides for multiple slug mixing segments. Flow channel (510) has a first end gated by valve 515 and a second end gated by valve 555 that opens into reaction well (580). The reaction well has an optional outlet channel (560) that is gated by valve 565. Along the length of the flow channel are multiple junction inlets: 520, 530, 540, and 550, each gated respectively by valves 518, 528, 538, and 548. Each slug mixing segment is defined by a valve pair that brackets the inlet junction. A first slug mixing segment is defined by the segment of the flow channel defined by inlet channel 520 and valves 515 and 525. A second slug mixing segment is defined by inlet channel 530 and valves 525 and 535. A third slug mixing segment is defined by inlet channel 540 and valves 535 and 545. A fourth slug mixing segment is defined by inlet channel 550 and valves 545 and 555. In this type of arrangement, multiple solutions may be introduced into the flow channel by blind filing against the valves that define their respective segments. Their inlet junction valves are then closed, the segment valves are opened and the slugs are pushed into the reaction chamber by flow of a solution through the flow channel (510) to yield a well mixed solution. It is not necessary that all segments of the flow channel are filled with a solution before the carry-on mixing takes place. This gives flexibility in what reagents are used in a particular reaction.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A mixing arrangement in an elastomeric microfluidic device, the mixing arrangement comprising:
    a) a reaction well having a single inlet from a flow channel;
    b) a first valve configured to open and close the flow channel at a position at or near the single inlet into the reaction well;
    c) a second valve configured to open and close the flow channel at a position further from the reaction well than the first valve, thereby defining a segment of the flow channel between the first and second valve;
    d) a source of a first fluid that is fluidically connected to said segment by way of a first input channel forming a junction with the segment between the first and second valve; and
    e) a source of a second fluid that is fluidically connected to said segment by way of a second input channel positioned behind the second valve;
    wherein said segment of the flow channel is configured to receive a volume of the first fluid into the segment by blind filling from the first input channel when the first and second valves are closed; and
    wherein said reaction well is configured to receive said volume of the first fluid followed by a volume of the second fluid from said segment when the first and second valves are open.

2. The mixing arrangement of claim 1, further comprising a third valve positioned to open and close the first input channel at or near said junction.

3. A microfluidic device comprising a matrix of the mixing arrangements according to claim 2 arranged in columns and rows, wherein the third valves of each mixing arrangement in each column of the matrix are actuated by a common control channel.

4. The mixing arrangement of claim 1, wherein said segment is bounded on at least one side by a material that is permeable to gases and not to liquid.

5. The mixing arrangement of claim 4, wherein said segment is configured so that flowing the first fluid into the segment under pressure from the first input channel with the first and second valves closed causes gas present in the segment to diffuse out through the gas permeable material so that a defined volume of the first fluid is contained in the segment.

6. The mixing arrangement of claim 1, wherein said reaction well is configured so that when a volume of the first fluid is contained in the segment, flowing the second fluid into the segment under pressure from the second input channel with the first and second valves open causes said volume of the first fluid and a defined volume of the second fluid to be mixed in the reaction well.

7. The mixing arrangement of claim 1, wherein said first fluid is a reagent solution.

8. The mixing arrangement of claim 1, wherein said second fluid is a sample solution.

9. A microfluidic device comprising a matrix of the mixing arrangements according to claim 1 arranged in columns and rows.

10. The microfluidic device of claim 9, wherein each column of mixing arrangements is fluidically connected to a source of the first fluid by way of a common input channel.

11. The microfluidic device of claim 9, wherein each row of mixing arrangements is fluidically connected to a source of the second fluid by way of a common input channel.

12. The microfluidic device of claim 9, configured so that said first fluid and said second fluid are supplied to each of said mixing arrangements from different layers of the device.

13. A microfluidic device comprising a matrix of the mixing arrangements according to claim 1 arranged in columns and rows, wherein the first and second valves of each mixing arrangement in each row of the matrix are actuated by a common control channel.

14. A microfluidic device comprising a matrix of unit cells arranged in columns and rows; wherein each unit cell comprises:
    a) a reaction well with a flow channel connected thereto;
    b) a first valve configured to open and close the flow channel at a position at or near its connection to the reaction well;
    c) a second valve configured to open and close the flow channel at a position further from the reaction well than the first valve, thereby defining a segment of the flow channel between the first and second valve;
    d) a source of a first fluid that is fluidically connected to said segment by way of a first input channel forming a junction with the segment between the first and second valve, wherein said segment of the flow channel is configured to receive a volume of the first fluid into the segment by blind filling from the first input channel when the first and second valves are closed; and
    e) a source of a second fluid that is fluidically connected to said segment by way of a second input channel positioned behind the second valve,
    wherein each unit cell is configured so that the reaction well can receive a volume of the first fluid followed by a volume of the second fluid from said segment by blind filling through a single open channel into the reaction well when the first and second valves are open;
    wherein each column of unit cells in the device is fluidically connected to a source of a first fluid by way of a first common input channel; and
    wherein each row of unit cells in the device is fluidically connected to a source of a second fluid by way of a second common input channel.

15. The microfluidic device of claim 14, wherein the reaction well in each unit cell has a single flow channel connected thereto.

16. The microfluidic device of claim 14, wherein the reaction well in each unit cell has two flow channels connected thereto.

17. The microfluidic device of claim 14, wherein the segment of each unit cell is bounded on at least one side by a material that is permeable to gases and not to liquid, and is configured so that flowing the first fluid into the segment under pressure from the first input channel with the first and second valves closed causes gas present in the segment to diffuse out through the gas permeable material so that a defined volume of the first fluid is contained in the segment.

18. The microfluidic device of claim 14, wherein the reaction well of each unit cell is configured so that when a volume of the first fluid is contained in the segment, flowing the second fluid into the segment under pressure with the first and second valves open causes said volume of the first fluid and a defined volume of the second fluid to be mixed in the reaction well.

19. The microfluidic device of claim 14, wherein each unit cell further comprises a third valve positioned to open and close the source of the first fluid at or near said junction.

20. The microfluidic device of claim 19, wherein the third valves of each unit cell in each column of the matrix are actuated by a first common control channel.

21. The microfluidic device of claim 14, wherein the first and second valves of each unit cell in each row of the matrix are actuated by a second common control channel.

22. A microfluidic device comprising a matrix of unit cells arranged in columns and rows;
   wherein each unit cell comprises:
      a) a reaction well with a flow channel connected thereto;
      b) a first valve configured to open and close the flow channel at a position at or near its connection to the reaction well;
      c) a second valve configured to open and close the flow channel at a position further from the reaction well than the first valve, thereby defining a segment of the flow channel between the first and second valve;
      d) a source of a first fluid that is fluidically connected to said segment by way of a first input channel forming a junction with the segment between the first and second valve, wherein said segment of the flow channel is configured to receive a volume of the first fluid into the segment by blind filling from the first input channel when the first and second valves are closed; and
      e) a source of a second fluid that is fluidically connected to said segment by way of a second input channel positioned behind the second valve, wherein said reaction well is configured to receive said volume of the first fluid followed by a volume of the second fluid from said segment when the first and second valves are open;
   wherein each column of unit cells in the device is fluidically connected to a source of a first fluid by way of a first common input channel;
   wherein each row of unit cells in the device is fluidically connected to a source of a second fluid by way of a second common input channel; and
   wherein said segment of the flow channel in each unit forms one or more additional junctions with additional input channels.

23. The microfluidic device of claim 22, wherein each unit further comprises valve(s) positioned to open and close said segment between each junction with an input channel.

24. The microfluidic device of claim 22, wherein each unit further comprises valve(s) positioned to open and close each of said additional input channels at or near its respective junction with said segment.

* * * * *